(12) United States Patent　　　　　(10) Patent No.:　US 12,665,893 B2
Petersen et al.　　　　　　　　　　　(45) Date of Patent:　Jun. 23, 2026

(54) NETWORK-LEVEL, KEY-BASED PLATFORM LINKING

(71) Applicant: 1080 Network, Inc., Lakeway, TX (US)

(72) Inventors: Christopher Michael Petersen, Lakeway, TX (US); Tim Kuchlein, Lakeway, TX (US)

(73) Assignee: 1080 Network, Inc., Lakeway, TX (US)

( * ) Notice: Subject to any disclaimer, the term of this patent is extended or adjusted under 35 U.S.C. 154(b) by 0 days.

(21) Appl. No.: 19/288,508

(22) Filed: Aug. 1, 2025

(65) Prior Publication Data

US 2026/0037967 A1　　Feb. 5, 2026

Related U.S. Application Data

(60) Provisional application No. 63/678,928, filed on Aug. 2, 2024, provisional application No. 63/678,917, filed on Aug. 2, 2024.

(51) Int. Cl.
G06Q 20/38　　　　(2012.01)
(52) U.S. Cl.
CPC ................................ G06Q 20/3829 (2013.01)
(58) Field of Classification Search
CPC .................................................. G06Q 20/3829
USPC .......................................................... 705/71
See application file for complete search history.

(56) References Cited

U.S. PATENT DOCUMENTS

| | | | |
|---|---|---|---|
| 6,085,320 A | 7/2000 | Kaliski, Jr. | |
| 10,382,266 B1 * | 8/2019 | Balakrishnan | .......... H04L 67/55 |
| 2015/0020154 A1 * | 1/2015 | Setton | ..................... H04L 63/08 |
| | | | 726/2 |
| 2015/0134426 A1 * | 5/2015 | Lejcher | ............ G06Q 10/06395 |
| | | | 705/7.41 |

(Continued)

FOREIGN PATENT DOCUMENTS

JP　　　2023-184119 A　　12/2023

OTHER PUBLICATIONS

ISA/220—Notification of Transmittal or Search Report and Written Opinion of the ISA, or the Declaration Mailed on Sep. 26, 2025 for WO Application No. PCT/US25/040288, 1 page(s).

(Continued)

*Primary Examiner* — Zeshan Qayyum
(74) *Attorney, Agent, or Firm* — Alston & Bird LLP

(57)　　　　　　　ABSTRACT

Various embodiments of the present disclosure provide a network linking technique that improves the functionality of a computer in various aspects. The techniques comprise responsive to an exchange request, receiving, originating from a member platform within the member computing ecosystem, a linking code request comprising a member-specific identifier corresponding to the member platform; providing, to an internal service, the linking code request to generate an ephemeral transport object storing a linking code and a link reference corresponding to the member-specific identifier and the linking code; providing the linking code to the member platform; receiving, originating from (Continued)

the another member platform within the member computing ecosystem, a linking request comprising the linking code; and authorizing, using the second member platform, the exchange request based on the linking code.

20 Claims, 17 Drawing Sheets

(56)                 References Cited

U.S. PATENT DOCUMENTS

| | | | |
|---|---|---|---|
| 2016/0127454 A1* | 5/2016 | Maheshwari | ........... H04L 67/10 |
| | | | 709/223 |
| 2018/0176211 A1 | 6/2018 | Bernabeu et al. | |
| 2020/0097938 A1 | 3/2020 | Van Der Veen et al. | |
| 2023/0410064 A1 | 12/2023 | Hayashi et al. | |
| 2024/0064151 A1 | 2/2024 | Petersen et al. | |
| 2025/0007878 A1* | 1/2025 | Srikantan | .............. H04L 45/745 |

OTHER PUBLICATIONS

Outgoing—ISA/210—International Search Report Mailed on Sep. 26, 2025 for WO Application No. PCT/US25/040288, 2 page(s).
Outgoing Written Opinion of the ISA Mailed on Sep. 26, 2025 for WO Application No. PCT/US25/040288, 6 page (s).

* cited by examiner

700

UUEK 702

102

REQUESTER PARTITION 704

EXCHANGE IDENTIFIER 708

PROVIDER PARTITION 706

MEMBER KEY 610

MEMBER KEY 610

106

CLIENT DEVICE 104

NETWORK-LEVEL, KEY-BASED PLATFORM LINKING

CROSS-REFERENCE TO RELATED APPLICATIONS

This application claims the benefit of U.S. Provisional Patent Application Ser. No. 63/678,917 filed on Aug. 2, 2024, and U.S. Provisional Patent Application Ser. No. 63/678,928 filed on Aug. 2, 2024, both of which are incorporated herein by reference in their entireties, comprising any figures, tables, drawings, and appendices.

TECHNOLOGICAL FIELD

Embodiments of the present disclosure generally relate to credential-less exchanges of value between multiple entities in a value system.

BACKGROUND

Various embodiments of the present disclosure address technical challenges related to network-based value exchanges given limitations of existing exchange processing techniques and architectures. Existing processes for executing an exchange over a computing network rely on the use of persistent credentials, such as payment credentials (e.g., card numbers, usernames, passwords, bank routing numbers, account numbers) and their proxies, which expose recipients of the credentials to fraud, regulatory and compliance costs, and reputational risk. Moreover, due to the static nature of traditional credentials, users must accept risk of financial loss, damaged credit scores, identity theft, and other outcomes each time the user provides their credentials to enable a transaction. The inherent insecurity of persistent credentials is conventionally addressed using strict communication protocols, data governance procedures, and authentication schemes, each of which introduce additional technical problems by adding overhead and complicating network-based transactions without solving the root technical problem of data security.

Various embodiments of the present disclosure make important contributions to various existing network-based exchange processing techniques by addressing each of these technical challenges.

BRIEF SUMMARY

Various embodiments of the present disclosure disclose a secure intermediary computing platform and computing services that facilitate the credential-less execution of a value-based exchange that leverages a UUEK (Universally Unique Ephemeral Key) to eliminate the use of persistent credentials. To do so, the intermediary computing platform (e.g., the centralized key exchange platform) may facilitate interactions between a set of member platforms within a member computing ecosystem to link relationships separately maintained by the member platforms. Unlike conventional linking protocols, the intermediary computing platform does not receive or rely upon persistent credentials to register or link relationships of a particular user. Instead, the intermediary computing platform may form links through linking operations that leverage cross-platform communications and unique keys, such as the UUEK, without receiving persistent credentials and, in fact, without knowledge of the persistent credentials at any time.

By eliminating a reliance on persistent credentials, the intermediary computing platform enables the use of new, more flexible, interfaces, such as application programming interfaces (APIs) described herein, that are leveraged by the intermediary computing platform to communicate with different network members to register and link relationships associated with a particular user without exposing user credentials at any step in the process. Once linked, the intermediary computing platform may issue UUEKs, or other keys, to member platforms that may replace traditional, persistent credentials and allow for the collaboration between linked members without storing or passing secure information between the members. In this way, the intermediary computing platform allows for enhanced cross-platform communication without exposing sensitive user or relationship information that may be susceptible to network attacks.

In some embodiments, a computer-implemented method comprises responsive to an exchange request at a first member platform within a member computing ecosystem, receiving, by one or more processors and originating from a second member platform within the member computing ecosystem, a linking code request comprising a second member-specific identifier corresponding to the second member platform; providing, by the one or more processors and to an internal service, the linking code request to generate an ephemeral transport object storing a linking code and a link reference corresponding to the second member-specific identifier and the linking code; providing, by the one or more processors, the linking code to the second member platform; receiving, by the one or more processors and originating from the first member platform within the member computing ecosystem, a linking request comprising the linking code; providing, by the one or more processors, the linking request to the internal service to receive the link reference from the ephemeral transport object of the internal service; providing, by the one or more processors, the link reference to the first member platform; receiving, by the one or more processors and originating from the first member platform, a universally unique ephemeral key (UUEK) request comprising the link reference; generating, by the one or more processors, a UUEK based on the second member-specific identifier corresponding to the link reference; providing, by the one or more processors, the UUEK to the first member platform; receiving, by the one or more processors and originating from the first member platform, the exchange request with the UUEK; and authorizing, by the one or more processors and using the second member platform, the exchange request based on the UUEK.

In some examples, the UUEK comprises a second member partition corresponding to the second member platform within the member computing ecosystem and an exchange identifier.

In some examples, authorizing the exchange request comprises identifying, by a first member service corresponding to the first member platform, a second member service corresponding to the UUEK based on the second member partition; providing the exchange request to the second member service; providing, by the second member service, an authorization request to the second member platform; receiving, originating from the second member platform, an authorization response based on the authorization request; and providing the authorization response to the first member service.

In some examples, the computer-implemented method comprises providing, by the first member service, the authorization response to the first member platform.

In some examples, the exchange request originates from a terminal corresponding to the first member platform and the first member platform provides an indication of the authorization response to the terminal.

In some examples, (i) the linking code request is received via a second interface preconfigured for the second member platform, and (ii) the linking request is received via a first interface preconfigured for the first member platform.

In some examples, the computer-implemented method further comprises instantiating the internal service; providing the second member-specific identifier to the internal service to initiate a generation of the linking code and the ephemeral transport object; receiving the linking code from the internal service.

In some examples, the linking code is a universally unique identifier (UUID) and the link reference comprises the linking code wrapped with the second member-specific identifier.

In some examples, the computer-implemented method further comprises removing the ephemeral transport object in response to receiving the link reference.

In some examples, the computer-implemented method further comprises removing the ephemeral transport object in response to an elapsed time exceeding a time threshold.

In some embodiments, a system comprises an intermediary platform; and a set of member platforms within member computing ecosystem communicatively connected to the intermediary platform, wherein the intermediary platform comprises one or more processors; and one or more memories storing processor-executable instructions that, when executed by the one or more processors, cause the one or more processors to perform operations comprising responsive to an exchange request at a first member platform within the member computing ecosystem, receiving, originating from a second member platform within the member computing ecosystem, a linking code request comprising a second member-specific identifier corresponding to the second member platform; providing, to an internal service, the linking code request to generate an ephemeral transport object storing a linking code and a link reference corresponding to the second member-specific identifier and the linking code;

providing the linking code to the second member platform; receiving, originating from the first member platform within the member computing ecosystem, a linking request comprising the linking code; providing the linking request to the internal service to receive the link reference from the ephemeral transport object of the internal service; providing the link reference to the first member platform; receiving, originating from the first member platform, a universally unique ephemeral key (UUEK) request comprising the link reference; generating, a UUEK based on the second member-specific identifier corresponding to the link reference; providing the UUEK to the first member platform; receiving, originating from the first member platform, the exchange request with the UUEK; and authorizing, using the second member platform, the exchange request based on the UUEK.

In some embodiments, one or more non-transitory computer-readable media storing processor-executable instructions that, when executed by one or more processors, cause the one or more processors to perform operations comprising responsive to an exchange request at a first member platform within a member computing ecosystem, receiving, originating from a second member platform within the member computing ecosystem, a linking code request comprising a second member-specific identifier corresponding to the second member platform; providing, to an internal service, the linking code request to generate an ephemeral transport object storing a linking code and a link reference corresponding to the second member-specific identifier and the linking code; providing the linking code to the second member platform; receiving, originating from the first member platform within the member computing ecosystem, a linking request comprising the linking code; providing the linking request to the internal service to receive the link reference from the ephemeral transport object of the internal service; providing the link reference to the first member platform; receiving, originating from the first member platform, a universally unique ephemeral key (UUEK) request comprising the link reference; generating, a UUEK based on the second member-specific identifier corresponding to the link reference; providing the UUEK to the first member platform; receiving, originating from the first member platform, the exchange request with the UUEK; and authorizing, using the second member platform, the exchange request based on the UUEK.

BRIEF DESCRIPTION THE DRAWINGS

Having thus described the disclosure in general terms, reference will now be made to the accompanying drawings, which are not necessarily drawn to scale, and wherein:

Figure 8A:
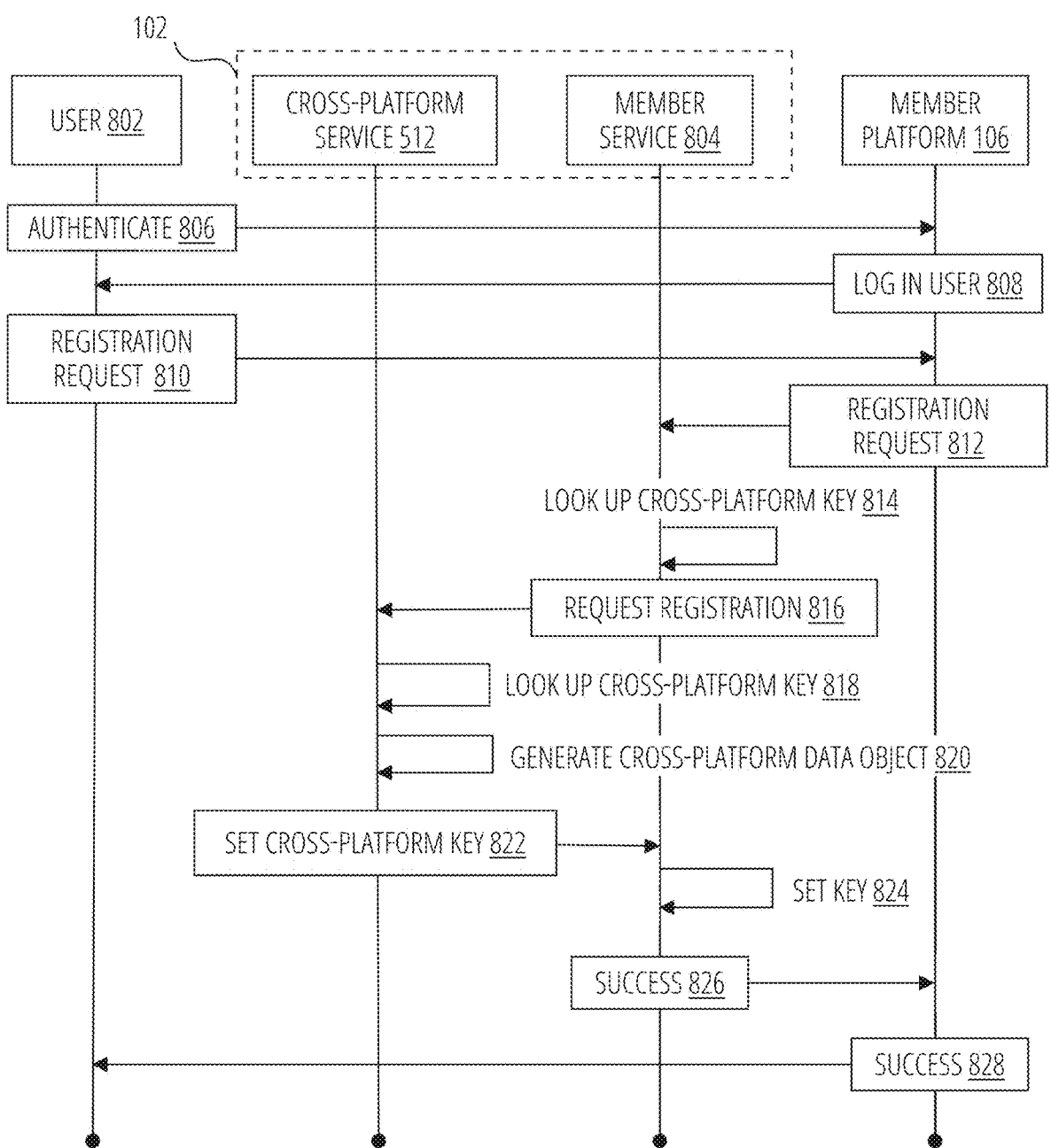
Figure 8B:
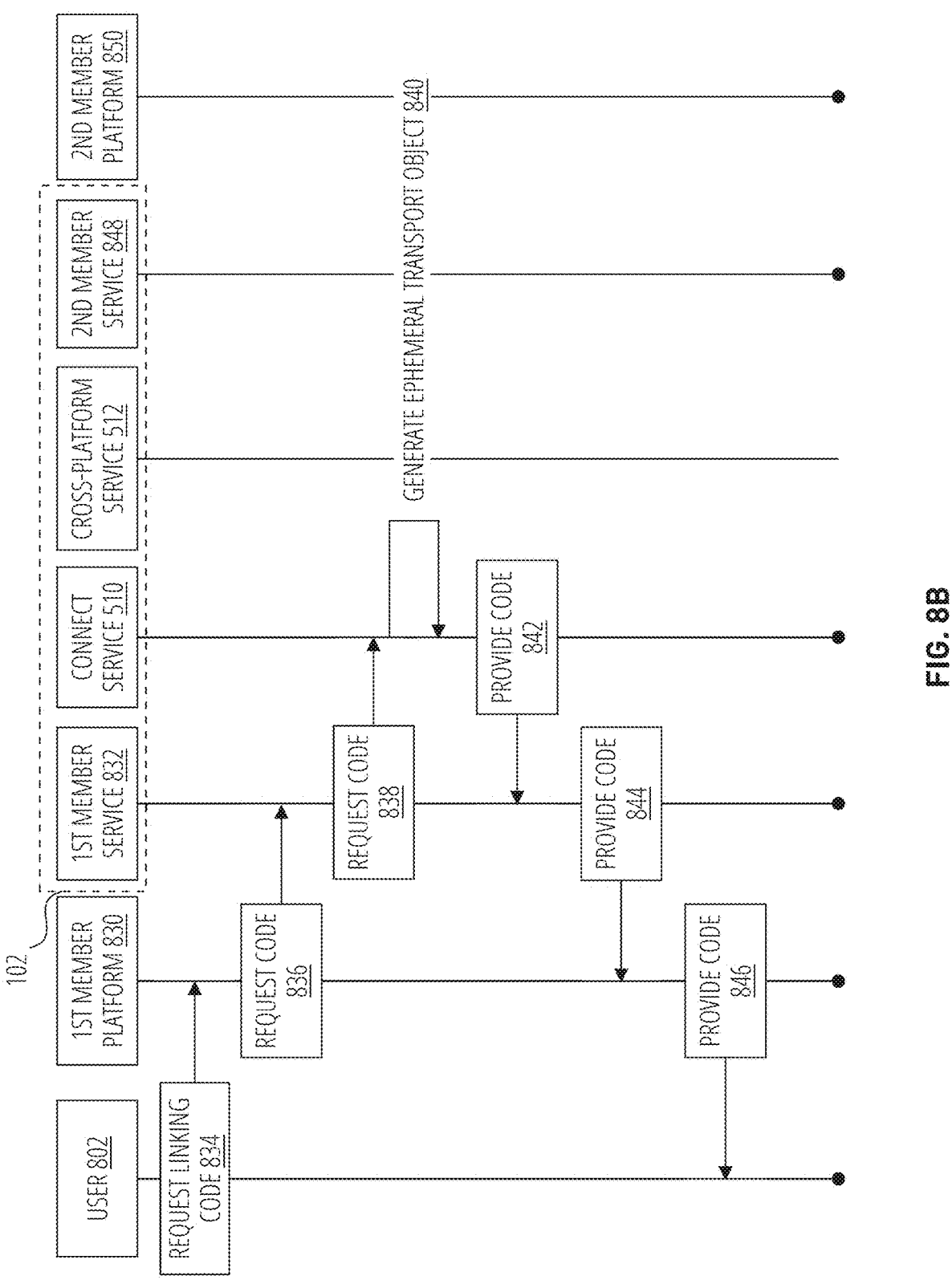
Figure 8C:
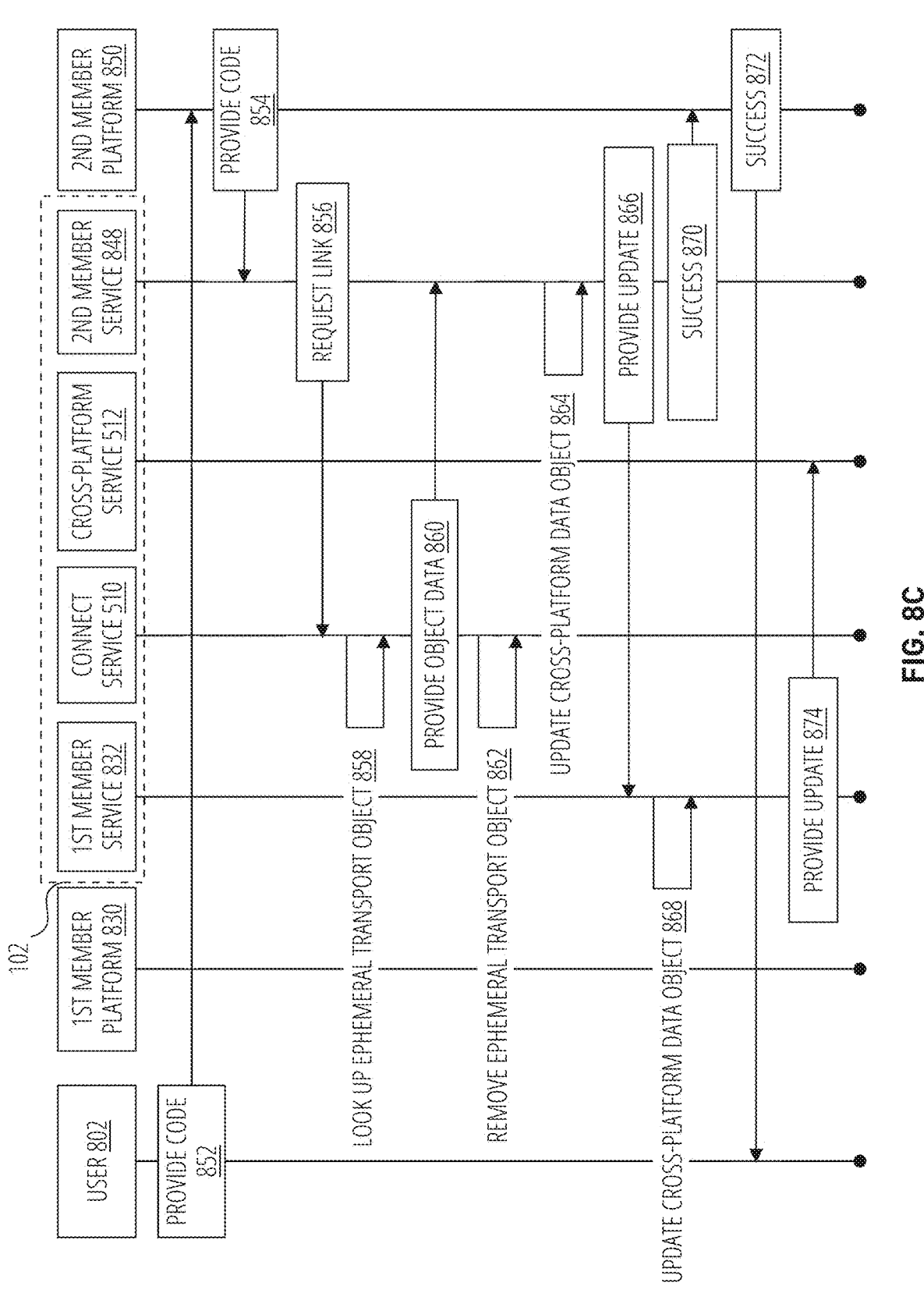

FIGS. 8A-C provide message flow diagrams illustrating key exchange operations for facilitating a secure cross-platform service in which different platforms may be linked to form cross-platform relationships.

Figure 9A:
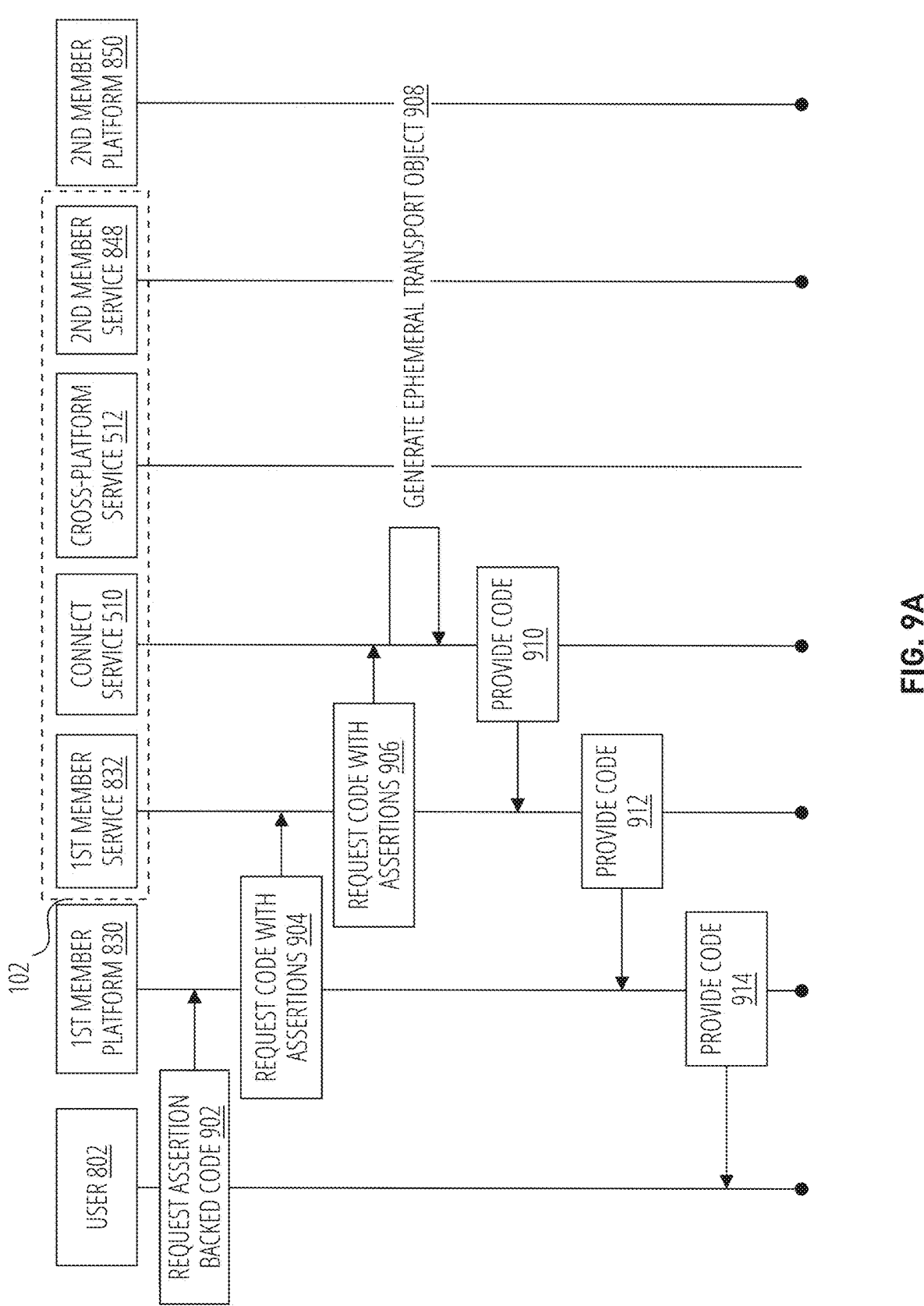
Figure 9B:
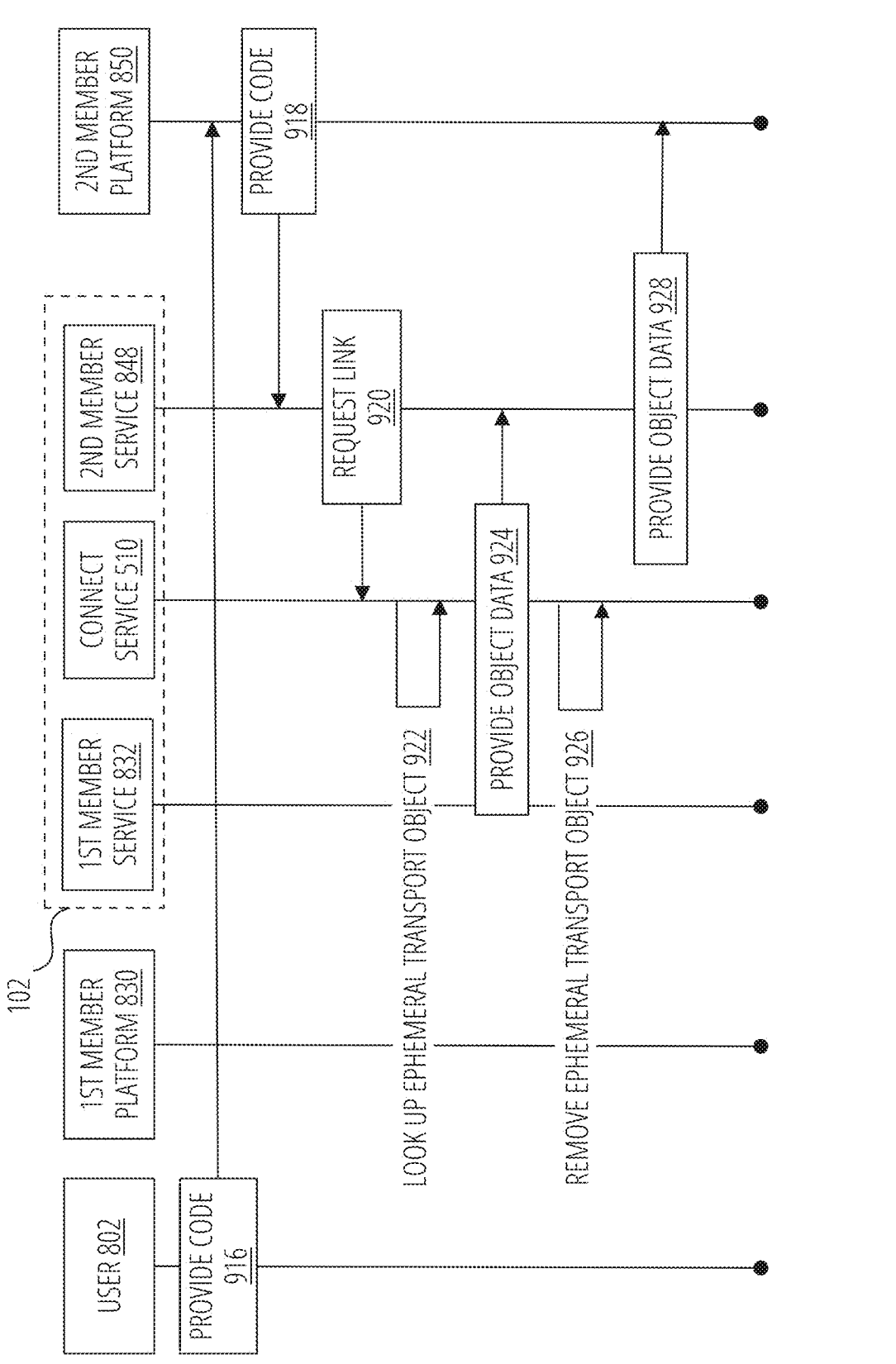
Figure 9C:
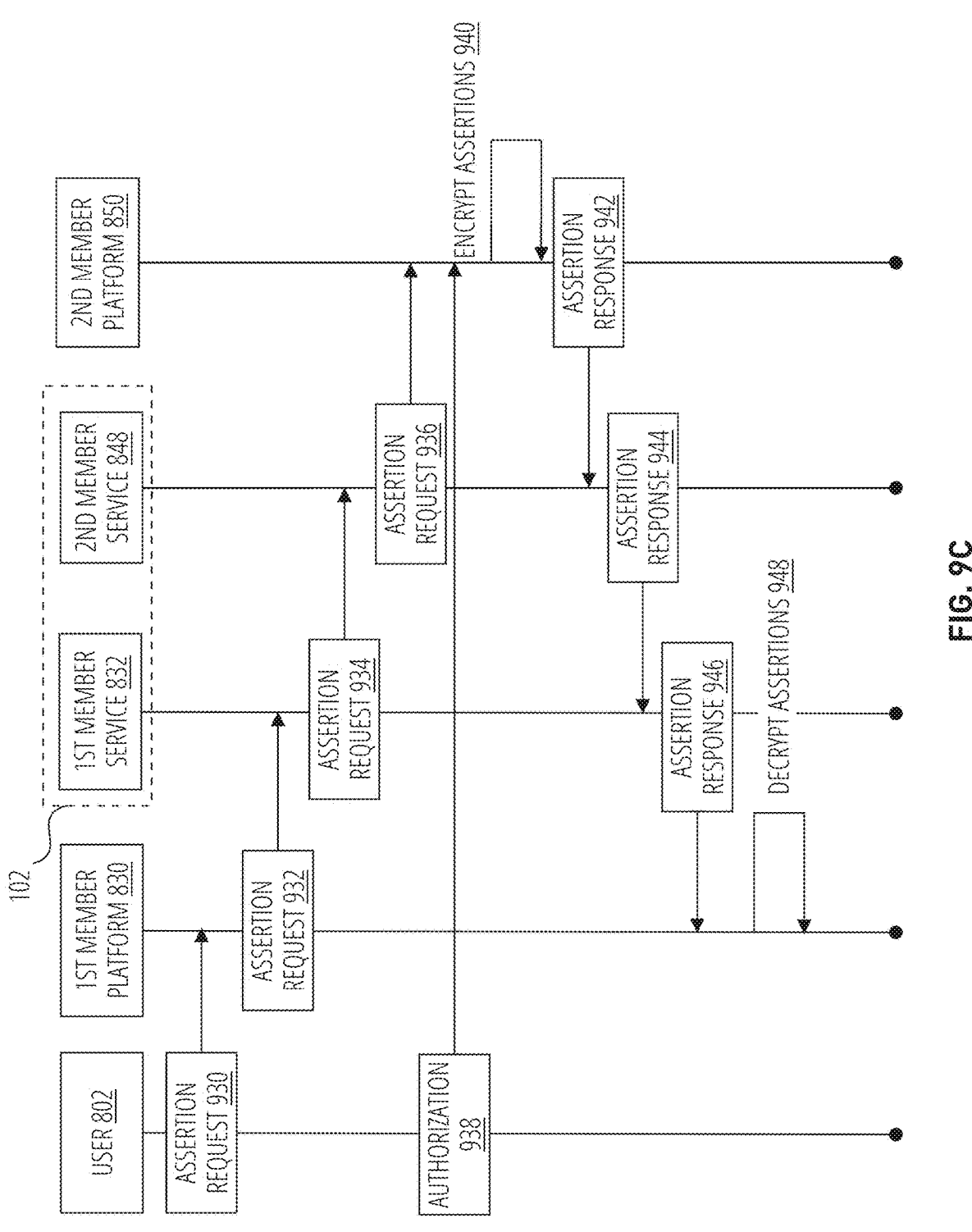

FIGS. 9A-C provide a message flow diagram illustrating key exchange operations for facilitating cross-platform assertions in which different, linked platforms may collaborate to anonymously share information with respect to a relationship.

Figure 10A:
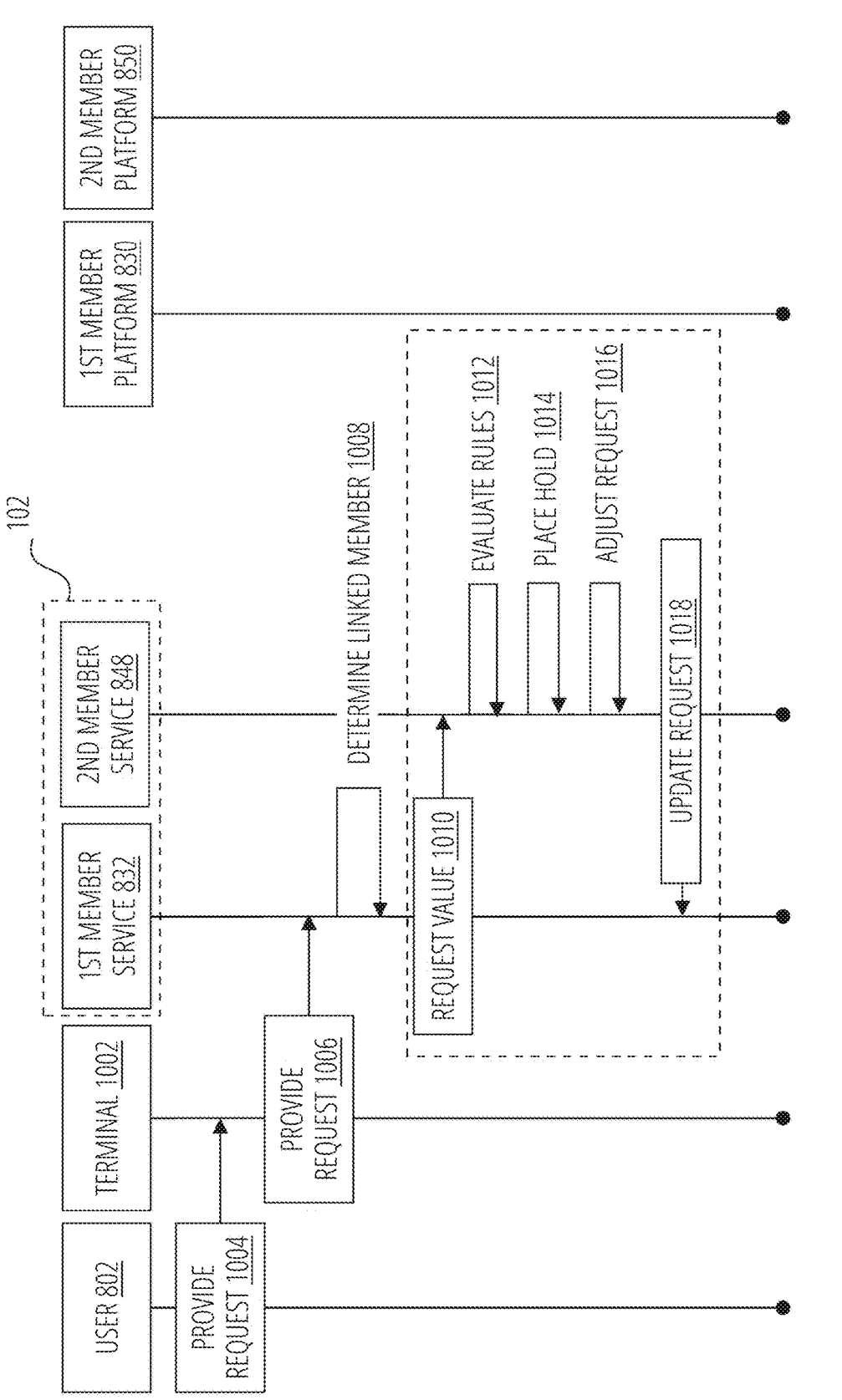
Figure 10B:
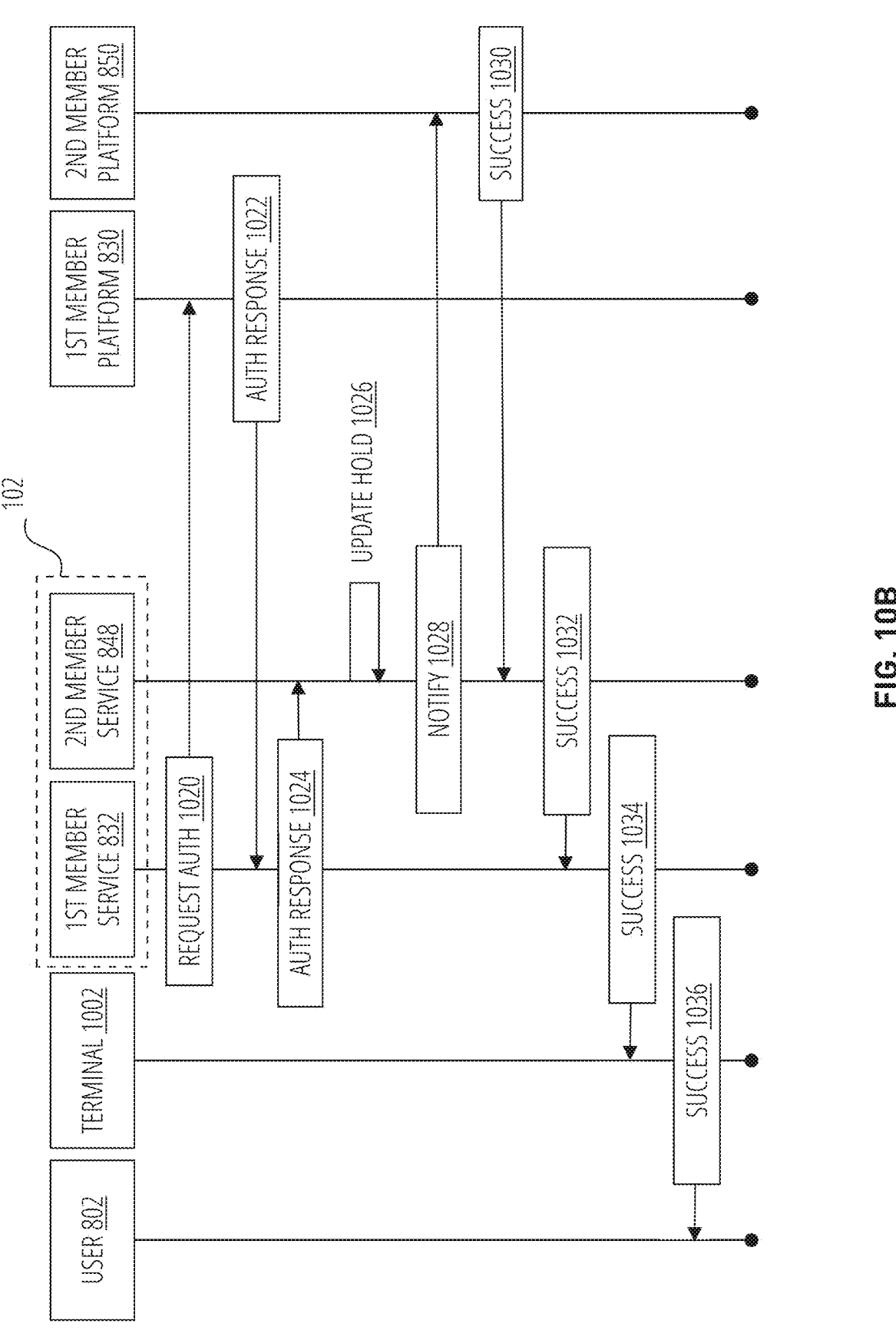

FIGS. 10A-B provide message flow diagrams illustrating key exchange operations for facilitating a cross-platform exchange in which different, linked platforms may collaborate with respect to a single user request.

Figure 11A:
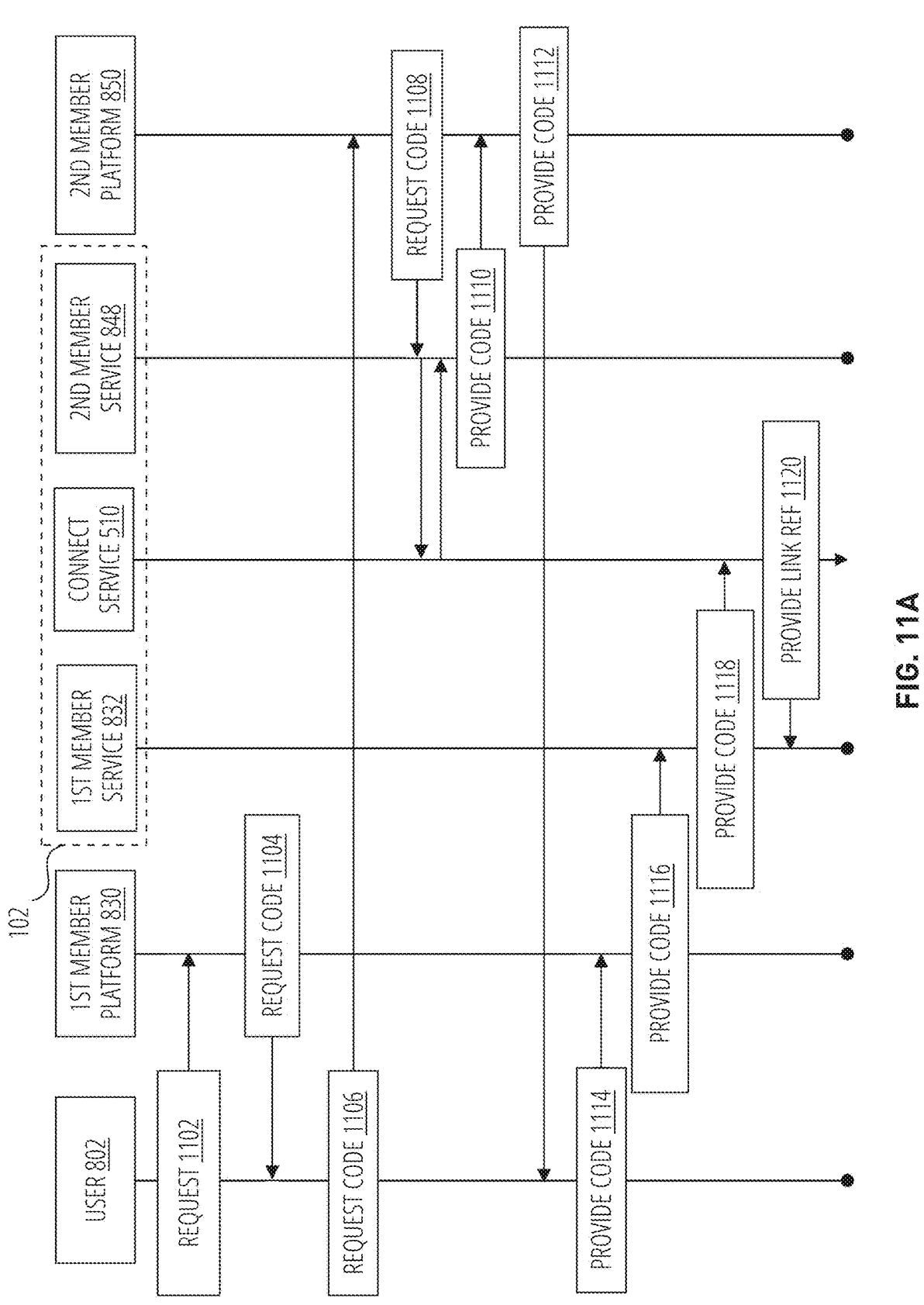
Figure 11B:
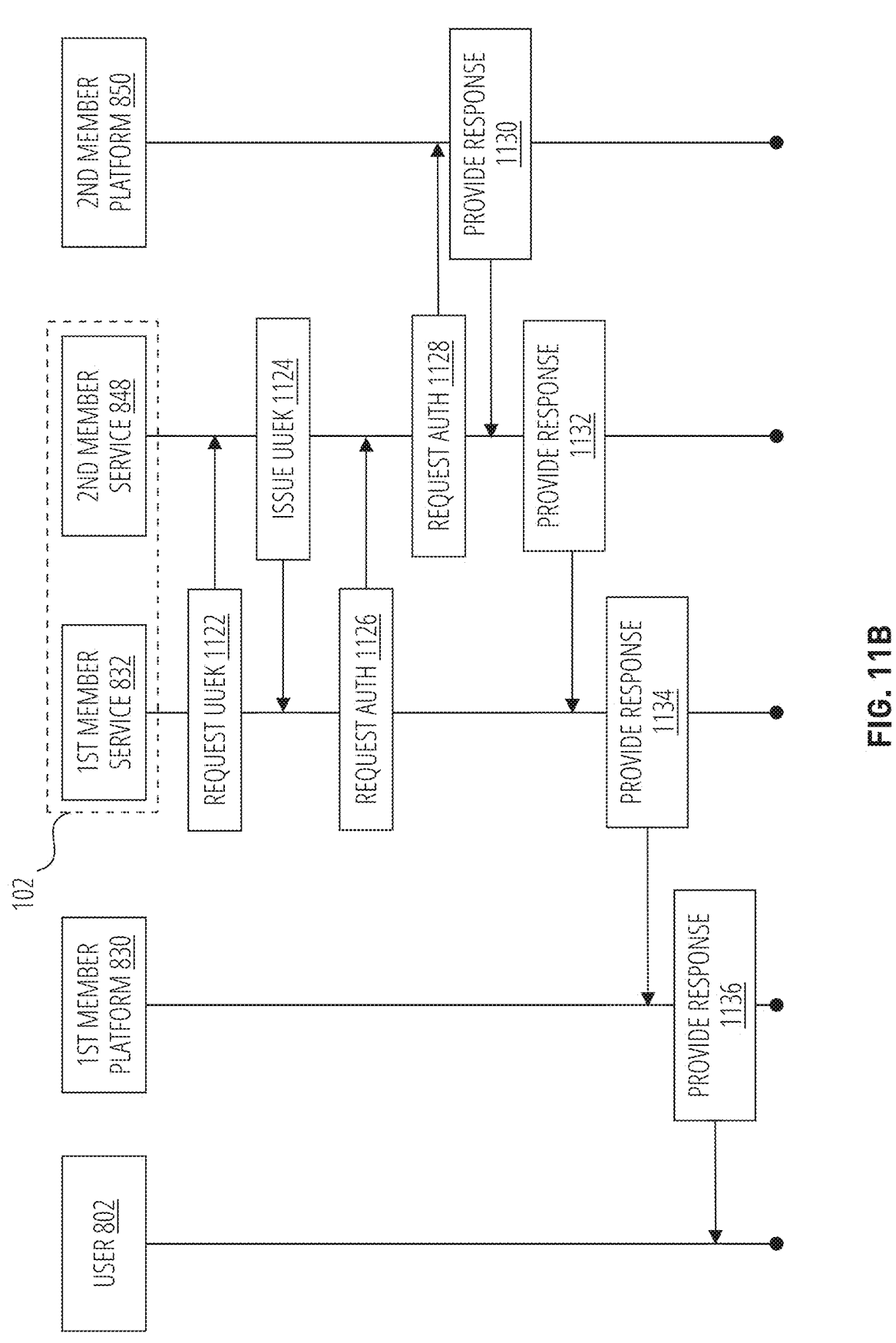

FIGS. 11A-B provide message flow diagrams illustrating key exchange operations for facilitating cross-platform network exchanges in which different platforms may collaborate to anonymously authorize an exchange.

DETAILED DESCRIPTION OF SOME EXAMPLE EMBODIMENTS

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based at least in part on," "based at least on," "based upon," and/or similar words are used herein interchangeably in an open-ended manner such that they do not necessarily indicate being based at least in part only on or based solely on the referenced element or elements unless so indicated. Like numbers refer to like elements throughout.

I. General Overview and Technical Advantages

Various embodiments of the present disclosure provide technical solutions for managing sensitive network communications between closed platforms. In various embodiments, a centralized key exchange platform is provided that facilitates a credential-less exchange between affiliated member platforms. These exchanges may be facilitated in real time, without the persistent credentials that traditionally expose users of a member platform to cyber-attacks. To do so, the centralized key exchange platform may define a new linking architecture, a nodal key mapping structure, that represents generalized relationships as unique keys, e.g., member-specific keys. The centralized key exchange platform may pass these unique keys to a user, different member platforms, and/or other affiliated services to identify and then establish links between user relationships within the nodal key mapping structure. Each link may be established through explicit interactions between a user and a member platform, which may then be communicated to the centralized key exchange platform with reference to keys previously established between the member platform and the centralized key exchange platform. As a result of the interactions, the centralized key exchange platform may record and store relationships as sets of linked keys, each of which is only recognizable to a specific member platform. This allows the centralized key exchange platform to store relationships that are abstracted away from the sensitive information underlying the relationships and, by doing so, enables secure cross-platform communications without introducing additional attack vectors susceptible to cyber-attacks.

As described herein, the key passing techniques of the present disclosure may be applied in various settings to empower more secure cross-platform communications. For example, as described with reference to FIGS. 8A-C, the key passing techniques may enable the establishment of cross-platform relationships in a manner that is more secure, faster, and requires less computing resources compared to traditional network techniques. As another example, as described with reference to FIGS. 9A-C, the key passing techniques may enable linked platforms to anonymously share information in a manner that is more secure, faster, and requires less computing resources compared to traditional network techniques. As another example, as described with reference to FIGS. 10A-B, the key passing techniques may enable linked platforms to anonymously collaborate with respect to a single request in a manner that is more secure, faster, and requires less computing resources compared to traditional network techniques. As yet another example, the key passing techniques may enable unlinked platforms to authorize each other's actions in a manner that is more secure, faster, and requires less computing resources compared to traditional network techniques.

Each of these techniques improves data and network security with respect to computers and directly addresses cyber-security risks left unaddressed by traditional communication schemes to safeguard sensitive data through network communications.

Example inventive and technologically advantageous embodiments of the present disclosure comprise (i) data transformation, mapping, and processing schemes for facilitating the network-based exchanges, (ii) exchange interfaces and network-based communication schemes for improving network security for cross-platform communications, (iii) ephemeral data structures and data management techniques for distributing the ephemeral data structures to facilitate real-time, secure, and dynamic exchanges, and (iv) real-time user authorization techniques for authorizing actions across multiple, disparate computing platforms.

II. Computer Program Products, Methods, and Computing Entities

Embodiments of the present disclosure may be implemented in various ways, comprising as computer program products that comprise articles of manufacture. Such computer program products may comprise one or more software components comprising, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages comprise, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may comprise a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media comprise all computer-readable media (comprising volatile and non-volatile media).

In one embodiment, a non-volatile computer-readable storage medium may comprise a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also comprise a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also comprise read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also comprise conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may comprise random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (comprising various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams, flowchart illustrations, messaging flows, and other representations of data, operations, and messaging schemes. It should be understood that each block of the block, arrow, and/or the like of the diagrams, flowchart illustrations, etc. may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the representations of the present disclosure. Accordingly, the representations of the present disclosure support various combinations of embodiments for performing the specified instructions, operations, or steps.

III. Example Computing Ecosystem

Figure 1:
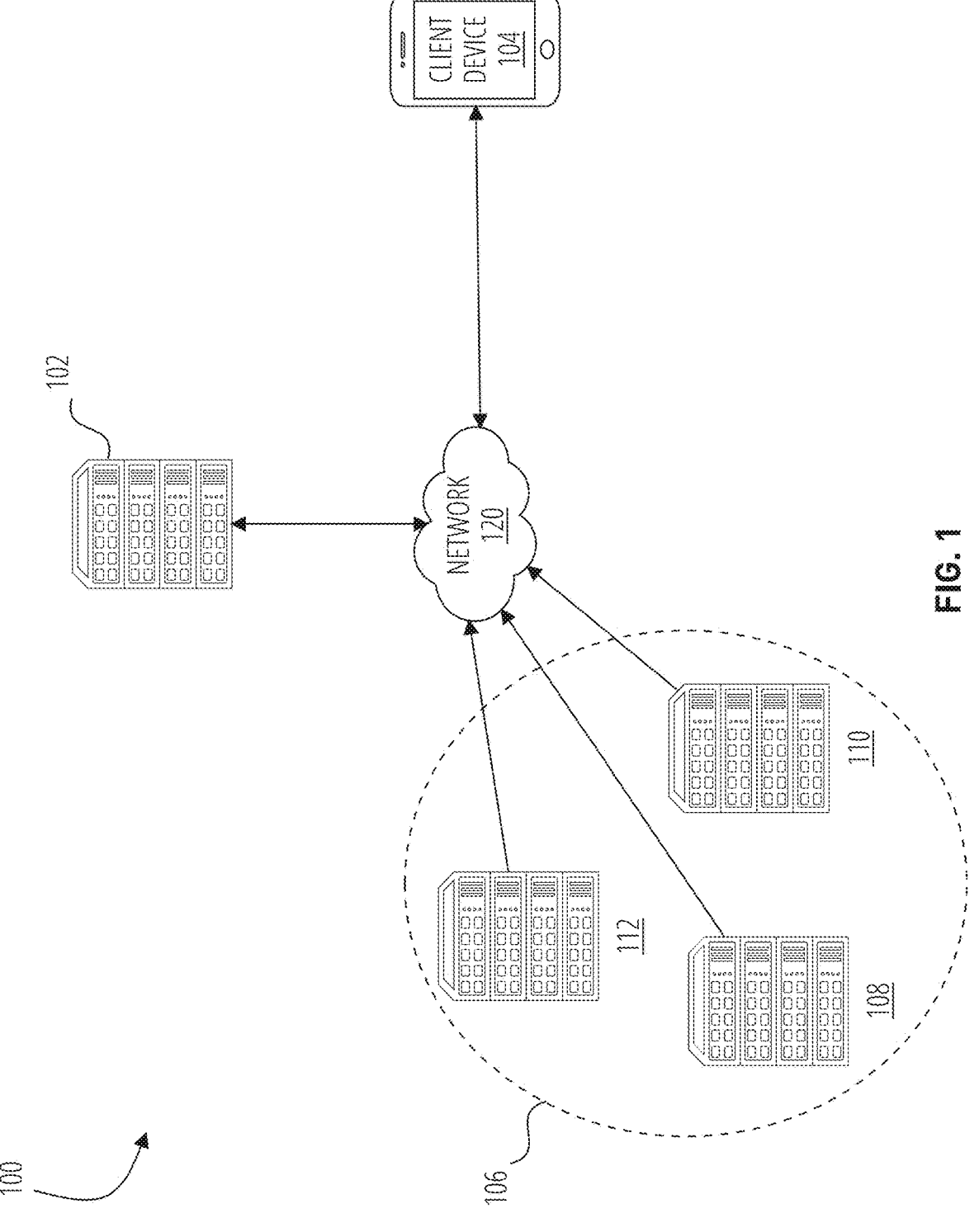
FIG. 1 is an example diagram of a computing ecosystem in accordance with one or more embodiments of the present disclosure.

FIG. 1 provides an illustration of a computing ecosystem 100 that may be used in conjunction with various embodiments of the present disclosure. As shown in FIG. 1, the computing ecosystem may comprise a centralized key exchange platform 102, a set of member platforms 106 registered with the centralized key exchange platform 102, one or more client devices 104, and/or one or more networks 120 through which the entities within the computing ecosystem 100 may communicate. The set of member platforms 106 may form a member computing ecosystem in which up to each of the members may indirectly collaborate through network exchanges facilitated by the centralized key exchange platform 102. In some examples, such network exchanges may be facilitated through a registration, enrollment, and/or linking processes between the set of member platforms 106 and the centralized key exchange platform 102, as described herein.

In some embodiments, a member computing ecosystem, established by the centralized key exchange platform 102, comprises a set of member platforms 106 that each play one or more different roles within a network exchange facilitated by the centralized key exchange platform 102. A single member platform, for example, may act as a provider platform 108, a requester platform 110, and/or a value platform 112 for a particular network exchange. In this regard, the provider platform 108, the requester platform 110, and/or the value platform 112 may be defined based on the actions of a particular member platform with respect to a particular network exchange. Thus, the same member platform may be a provider platform 108, a requester platform 110, and/or a value platform 112 depending on the platform's role with respect to a network exchange. As described herein, each role that a member platform may play for a particular network exchange may be facilitated by a different interface established between the member platform and the centralized key exchange platform 102.

In some embodiments, the centralized key exchange platform 102 is a computing entity that is configured to facilitate network exchanges between member platforms using secure keys to replace persistent credentials susceptible to security vulnerabilities. The centralized key exchange platform 102 may comprise one or more processing devices, memory devices, and/or the like that are physically and/or wirelessly coupled and configured to collectively (and/or individually) perform the one or more computing tasks for facilitating a credential agnostic exchange. In some examples, the exchange platform may comprise, define, and/or otherwise leverage one or more APIs, as described with respect to FIG. 5, for facilitating communications (e.g., requests and responses) between a set of member platforms 106. As described herein, the APIs may be leveraged to facilitate a secure exchange between member platforms in any value system, without use of personally identifiable information (PII) or persistence credentials.

In some embodiments, a member platform of the set of member platforms 106 is a computing entity corresponding to a member affiliated with the centralized key exchange platform 102. The member platform, for example, may comprise a provider computing entity acting on behalf of a provider for a particular network exchange, a requesting computing entity acting on behalf of a requester for a particular network exchange, a value computing entity acting on a behalf of a value provider for a particular network exchange, and/or a combination of the three.

In some embodiments, a requester platform 110 is a computing entity that is configured to perform one or more operations on behalf of a requesting entity. A requester platform 110, for example, may comprise one or more processing devices, memory devices, and/or the like that are physically and/or wirelessly coupled and configured to collectively (and/or individually) perform the one or more computing tasks for requesting value (e.g., in the form of information, tasks, currency) in a value system agnostic exchange. By way of example, a requester platform 110 may be associated with a requesting entity that interacts with another member of the member computing ecosystem to retrieve information, initiate an action, authorize a payment, and/or any other network-based exchange. The requester platform 110 may comprise, define, and/or otherwise leverage one or more APIs for facilitating communications (e.g., requests and responses) with the centralized key exchange platform 102 to indirectly interact with other members of the member computing ecosystem according to a particular request. In addition, or alternatively, the requester platform 110 may be configured to host one or more user-facing applications (e.g., a requesting application) for interacting with one or more users through the client device 104.

In some embodiments, a provider platform 108 is a computing entity that is configured to perform one or more operations on behalf of a providing entity that may complete a request from a requester platform 110. A provider platform 108, for example, may comprise one or more processing devices, memory devices, and/or the like that are physically and/or wirelessly coupled and configured to collectively (and/or individually) perform the one or more computing tasks for providing value (e.g., in the form of information, tasks, currency) in a value system agnostic exchange. In some examples, a provider platform 108 may comprise, define, and/or otherwise leverage one or more APIs for facilitating communications (e.g., requests and responses) with the exchange platform. By way of example, the provider platform 108 may be associated with a providing entity that hosts, maintains, and/or otherwise has access to one or more instruments for providing information, initiating an action, authorizing a payment, and/or any other network-based exchange. The provider platform 108 may comprise, define, and/or otherwise leverage one or more APIs for facilitating communications (e.g., requests and responses) with the centralized key exchange platform 102 to indirectly interact with other members of the member computing ecosystem according to a particular request. In addition, or alternatively, the provider platform 108 may be configured to host one or more user-facing applications (e.g., a provider application) for interacting with one or more users through the client device 104.

In some embodiments, a value platform 112 is a computing entity that is configured to perform one or more operations on behalf of a modification entity that may partially contribute to a request from a requester platform 110. For example, a provider platform 108 may complete a request from a requester platform 110 after the request is modified by a value platform 112. In such a case, a provider platform 108 is a member platform that finally authorizes a request and a value platform 112 is a member platform that contributes to but does not finally authorize the request. A value platform 112, for example, may comprise one or more processing devices, memory devices, and/or the like that are physically and/or wirelessly coupled and configured to collectively (and/or individually) perform the one or more computing tasks for providing partial value (e.g., in the form of information, tasks, currency) in a value system agnostic exchange. In some examples, a value platform 112 may comprise, define, and/or otherwise leverage one or more APIs for facilitating communications (e.g., requests and responses) with the exchange platform. By way of example, the value platform 112 may be associated with a modifier entity that hosts, maintains, and/or otherwise has access to one or more instruments for contributing information, performing a partial action, contributing to a payment, and/or any other network-based exchange. The value platform 112 may comprise, define, and/or otherwise leverage one or more APIs for facilitating communications (e.g., requests and responses) with the centralized key exchange platform 102 to indirectly interact with other members of the member computing ecosystem according to a particular request. In addition, or alternatively, the value platform 112 may be configured to host one or more user-facing applications (e.g., a value application) for interacting with one or more users through the client device 104.

In some embodiments, up to each of the entities (e.g., member platforms 106, client device 104, centralized key exchange platform 102) of the computing ecosystem 100 may be in electronic communication with, for example, one another over the same or different wireless or wired networks 120 comprising, for example, a wired or wireless Personal Area Network (PAN), Local Area Network (LAN), Metropolitan Area Network (MAN), Wide Area Network (WAN), or the like. The network 120, for example, may comprise any network connection comprising any type of network and/or across any geographic boundary (e.g., inter-country connections involving one or more sovereign entities). Additionally, while FIG. 1 illustrates certain systems as separate, standalone entities, the various embodiments are not limited to this particular architecture.

a. Example Computing Platform

Figure 2:
FIG. 2 is an example schematic of a computing platform in accordance with one or more embodiments of the present disclosure.
Figure 2:
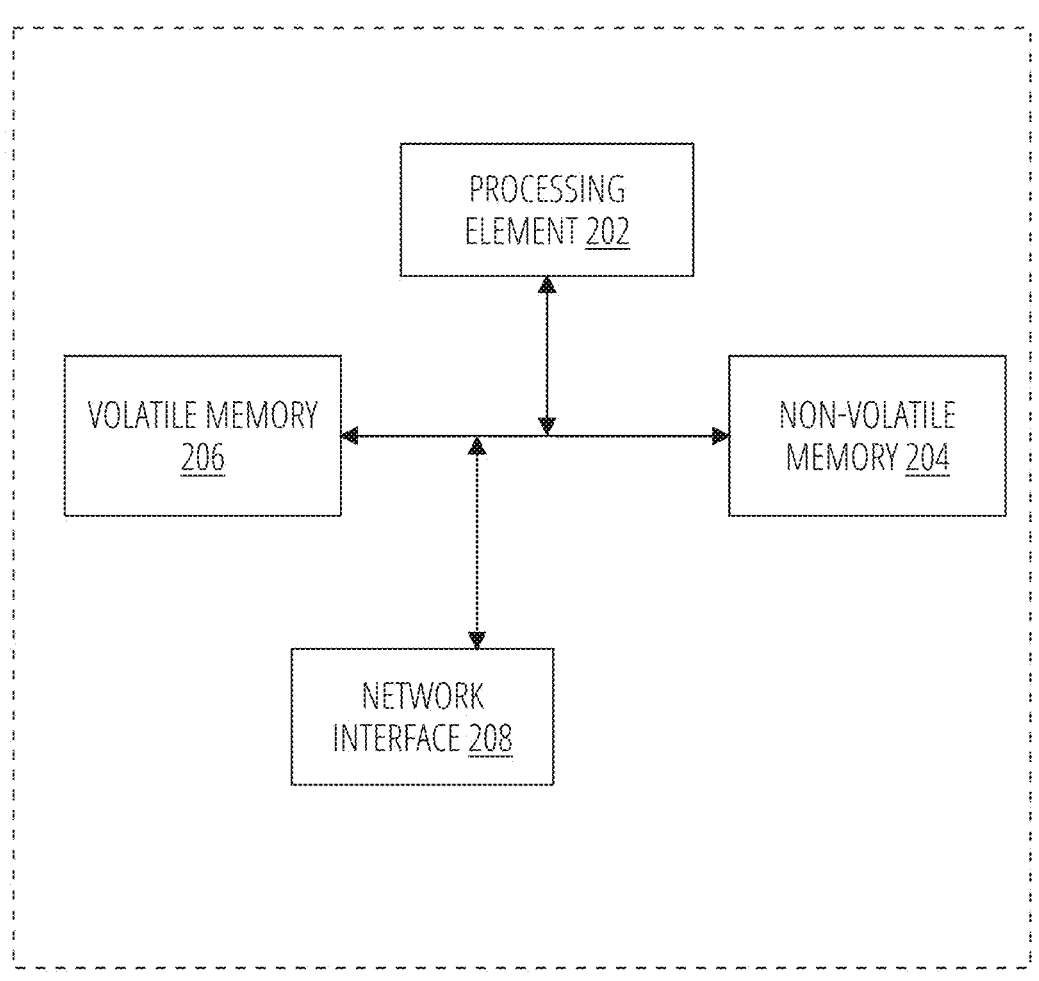

FIG. 2 is an example schematic of a computing platform 200 in accordance with one or more embodiments of the present disclosure. A computing platform 200, such as the centralized key exchange platform 102, the member platforms 106, and/or the like, may comprise, or be in communication with, one or more processing elements 202 (also referred to as processors, processing circuitry, and/or similar terms used herein interchangeably) that communicate with other elements within the computing platform 200 via a bus, for example. As will be understood, the processing element 202 may be embodied in a number of different ways.

For example, the processing element 202 may be embodied as one or more complex programmable logic devices (CPLDs), microprocessors, multi-core processors, co-processing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In some embodiments, the computing platform 200 comprises, or is in communication with, non-volatile memory 204 (also referred to as non-volatile storage, media, memory storage, memory circuitry, and/or similar terms used herein interchangeably). In some examples, the non-volatile memory 204 may comprise one or more non-volatile storage or memory media, comprising, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memory 204 may store data, databases, database instances, database management systems, files, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing platform 200 comprises, or is in communication with, volatile memory 206 (also referred to as volatile storage, media, memory storage, memory circuitry, and/or similar terms used herein interchangeably). In some examples, the volatile memory 206 may also comprise one or more volatile storage or memory media, comprising, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memory 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain aspects of the step/operation of the computing platform 200 with the assistance of the processing element 202 and operating system.

As indicated, in one embodiment, the computing platform 200 may also comprise one or more network interfaces 208 for communicating with various computing entities (e.g., one or more components of FIG. 1), such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing platform 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing platform 200 may comprise, or be in communication with, one or more input elements, such as a keyboard input, a mouse input, a touch screen/display input, motion input, movement input, audio input, pointing device input, joystick input, keypad input, and/or the like. The computing platform 200 may also comprise, or be in communication with, one or more output elements (not shown), such as audio output, video output, screen/display output, motion output, movement output, and/or the like.

As indicated, the computing platform 200 may be an example of one or more of the components of FIG. 1, such as the centralized key exchange platform 102 and/or the member platforms 112*a-c*.

b. Example Client Device

Figure 3:
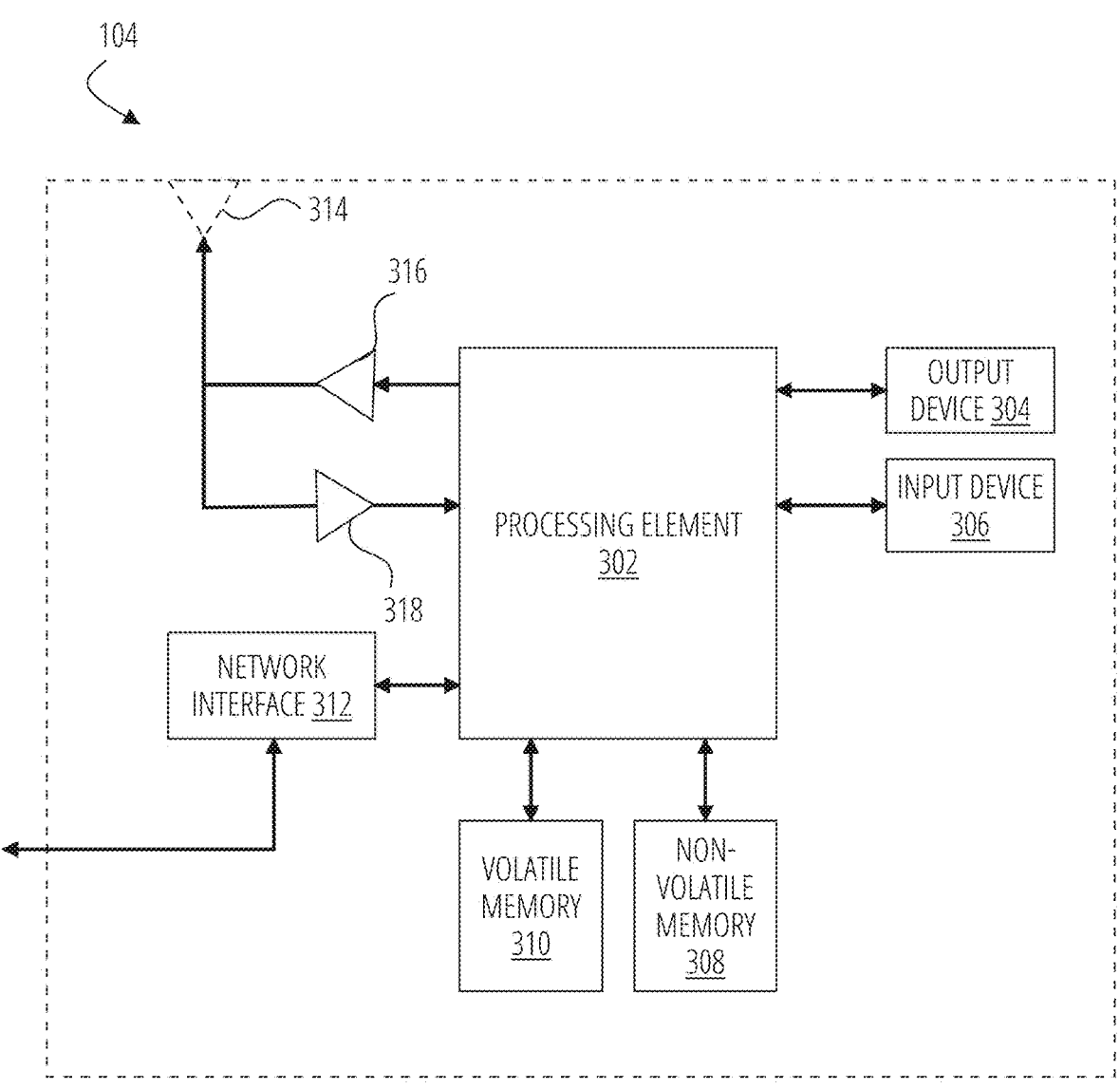
FIG. 3 is an example schematic of a client device in accordance with one or more embodiments of the present disclosure.

FIG. 3 is an example schematic of a client device 104 in accordance with one or more embodiments of the present disclosure. A client device 104 may be operated by various entities, and an example computing ecosystem may comprise one or more client devices 104. For example, a client device 104 may be associated with, owned by, operated by, and/or the like by a member platform and/or one or more end users that may be affiliated with or unaffiliated with a member platform. In various embodiments, an end user of a client device 104 may engage in a value exchange with one or more member platforms affiliated with the centralized key exchange platform. As described herein, the user may do so by leveraging one or more functionalities provided by any centralized key exchange platform through user input with the client device 104.

A client device 104 may comprise a hardware component that is accessible to an end user, such as personal computing device, smartphone, tablet, laptop, personal digital assistant, card reader, point of sale (POS) system, and/or the like. In any embodiments, the client device 104 may comprise one or more communication mechanisms, such as an antenna 312, a transmitter 304 (e.g., radio), a receiver 306 (e.g., radio), and/or the like, one or more processing elements 308 (e.g., CPLDs, microprocessors, multi-core processors, co-processing entities, ASIPs, microcontrollers, and/or controllers), and/or the like, and/or one or more memory mechanisms, such as the volatile memory 322 and/or the non-volatile memory 324. In some examples, the memory mechanisms and/or processing elements 308 may provide signals to and/or receive signals from the communication mechanisms to facilitate a network exchange between the client device 104 and one or more computing platforms.

The signals provided to and received from the transmitter 304 and the receiver 306, respectively, may comprise signaling information/data in accordance with air interface standards of applicable wireless systems. In this regard, the client device 104 may be capable of operating with one or more air interface standards, communication protocols, modulation types, and access types. More particularly, the client device 104 may operate in accordance with any of a number of wireless communication standards and protocols, such as those described above with regard to the computing platform 200. In a particular embodiment, the client device 104 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 104 may operate in accordance with multiple wired communication standards and protocols, such as those described above with regard to the computing platform 200 via a network interface 320.

Via these communication standards and protocols, the client device 104 may communicate with a computing platform 200 using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 104 may also download changes, add-ons, and updates, for instance, to its firmware, software (e.g., comprising executable instructions, applications, program modules), and operating system.

In some embodiments, the client device 104 comprises location determining aspects, devices, modules, functionalities, and/or similar words used herein interchangeably. For example, the client device 104 may comprise outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, comprising Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client device 104 in connection with a variety of other systems, comprising cellular towers, Wi-Fi access points, and/or the like. Similarly, the client device 104 may comprise indoor positioning aspects, such as a location module adapted to acquire, for example, latitude, longitude, altitude, geocode, course, direction, heading, speed, time, date, and/or various other information/data. Some of the indoor systems may use various position or location technologies comprising RFID tags, indoor beacons or transmitters, Wi-Fi access points, cellular towers, nearby computing devices (e.g., smartphones, laptops) and/or the like. For instance, such technologies may comprise the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

In some embodiments, the client device 104 may comprise a user interface 316 (e.g., a display screen, a speaker, a tactile mechanization, etc. coupled to a processing element 308) and/or a user input interface 318 (e.g., a touch screen, a microphone, etc. coupled to a processing element 308). For example, the user interface 316 may be a present one or more application screens presented by one or more computing platforms described herein. The user input interface 318 may comprise any of a number of devices or interfaces allowing the client device 104 to receive data, such as a keypad (hard or soft), a touch display, voice/speech or motion interfaces, or other input device. In examples comprising a keypad, the keypad may comprise (or cause display of) the conventional numeric (0-9) and related keys (#, *), and other keys used for operating the client device 104 and may comprise a full set of alphabetic keys or set of keys that may be activated to provide a full set of alphanumeric keys. In addition to providing input, the user input interface may be used, for example, to activate or deactivate certain functions, such as screen savers and/or sleep modes.

The client device 104 may also comprise volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the client device 104. As indicated, this may comprise a requester application, service provider application, and/or the like that is resident on the client device 104 and/or accessible through a browser or other user interface for communicating with a computing platform 200.

In some embodiments, the client device 104 may comprise one or more components or functionality that are the same or similar to those of a computing platform 200, as described in greater detail above. As will be recognized, these architectures and descriptions are provided for example purposes only and are not limited to the various embodiments.

In various embodiments, the client device 104 may be embodied as an artificial intelligence (AI) computing entity, such as an Amazon Echo, Amazon Echo Dot, Amazon Show, Google Home, and/or the like. Accordingly, the client device 104 may be configured to provide and/or receive information/data from an end user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

c. Example Networks

In some embodiments, any two or more of the illustrative components of the computing ecosystem 100 of FIG. 1 may be configured to communicate with one another via respective communicative couplings to one or more networks 120. The networks 120 may comprise, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 120 may have any suitable communication range associated therewith and may comprise, for example, global networks (e.g., the Internet), MANs, WANs, LANs, or PANs. In addition, the networks 120 may comprise any type of medium over which network traffic may be carried comprising, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

c. Example Nodal Key Mapping Structure

Figure 4:
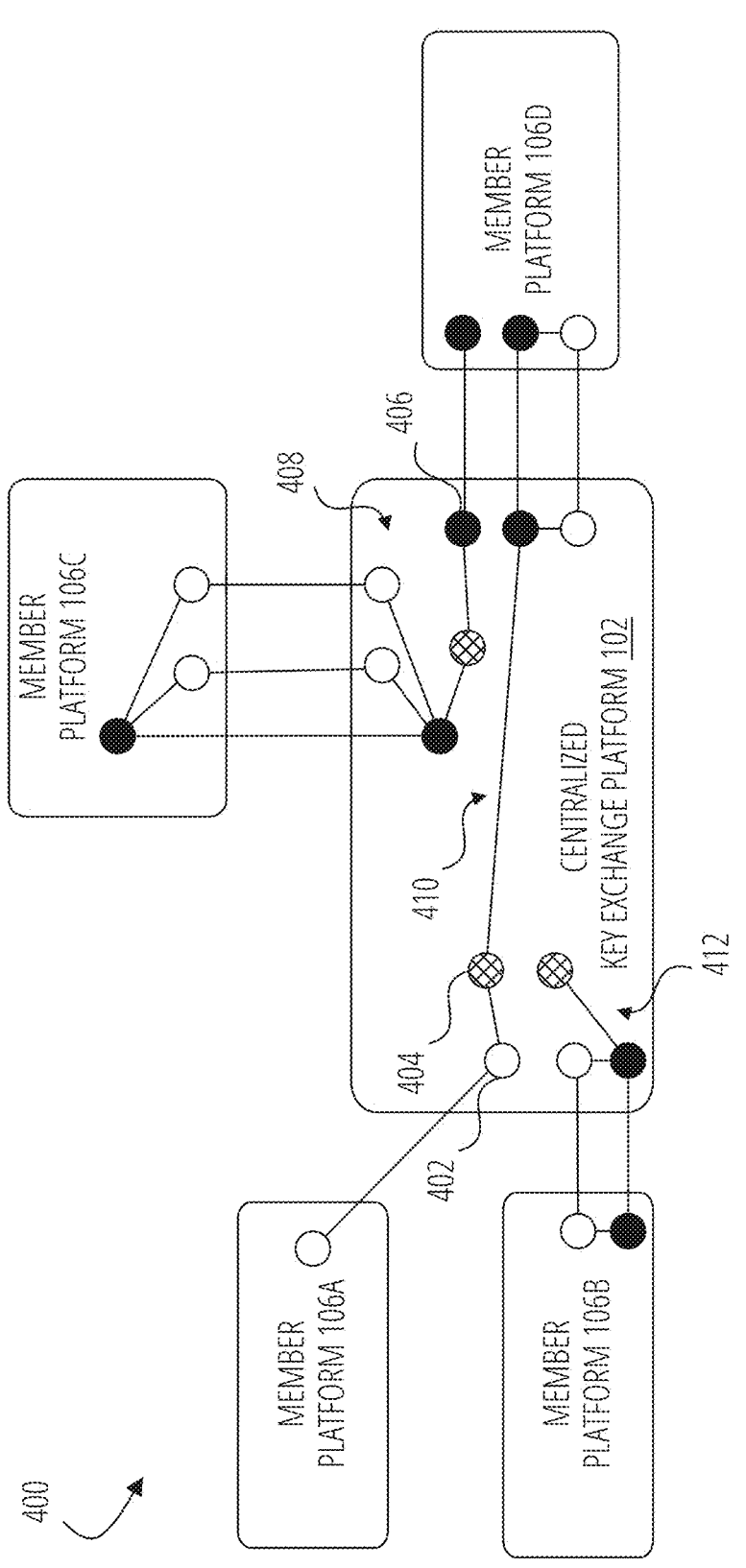
FIG. 4 is a diagram of an example nodal key mapping structure in accordance with one or more embodiments of the present disclosure.

FIG. 4 is a diagram of an example nodal key mapping structure 400 in accordance with one or more embodiments of the present disclosure. The nodal key mapping structure 400 may be facilitated by the centralized key exchange platform 102 by exchanging keys with a set of member platforms 106A-D through one or more linking and/or registration processes described herein.

In some embodiments, up to each of a set of nodes, and/or data objects, is arranged within a graph, and/or hierarchical, structure that defines a node, or data object, as a set of identifiers, including references, keys, partitions, as described herein. Nodes, and/or data objects, within the graph, and/or hierarchical, structure may be linked through shared identifiers, such as cross-platform keys, to create a federated identity for an entity that relates identifiers for one entity through links within the graph, or hierarchical, structure rather than grouping the identifiers with respect to a single set of persistent credentials. This may improve network security by separating a traditionally single attack vector across a set of disparate nodes, or data objects, within a distributed graph structure. In addition, the links within the graph, and/or hierarchical, structure may be generated anonymously, through a linking process as described with reference to FIG. 8, without relying on identifiable information for a user, or a relationship of the user. Instead, the nodes, and/or data objects of the graph, and/or hierarchical, structure may be linked through affirmative interactions with the centralized key exchange platform 102. This allows one user to link and later leverage different relationships within the centralized key exchange platform 102 without exposing any credential or personally identifiable information (PII). Through the linking process, in some cases, a user may link all of their relationships across different member platforms 106A-D, which may create a single parent, cross-platform data object 404 that may functionally operate as a federated identity for the user. In other cases, a user may create subsets of linked relationships that may result in multiple cross-platform data objects for a single user. Due to the anonymity of the linking process, the multiple cross-platform data objects may functionally operate as different, unconnected identities of a user, allowing the user control over how, when, and to what extent relationships may be merged within a centralized ecosystem.

In some examples, up to each node, and/or data object, within the graph, and/or hierarchical, structure may correspond to an entity that is registered and/or linked within the centralized key exchange platform 102. An entity may comprise an anonymized data element that may be directly or indirectly mapped to an actionable data element within one of the member platforms 106A-D. For example, an entity may comprise a user data element that may be mapped to a user associated with one of the member platforms 106A-D, a relationship data element that may be mapped to a relationship between the user and the one of the member platforms 106A-D, or an cross-platform data element that may be indirectly and anonymously linked to the user and/or the relationship through the linking process of the present disclosure.

In some examples, a node, and/or data object, may correspond to a single data element. For example, a set of nodes, and/or data objects, within the centralized key exchange platform 102 may comprise one or more relationship nodes 402 (e.g., illustrated as white circles in FIG. 4), and/or relationship data objects, that each correspond to a relationship between a user and one of the member platforms 106A-D that is registered or linked within the centralized key exchange platform 102. As another example, the set of nodes, and/or data objects, within the centralized key exchange platform 102 may comprise one or more user nodes 406 (e.g., illustrated as black circles in FIG. 4), and/or user data objects, that each correspond to a user associated with one of the member platforms 106A-D that is registered or linked within the centralized key exchange platform 102. As yet another example, the set of nodes, and/or data objects, within the centralized key exchange platform 102 may comprise one or more cross-platform nodes 404 (e.g., illustrated as checkered circles in FIG. 4), and/or cross-platform data objects, that may comprise linking mechanisms for linking one or more user and/or relationship nodes, and/or data objects, within the centralized key exchange platform 102.

With respect to the relationship nodes 402, and/or relationship data objects, each node and/or data object may correspond to one of a set of different relationships supported by a member platform 106 and/or the centralized key exchange platform 102. By way of example, the relationship nodes 402, and/or relationship data objects, may comprise a requester relationship that represents a relationship between a requester platform and a user, a provider relationship that represents a relationship between a provider platform and the user, and/or the like. The requester relationship, for example, may comprise a user profile on a software application hosted by the requester platform, a loyalty account with the requester platform, a membership with the requester platform, and/or the like. The provider relationship may comprise a user account (e.g., bank account, credit line, point system, repository access privilege level) with the provider platform, and/or the like.

Up to each relationship may be represented by a member key that comprises a unique relationship identifier and a partition identifying the member platform associated with the relationship. The member key may be stored in a graph node, or data object, with one or more system identifiers associated with the relationship, such as a system user identifier corresponding a user reference provided by a member platform 106, a system relationship identifier corresponding to a relationship reference provided by a member platform 106, one or more relationship-specific rulesets, and/or the like.

In some examples, during a linking process, the centralized key exchange platform 102 may establish relationships by leveraging existing nodes within the graph structure. For example, a user associated with a relationship maintained by a member platform may leverage the established relationship to establish a new relationship with another member platform. In such a case, a new node may be generated with a new key, such as a cross-platform key, representing the new relationship, or an existing node with an existing key may be modified to link the two relationships. For example, an existing cross-platform node 404, and/or cross-platform data object, may be modified to add keys (and/or other identifiers) from the relationship nodes 402, and/or relationship data objects, corresponding to the linked relationships. In addition, or alternatively, a cross-platform key may be added to the relationship nodes 402, and/or relationship data objects. In this manner, the linked nodes, and/or data objects, may be linked through an intermediary cross-platform node 404, and/or data object, to link relationships across different member platforms. By doing so, the nodal key mapping structure 400 of the centralized key exchange platform 102 may generate, maintain, and leverage cross-platform relationships that link relationships across different value systems, platform, instruments, and/or the like.

In the example provided by FIG. 4, the centralized key exchange platform 102 may comprise a set of nodes that correspond to one or more different member platforms. Up to each node may comprise a data object that may store a set of identifiers for anonymously linking one or more relationships within the centralized key exchange platform 102. The data objects may comprise a relationship data object (e.g., relationship node 402), a user data object (e.g., user node 402), and/or a cross-platform data object (e.g., cross-platform node 404).

In some embodiments, a user data object comprises a data entity that anonymously represents a user of one of a set of member platforms 106A-D. A user data object may comprise a system container within the centralized key exchange platform 102 that may be used to anonymously represent a user of a member platform 106. For example, the user data object may comprise one or more referential keys and/or identifiers that may correspond to a corresponding data element within a member platform to enable the centralized key exchange platform 102 to reference the data element without persistent credentials or other independently recognizable credentials.

By way of example, the user data object may comprise one or more identifiers or parameters for the user that may represent the user to the member platform without exposing any user credentials or sensitive user information. For example, the one or more identifiers may comprise a member partition, a user reference, a system user identifier, a user key, and/or the like. The member partition may comprise a unique identifier (e.g., a six digit identifier) that is generated for a member platform during a registration process. The user reference may comprise a unique identifier that is generated by a member platform 106 and provided to the centralized key exchange platform 102 during a registration process. The system user identifier may comprise a unique identifier generated by the centralized key exchange platform 102 and stored in association with the user reference. By way of example, the user identifier may comprise a universally unique identifier (UUID) that may be generated by the centralized key exchange platform 102 during the registration process. The user key may comprise a wrapped user identifier that may be generated by the centralized key exchange platform 102 and provided to a member platform 106 during the registration process. The user key, for example, may comprise a user identifier that is wrapped with a member partition corresponding to the member platform associated with the user.

In addition, or alternatively, the user data object may comprise one or more user parameters for the user. The user parameters, for example, may comprise anonymized, generalized, encrypted, and/or partially obfuscated user attributes that may be provided by the member platform. For example, the user parameters may comprise an age band (e.g., 1-4, 5-12, 13-17, 18-20, 21-29, 30-39, 40-49) that provides a categorical age class (e.g., toddler, adolescent, teenager) for determining an age restriction for a user without explicit age information (e.g., a birthday). By way of example, an age band may comprise (i) an underage band indicative of a user as under 18 years of age, (ii) a first partial underage band indicative of a user that is over 18 but under 19 years of age, (iii) a second partial underage band indicative of a user that is over 19 but under 21 years of age, and (iv) an unrestricted band indicative of a user that is over 21 years of age. In this manner, a user attribute may reflect age related information for a user without exposing sensitive user information, such as a user's birth date. Other examples of user parameters may comprise a geographic region that provides a categorical region class for determining a user's location without explicit geographic information (e.g., a home address), membership class for determining a user's privileges without explicit access information, and/or the like.

In some embodiments, a relationship data object comprises a data entity that represents a relationship between a user and one of a set of member platforms 106A-D. A relationship data object may comprise a system container within the centralized key exchange platform 102 that may be used to anonymously represent a relationship of a member platform 106. For example, the relationship data object may comprise one or more referential keys and/or identifiers that may correspond to a corresponding data element within a member platform to enable the centralized key exchange platform 102 to reference the data element without persistent credentials or other independently recognizable credentials.

By way of example, the relationship data object may comprise one or more identifiers for the relationship that may represent the relationship to the member platform without exposing any relationship credentials or sensitive relationship information. For example, the one or more identifiers may comprise a member partition, a relationship reference, a system relationship identifier, and/or a relationship key. The relationship reference may comprise a unique identifier that is generated by a member platform 106 and provided to the centralized key exchange platform 102 during a registration process. The system relationship identifier may comprise a unique identifier generated by the centralized key exchange platform 102 and stored in association with the relationship reference. By way of example, the relationship identifier may comprise a UUID that may be generated by the centralized key exchange platform 102 during the registration process. The relationship key may comprise a wrapped relationship identifier that may be generated by the centralized key exchange platform 102 and provided to a member platform 106 during the registration process. The relationship key, for example, may comprise a relationship identifier that is wrapped with a member partition corresponding to the member platform associated with the relationship.

In addition, or alternatively, the relationship data object may comprise one or more relationship parameters for the relationship. The relationship parameters, for example, may comprise anonymized, generalized, and/or partially obfuscated user attributes that may be provided by the member platform. For example, the relationship parameters may comprise an instrument type (e.g., credit, debit, loyalty points) that provides a categorical instrument class for determining a modality of a relationship, a member policy type (e.g., restriction or benefits for using an instrument of the relationship, and/or the like.

In some embodiments, a cross-platform data object comprises a data entity that represents a potential link within the centralized key exchange platform 102. A cross-platform data object, for example, may comprise a system container within the centralized key exchange platform 102 that may be used to anonymously link one or more relationships. For example, the cross-platform data object may comprise one or more referential keys and/or identifiers that may correspond to one or more relationship data objects, user data objects, and/or other data objects within the centralized key exchange platform 102. By way of example, the cross-platform data object may comprise one or more relationship keys (and/or identifiers), one or more user keys (and/or identifiers), and/or the like.

The set of nodes depicted by FIG. 4 represent one or more different types of links that may be managed by the centralized key exchange platform 102.

For example, a first set 408 of nodes, and/or data objects, may comprise a provider-provider link between relationships of two provider platforms (e.g., a service provider platform and/or value provider platform). The link, for example, may be defined by a cross-platform data object that connects a user, and one or more relationships associated with the member platform 106C to another user associated with the member platform 106D. The user data objects associated with the link may correspond to different representations of the same user that may be registered differently by the member platform 106C and the member platform 106D. By linking the two user data objects, the centralized key exchange platform 102 may represent the user to each of the member platforms 106C-D using references respectively recognized by the member platforms 106C-D.

As another example, a second set 410 of nodes, and/or data objects, may comprise a requester-provider link between relationships of provider and requester platforms. The link, for example, may be defined by a cross-platform data object that connects a requester relationship associated with the member platform 106A to a user and/or relationship of another member platform 106D. By linking the data objects, the centralized key exchange platform 102 may connect a provider relationship to a requester relationship, which, as described in further detail herein, may enable automated and anonymous network exchanges between the two platforms.

As another example, a third set 412 of nodes, and/or data objects, may comprise a single entity link for a relationship. The link, for example, may be defined by a cross-platform data object that connects a user and/or relationship of a single member platform 106B. The cross-platform data object may provide a basis for linking the user and/or relationship of a single member platform 106B to other relationships and/or users through the linking operations of the present disclosure. In some examples, up to each user and/or relationship within the centralized key exchange platform 102 may be associated with a cross-platform data object. Thus, unlinked relationships associated with the same user that are represented by different user identifiers across different member platforms may result in multiple cross-platform data objects for the same, underlying user. As the user affirmatively links relationships within the centralized key exchange platform 102, a single cross-platform data object may develop that holistically represents the user underlying a set of different relationships. In this way, the nodes, and/or data objects, within the graph, and/or hierarchical, data structure may represent a set of complex relationships maintained by the centralized key exchange platform 102 that may increase in complexity as a user affirmatively links relationships across member platforms 106A-D.

d. Example Value Exchange System

Figure 5:
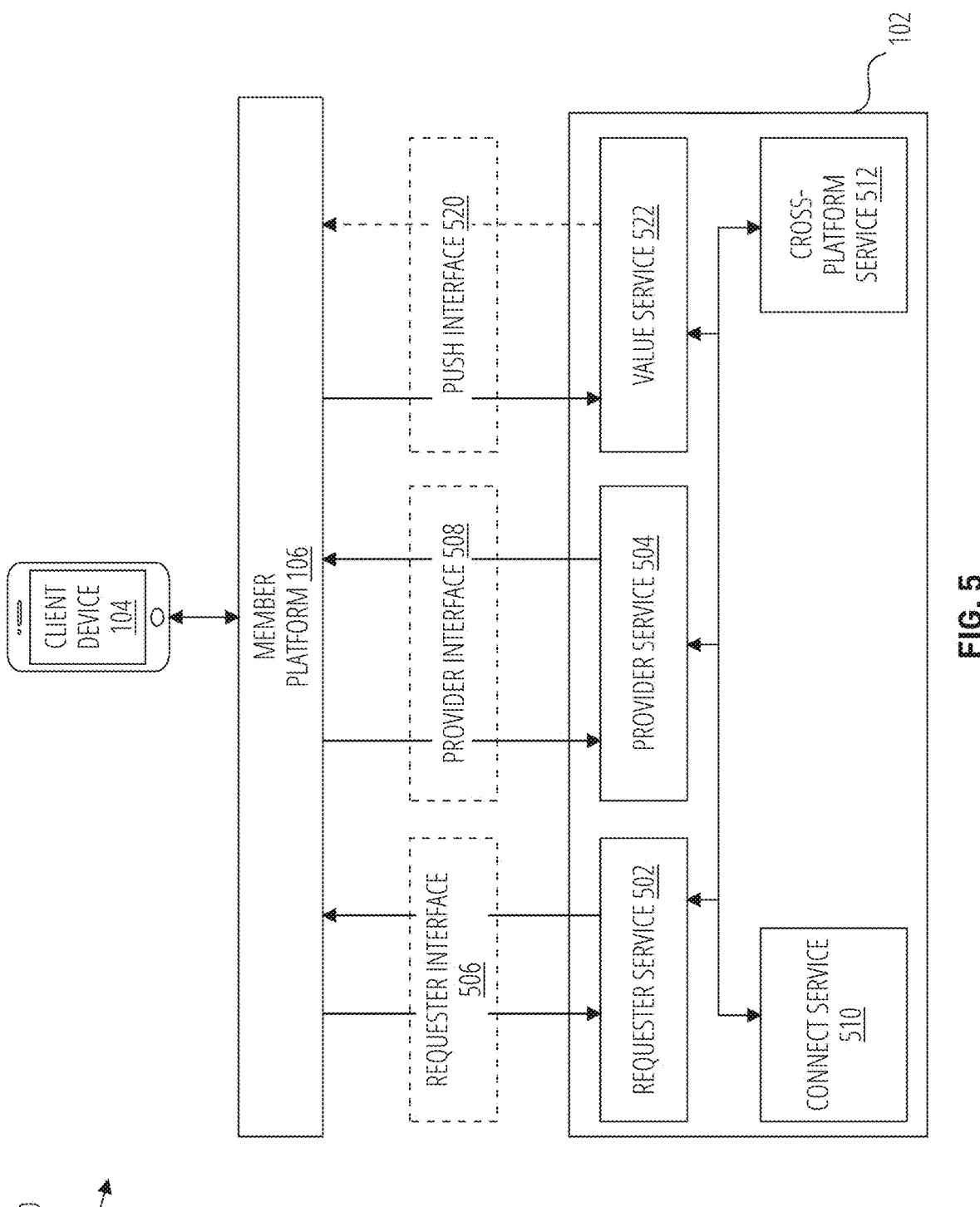
FIG. 5 is an example block diagram of an example key exchange system in accordance with one or more embodiments of the present disclosure.

FIG. 5 is an example block diagram of an example key exchange system 500 in accordance with one or more embodiments of the present disclosure. The key exchange system 500 comprises a new computing ecosystem and computing platforms that provide an end-to-end key exchange solution to replace traditional network-based exchanges that rely on persistent credentials subject to security risks. As described herein, the key exchange system 500 may implement a key exchange infrastructure to exchange information, currency, and/or any other data within a value system agnostic framework and may be applied to any network exchange comprising, as examples, information-based exchanges, financial-based exchanges, reputation-based exchanges, healthcare-based exchanges, benefit-based exchanges, and/or the like. In any value system, the key exchange system 500 may leverage an intermediary entity (e.g., the centralized key exchange platform 102) and one or more defined communication interfaces (e.g., a requester interface 506, provider interface 508, connect interface 518, push interface 520) to facilitate a network-based exchange between a value seeking entity (e.g., a requester) and a value providing entity (e.g., a service or value provider) that may be associated with one or more member platforms of the key exchange system 500.

As depicted, the key exchange system 500 may comprise a centralized key exchange platform 102, a member platform 106, and, in some cases, a client device 104. The centralized key exchange platform 102 may communicate with the member platform 106 using one or more different communication interfaces depending on the role of the member platform 106 for a particular network communication. For example, a member platform 106 may play a requester role, service provider role, or a value provider role. In some examples, a user may interact with the member platform 106, as a requester, service provider, and/or value provider, through a client device 104.

In some embodiments, a member collaborates with the centralized key exchange platform 102 to take part in a network exchange as a requester (e.g., a requester platform) or a service provider (e.g., provider platform), or a value provider (e.g., a value platform). As examples, a member may comprise one or one or more combinations of (i) a requester that utilizes the centralized key exchange platform 102 to receive value (e.g., in terms of currency, information, medical benefits), (ii) a service provider that utilizes the centralized key exchange platform 102 to provide access to an instrument, and/or (iii) a value provider that utilizes the centralized key exchange platform 102 to push value to other members within the ecosystem. As used herein, a member may be referred to as a requester when it receives value through a network communication, a service provider when it provides access to an instrument, or value provider when it pushes value to the network. Thus, the same member may be a requester, service provider, or value provider depending on the role of the member in a communication. For example, a member may be a requester that receives value for a network exchange. The same member may be a service provider that provides access to an instrument in another value exchange. The same member may be a value provider that pushes value in another value exchange. In some examples, the same member may be one or more combinations of the requester, service provider, or value provider in the same network exchange, such that the member utilizes the centralized key exchange platform 102 to provide and then receive value in a sole member network exchange.

In some embodiments, a member is a requester when it utilizes an instrument provided by a service provider. A requester may comprise any value seeking entity in any value system. As an example, in a financial value system, a requester may comprise a merchant (e.g., retailer, brick-and-mortar establishment) that may utilize a service provider, such as a financial institution, to access funds for a financial transaction. In addition, or alternatively, in an information value system, a requester may comprise a news publisher (e.g., a newspaper, media organization) that may utilize a service provider, such as a news agency (e.g., wire service, news service) to access information for an information exchange. In a healthcare value system, a requester may comprise a healthcare provider that may access a healthcare benefits administrator to access medical benefits for authorizing a medical operation. In a Know Your Customer (KYC) use case, a requester may comprise an unaffiliated platform that may request a verification of a user's identity from another platform that is already affiliated with the user. As will be understood, the techniques of the present disclosure may be applied to network communications applied in any value system and the requester may comprise any value seeker for any respective value system.

In some embodiments, a member is a service provider when it provides a service for a requester. A service provider may comprise a source of value in any value system. As an example, in a financial value system, a service provider may comprise a financial institution (e.g., bank, currency exchange, credit union) that may provide access to funds for a financial transaction between one or more entities. In addition, or alternatively, in an information value system, a service provider may comprise a news agency (e.g., wire service, news service) that may source information for publication by a news publisher. In a healthcare value system, a service provider may comprise a healthcare benefits administrator that may authorize medical procedures for a user and a healthcare provider. In a KYC use case, a service provider may comprise an affiliated institution with an established relationship with a user. As will be understood, the techniques of the present disclosure may be applied to network communications applied in any value system and the service provider may comprise any service provider for any respective value system.

In some embodiments, a service provider maintains one or more instruments that define a set of services available to an associated user. An instrument, for example, may comprise a virtual mechanism leveraged by a service provider for providing (and/or defining the metes and bounds of) value on behalf of a particular user. The instrument may depend on the value system and/or service provider. In some examples, the instrument may comprise an account with the service provider. For example, in a financial value system, an instrument may comprise a bank account (e.g., checking, saving), brokerage account, line of credit, and/or the like. In an information value system, the instrument may comprise a subscriber account, and/or the like. In a healthcare value system, the instrument may comprise a health care benefits account, and/or the like. In a KYC use case, an instrument may comprise a verified user account. In such a case, the value provided by the service provider may comprise information or the verification of information for an affiliated user.

In some embodiments, a member is a value provider when it pushes value for use by one or more different member platforms and/or users thereof. A value provider, for example, may comprise a source of value, in any value system, that is associated with multiple users (as opposed to an instrument which is associated with a single user). As an example, in a financial value system, a value provider may comprise a third-party clearing house that issues coupons for one or more different interactions. In addition, or alternatively, in an information value system, a value provider may comprise a fact checking third party that may verify source information before publication by a news publisher. In a healthcare value system, a value provider may comprise a coordination of benefits orchestration service that may prioritize data for access to medical benefits for a healthcare provider. As will be understood, the techniques of the present disclosure may be applied to any value system and the service provider may comprise any source of value for any respective value system.

In some examples, both a value provider and/or a service provider may provide value on behalf of a user. A value provider may asynchronously push value with respect to communication processing operations of the centralized key exchange platform 102. The service provider may provide value at a particular time and/or in response to a network communication. For example, a service provider may authorize an exchange, whereas a value provider may only modify a value of an exchange.

By way of example, a service provided by a service provider may be subject to one or more policies, value modifiers, and/or the like, that may enhance and/or constrain the service provided by the service provider. The one or more policies, value modifiers, and/or the like may be defined by an instrument of the service provider and/or a value modifier of a value provider. For instance, a service provider may be associated with one or more member policies for validating the use of a service provider instrument maintained by the service provider. In addition, or alternatively, a service provider may be associated with one or more first- or third-party modifiers, defined by one or more value providers, for modifying the use of a service provider instrument maintained by the service provider. The member policies and/or first- or third-party modifiers may be maintained by the service provider or an associated requester or value provider.

For example, a service provider and/or an instrument thereof may be associated with an entity that governs the use of one or more services provided by the service provider. By way of example, the service provider may facilitate an electronic benefit transfer (EBT) system, such as supplemental nutrition assistance program ("SNAP"), temporary assistance for needy families ("TANF"), special supplemental nutrition program for women, infants, and children ("WIC"), and/or the like, that provides financial aid for authorized food and household items. As another example, the service provider may facilitate a healthcare plan on behalf of a health care provider that restricts benefits according to healthcare eligibility, procedure codes, procedure location, and/or the like.

In addition, or alternatively, a service provider may govern the use of its own services. For instance, the service provider may maintain an instrument for a user of the service provider. The service provider may restrict the instrument on behalf of the user, on behalf of one or more internal policies, and/or the like. By way of example, the service provider may comprise a financial institution that allows one or more users to restrict access to funds provided by the financial institution. In this manner, a user may provide limited access to an instrument by establishing one or more member policies for an instrument.

As another example, a service provider, a requester, or a value provider may manage a loyalty program that accrues loyalty credit for a user. The loyalty credit may be used to modify a value requested by the requester and/or a value provided by a service provider depending on the use case.

A service provider, a requester, and/or value provider may communicate through one or more respective member platforms 106 that are respectively associated with the entities. As one example, a service provider may be associated with a provider platform, a requester may be associated with a requester platform, and a value provider may be associated with a value provider platform, as depicted in FIG. 1. Up to each of these platforms may comprise variations of the member platform 106 and may communicate with the centralized key exchange platform through one or more pre-configured interfaces (e.g., application programming interfaces (APIs)), such as the requester interface 506 for the requester platform, a provider interface 508 for the service provider platform, and/or a push interface 520 for the value provider platform.

In some embodiments, the member platform 106 is a computing entity corresponding to a member associated with the centralized key exchange platform 102. The member platform 106 may comprise a requester platform acting on behalf of a requester, a provider platform acting on behalf of a service provider, a value platform acting on behalf of a value provider, and/or any combination thereof. In some examples, a member platform 106 may be the requester platform, the provider platform, and a value platform. For example, the same member platform 106 may be configured to operate on behalf of a requester for one network communication, a service provider for another network communication, and/or a value provider for a third network communication. In some examples, the same member platform 106 may be configured to operate on behalf of a combination of a requester, service provider, and/or value provider in a single network communication. It is noted that the term member platform 106 may refer to a requester platform, a provider platform, a value platform, or any combination thereof and, in some examples, may depend on the role of the member platform 106 in a network communication (e.g., and/or one or more interfaces utilized by the member platform 106 in the network communication). By way of example, a member platform 106 may use a requester interface 506 while acting as a requester platform, a provider interface 508 while acting as a provider platform, and/or a push interface 520 while acting as a value platform (e.g., by pushing value before the network communication).

In some embodiments, the requester platform is a computing entity that is configured to perform one or more operations on behalf of a requester. The requester platform, for example, may comprise one or more processing devices, memory devices, and/or the like that are physically and/or wirelessly coupled and configured to collectively (and/or individually) perform the one or more computing tasks for requesting data through a network communication. In some examples, the requester platform may comprise, define, and/or otherwise leverage one or more exchange interfaces for facilitating communications (e.g., requests, responses) with the centralized key exchange platform 102. In some examples, the requester platform may be configured to host one or more user-facing applications (e.g., a requester application) for interacting with one or more users.

The requester platform, for example in a financial value system, may host an online marketplace that allows a user to interact (e.g., search, browse, purchase, return) with one or more products or services offered by the requester. In the event of a product purchase, the requester platform may cooperate with one or more service providers to access funds for the purchase, one or more value providers to modify the value and/or authorize the purchase of the products, and/or the like. Traditionally, access to funds from a service provider is facilitated using a card number, account number, and/or another financial credential that (1) may expose a user to malicious parties when transmitted over a network and (2) may be incompatible across different value systems (e.g., points from different loyalty programs). To address network security and data privacy concerns with traditional financial systems (and/or other value-based systems, such as KYC assertions), the requester platform may register with the centralized key exchange platform 102 by configuring one or more software development kits (SDKs), APIs, and/or the like for facilitating communications with the centralized key exchange platform 102. For example, the requester platform may comprise, define, and/or otherwise leverage one or more requester interfaces 506 for facilitating communications (e.g., requests, responses) with the centralized key exchange platform 102.

In some embodiments, the provider platform is a computing entity that is configured to perform one or more operations on behalf of a service provider. A provider platform, for example, may comprise one or more processing devices, memory devices, and/or the like that are physically and/or wirelessly coupled and configured to collectively (and/or individually) perform the one or more computing tasks for providing data through a network communication. In some examples, a provider platform may comprise, implement, and/or otherwise leverage one or more interfaces for facilitating communications (e.g., requests, responses) with the centralized key exchange platform 102. In some examples, a provider platform may be configured to facilitate one or more user-specific instruments. In some examples, the provider platform may be configured to host one or more user-facing applications (e.g., a service provider applications) for managing the one or more user-specific instruments.

In some examples, the provider platform, for example in a financial value system, may maintain one or more financial assets (e.g., lines of credit, bank accounts) that allow a user to fund an exchange for purchasing a product from a requester. In the event of a product purchase, the provider platform may cooperate with requester platform to authorize an exchange and/or otherwise provide access to funds for the purchase. Traditionally, access to funds from the service provider is facilitated by presenting a card number, account number, and/or another financial credential to the provider platform which may expose a user, service provider, or requester to malicious parties, especially when provided over an unsecure network (e.g., public network, and/or the like). To address network security and data privacy concerns with traditional financial systems (and/or other value-based systems, such as KYC assertions), the provider platform may register with the centralized key exchange platform 102 by configuring one or more software development kits (SDKs), APIs, and/or the like for facilitating communications with the centralized key exchange platform 102. For example, the provider platform may comprise, implement, and/or otherwise leverage one or more provider interfaces 508 for facilitating communications (e.g., requests, responses) with the centralized key exchange platform 102.

In some embodiments, the value platform is a computing entity that is configured to perform one or more operations on behalf of a service provider. A provider platform, for example, may comprise one or more processing devices, memory devices, and/or the like that are physically and/or wirelessly coupled and configured to collectively (and/or individually) perform the one or more computing tasks for providing data in a value system agnostic exchange. In some examples, a value platform may comprise, implement, and/or otherwise leverage one or more interfaces for facilitating communications (e.g., requests, responses) with the centralized key exchange platform 102. In some examples, a value platform may be configured to facilitate one or more user-generic instruments. In some examples, the value platform may be configured to host one or more user-facing applications (e.g., a service provider applications) for managing the one or more user-generic instruments.

In some examples, the value platform, for example in a financial value system, may maintain one or more financial modifiers (e.g., coupons) that allow a user to reduce a value of a product during an exchange for purchasing the product from a requester. The value platform may push the financial modifiers to the network to enable the centralized key exchange platform 102 to modify the value of an exchange when an exchange that complies with the financial modifier is initiated. The value platform may register with the centralized key exchange platform 102 by configuring one or more software development kits (SDKs), APIs, and/or the like for facilitating communications with the centralized key exchange platform 102. For example, the value platform may comprise, implement, and/or otherwise leverage one or more value interfaces 520 for facilitating communications (e.g., requests, responses) with the centralized key exchange platform 102.

The centralized key exchange platform 102 may facilitate network communications between the various member platforms within a network by receiving, processing, providing, and/or forwarding messages using interfaces that are configured for a particular role of the member platform 106 in an exchange (e.g., a sequence of messages to achieve an end goal). This allows the centralized key exchange platform 102 to separate and route messages according to their purpose and the identity of the member platform 106. As described herein, each interface may support different functionalities that may be performed on behalf of a member platform 106.

For example, the push interface 520 may enable the centralized key exchange platform 102 to receive value modifiers from a value platform. In some examples, the push interface 520 may define a set of API calls in which a value provider may define one or more use criteria, restrictions, and/or modifiers for authorizing and/or modifying an exchange value during subsequent exchanges. In addition, or alternatively, the push interface 520 may comprise one or more webhooks, and/or define a set of API responses that may cause the centralized key exchange platform 102 to return usage information with respect to one or more value modifiers pushed to the centralized key exchange platform 102.

As another example, a requester interface 506 may enable the centralized key exchange platform 102 to receive a request to initiate an exchange between a requester platform and a service provider platform. In some examples, the requester interface 506 may define a set of API calls in which a requester may define an exchange request. In addition, or alternatively, the requester interface 506 may comprise one or more webhooks, and/or define a set of API response that may cause the centralized key exchange platform 102 to return exchange responses with respect to an exchange request.

As yet another example, a provider interface 508 may enable the centralized key exchange platform 102 to identify and request the use of an instrument for authorizing an exchange request. For example, the provider platform may be configured to facilitate one or more instruments. In some examples, the instrument may comprise a virtual instrument (e.g., virtual account, line of credit, loyalty program) hosted by a provider platform. Through the provider interface 508, a provider platform may register a set of instruments with the centralized exchange platform 102 and, as a result of the registration process, receive and/or maintain a set of member relationship data objects that may correspond (e.g., through a shared key) to a set of system relationship data objects. In response to an exchange request, the centralized key exchange platform 102 may leverage a member relationship data object and the provider interface 508 to provide an exchange authorization request to the provider platform and, in response to the exchange authorization request, receive an exchange authorization response.

In some embodiments, a relationship data object is a data entity that represents a relationship between the centralized key exchange platform 102 and the member platform 106. The relationship data object, for example, may correspond to a registered instrument, an instrument enrolled with a requester platform, a registered loyalty account, and/or any other relationship registered with the centralized key exchange platform 102, as discussed with reference to FIG. 4.

A relationship data object may comprise a software container, or other form of data object, such as an entry within a relational database, and/or the like, that stores data associated with a particular relationship. For example, an instrument-based relationship data object may comprise a set of instrument identifiers and/or instrument attributes. The identifiers and/or attributes may depend on the location of the instrument-based relationship data object. For example, an instrument may be represented in the member platform 106 with an instrument-based member relationship data object that comprises a first set of instrument identifiers and/or instrument attributes. In addition, or alternatively, the instrument may be independently represented by an instrument-based system relationship data object (e.g., the relationship nodes of FIG. 4) in the centralized key exchange platform 102 that comprises a second set of instrument identifiers and/or instrument attributes. In some examples, the first set of instrument identifiers and/or instrument attributes and/or the second set of instrument identifiers and/or instrument attributes may comprise one or more shared identifiers, as described with reference to FIG. 6. The shared identifiers, for example, may comprise keys exchanged by the centralized key exchange platform 102 to secure network communications using an instrument referenced by the instrument-based relationship data objects.

As discussed throughout this disclosure, an instrument-based relationship data object is just one example of a set of different types of relationship data objects that may be created, maintained, and stored within the centralized key exchange platform 102 and member platform 106 to facilitate network exchanges. In some examples, the network exchanges may be initiated through interactions with a client device 104. For example, a member platform 106 may be associated with a user-facing application for facilitating one or more interactions with a user and/or other affiliated entity (e.g., through the client device 104).

In some embodiments, the user-facing application is a computer program hosted by a computing entity for facilitating one or more user interactions. A user-facing application may comprise software (e.g., computer readable instructions) designed to perform one or more computing tasks for a computing entity, such as the member platform 106. For instance, a user-facing application may facilitate communication between a member and a user. As examples, the user-facing application may be configured to present one or more user interfaces, via the client device 104, for interacting with a user on behalf of a member. In some examples, the user-facing application may be configured to receive user input, via the one or more user interfaces, to receive information from a user.

In some embodiments, a user-facing application is a requester application that is hosted by the requester platform (e.g., a member platform 106 acting as a requester for a particular exchange) to facilitate functions for a requester. A requester application may comprise software (e.g., computer readable instructions) designed to perform one or more computing tasks for a requester. In some examples, the requester application may be configured with one or more devices (e.g., point of sale terminals) from a standalone requester establishment (e.g., a brick and mortar store, bank). For instance, a requester application may be configured to present one or more user interfaces for interacting (e.g., browsing, purchasing, reviewing) with one or more products offered by a retail-based requester, one or more units of information offered by an information-based requester, and/or the like. In some examples, the requester application 416 may be configured to receive user input to receive information from a user.

In some embodiments, the provider platform is configured to host one or more service provider applications for managing one or more service provider instruments. For example, a user-facing application may be a service provider application that is hosted by the provider platform (e.g., a member platform 106 acting as a service provider for a particular exchange) to facilitate functions for the service provider. In some examples, the service provider application may be configured with one or more devices from a standalone service provider establishment (e.g., a bank, loyalty program). A service provider application may comprise software (e.g., computer readable instructions) designed to perform one or more computing tasks for a service provider. For instance, a service provider application may be configured to present one or more user interfaces for interacting (e.g., reviewing, managing, auditing, enrolling) with one or more service provider instruments facilitated by the service provider. By way of example, in a financial value system, the service provider application may enable access to a bank account, brokerage account, line of credit, and/or the like, to manage funds, assets, and/or the like, handled by the respective accounts. In some examples, the service provider application may be configured to receive user input to receive information, authorizations, and/or the like from a user.

In some embodiments, the centralized key exchange platform 102 facilitates communication between members using one or more different interfaces, such as the requester interface 506, the provider interface 508, and/or the push interface described herein. In some embodiments, an exchange interface is a set of instructions for facilitating communications between the centralized key exchange platform 102 and one or more member platforms 106 and/or internal services of the centralized key exchange platform 102 (e.g., recipient service 502, provider service 504, value service 522, connect service 510, cross-platform service 512). An exchange interface may comprise an API, file based interface, a message queue based interface, and/or the like. For instance, an exchange interface may comprise an API comprising, as examples, one or more simple object access protocol (SOAP) APIs, one or more remote procedure call (RPC) APIs, one or more websocket APIs, one or more representational state transfer (REST) APIs, and/or the like. In some embodiments, an exchange interface may comprise one or more RPC APIs, such as one or more gRPC APIs.

The centralized key exchange platform 102 may comprise, define, and/or otherwise leverage one or more different exchange interfaces for facilitating communications with one or more external platforms, such as the member platform 106. Each interface may comprise a plurality of communication instructions, message definitions, and/or the like for exchanging requests, responses, informational pushes, and/or the like between the centralized key exchange platform 102 and a member platform 106.

The centralized key exchange platform 102 may facilitate communications between a network of member platforms, comprising the member platform 106. The network of member platforms, for example, may comprise a plurality of entities that have been onboarded with the centralized key exchange platform 102 by, for example, registering with the centralized key exchange platform 102, configuring a respective interface for communicating with the centralized key exchange platform 102, and/or the like. In some examples, the centralized key exchange platform 102 may execute one or more individual services for interacting with each onboarded entity. The individual services, for example, may comprise a set of requester services 502 (e.g., one for up to each member platform within the network), a set of provider services 504 (e.g., one for up to each member platform within the network), and/or a set of value services 522 (e.g., one for up to each member platform within the network).

In some embodiments, the centralized key exchange platform 102 instantiates a separate requester-specific service 502 for each of the network of members. In addition, or alternatively, for example in a multi-tenant environment, the requester service 502 may be instantiated for one or more requesters from the network or members. The requester service 502 may be configured to execute one or more operations for resolving requests from a requester platform. The operations may comprise any of the steps and/or operations described herein.

In some embodiments, the centralized key exchange platform 102 instantiates a separate provider-specific service 504 for each of the network of members. In addition, or alternatively, for example in a multi-tenant environment, the provider service 504 may be instantiated for one or more service providers from the network of members. The provider service 508 may be configured to execute one or more operations for acquiring, resolving, and/or modifying a request from a requester platform. The operations may comprise any of the steps and/or operations described herein.

In some embodiments, the centralized key exchange platform 102 instantiates a separate value-specific service 522 for each of the network of members. In addition, or alternatively, for example in a multi-tenant environment, the value service 522 may be instantiated for one or more value providers from the network of members. The value service 522 may be configured to execute one or more operations for pushing value to a network of member platforms. The operations may comprise any of the steps and/or operations described herein.

In some embodiments, a requester service 502, the provider service 504, and/or the value service 522 (e.g., the exchange services) interact with a member platform 106 through API calls (or gRPC messages) defined by a particular interface (e.g., the requester interface 506, the provider interface 508, the push interface 520). In addition, or alternatively, the exchange services may establish an offline data feed between the member platform 106 and the centralized key exchange platform 102. The offline data feed, for example, may provide data back to the member platform 106 that is reflective of recorded interactions (e.g., messages, exchanges) between the member platform 106 and the centralized key exchange platform 106. By way of example, up to each of the exchange services may exchange interaction references (e.g., a reference identifier generated and then provided by the member platform 106 to track a request, response, or push messages provided to the centralized key exchange platform 102) and interaction keys (e.g., a reference identifier that is wrapped with a member partition) during an interaction. The interaction references and keys may be stored within an interaction container defined by the exchange services. The exchange services may record data associated with an interaction within a respective interaction container. At a defined frequency (and/or on demand), the exchange services may offload the interaction container (and/or the data stored therein), via the offline data feed, to the member platform 106.

In some embodiments, the requester service 502, the provider service 504, and/or value service 522 may interact, through one or more local communication mechanisms, with each other and/or one or more other services (e.g., connect service 510, cross-platform service 512) of the centralized key exchange platform 102 to perform one or more operations described herein. The connect service 510, for example, may comprise an ephemeral service that may be instantiated for a dynamic duration of time to temporarily hold data within an intermediary service between two member services. As described herein, this allows for information passing between two, otherwise unaffiliated member services. As another example, the cross-platform service 512 may facilitate a persistent storage of a network-level cross-platform data object which, as described herein, may connect multiple, disparate platforms with respect to a single user.

Through the performance of one or more operations, the service(s) of the centralized key exchange platform 102 may generate and leverage a plurality of non-traditional identifiers for referencing one or more aspects of a user, an instrument, and/or relationship to perform various network exchanges without exposing sensitive information, such as persistent credentials. At least some of these identifiers may comprise universally unique identifiers, such as a universally unique ephemeral key, that may be leveraged to secure a network exchange. Each identifier may be at least temporarily stored in one or more relationship data objects (e.g., nodes).

As described herein, one or more identifiers may be stored in associated with each other to form identifier mappings that may be leveraged by the centralized key exchange platform 102 (and/or one or more services thereof) to reference a user, instrument, and/or any other aspect of a network exchange from communications between the requester platform, the provider platform, and/or any other member platform 106 without comprising user credentials. An example of the non-traditional identifiers will now further be described with reference to FIGS. 6-7.

e. Example Data Structures

Figure 6:
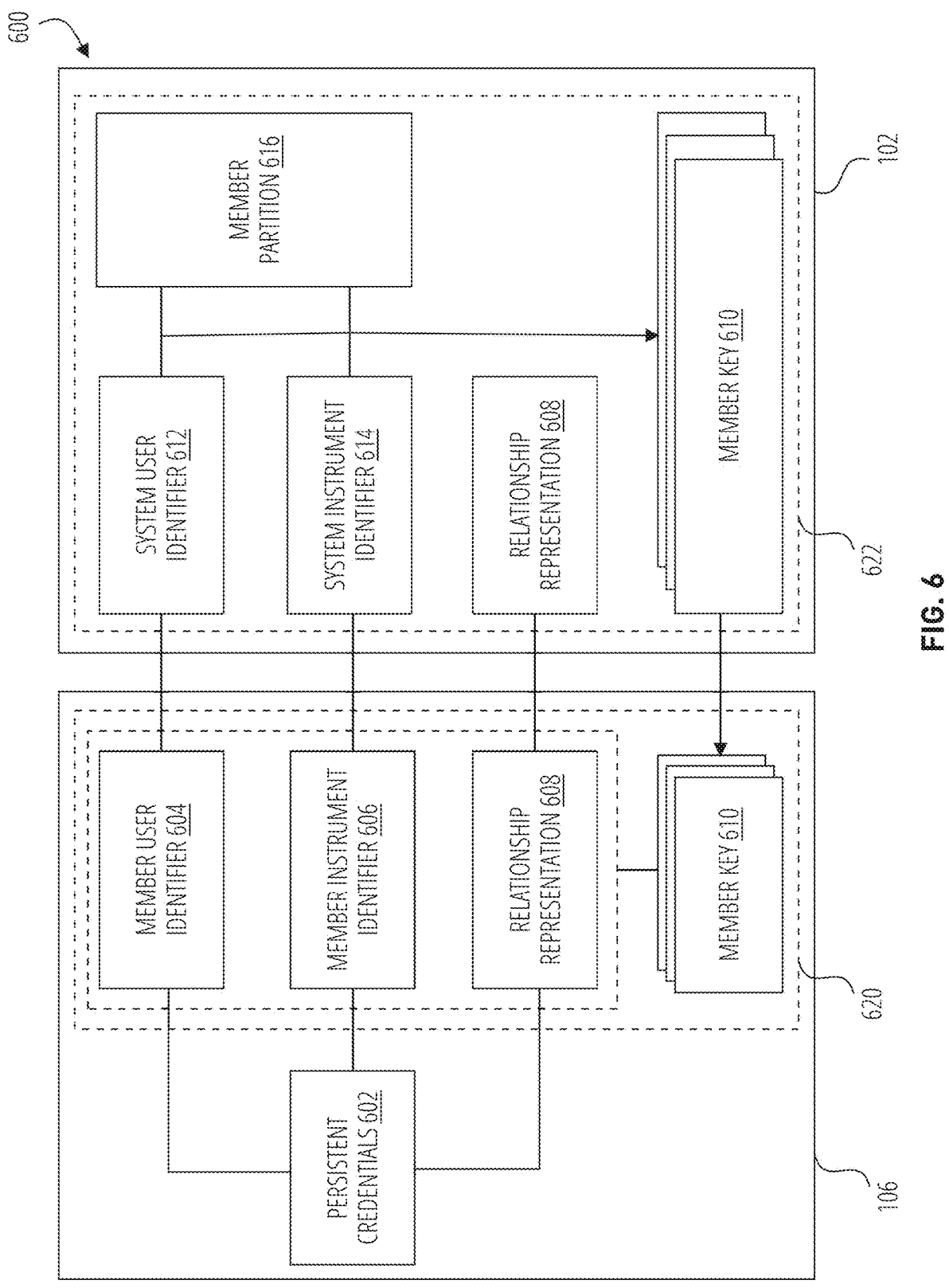
FIG. 6 is a dataflow diagram of an instrument mapping technique in accordance with one or more embodiments of the present disclosure.
Figure 7:
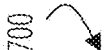
FIG. 7 is an instrument mapping technique for generating a relationship data object shared across the member platform and the centralized key exchange platform in accordance with one or more embodiments of the present disclosure.

FIGS. 6-7 are example data diagram of identifier mappings established by a centralized key exchange platform 102.

FIG. 6, for example, depicts an instrument mapping technique for generating a relationship data object shared across the member platform 106 and the centralized key exchange platform 102. The data diagram 600 illustrates a plurality of related identifiers of different types. As depicted, each identifier may be associated with at least one related identifier to form identifier mappings within one or more platforms, such as the centralized key exchange platform 102 and/or a member platform 106. The identifier mappings empower communications between the centralized key exchange platform 102 and the member platform 106 that reference an instrument (e.g., credit card, bank account, user profile) without exposing the persistent credentials 602 (e.g., username, password, card number) associated with the instrument that are susceptible to fraud, misuse, and exploitation by malicious parties. As illustrated, using some of the techniques of the present disclosure, the persistent credentials 602 may never have to be communicated outside of the member platform 106. The data diagram 600 illustrates just some of the plurality of identifiers that may be generated, stored, and/or leveraged by the various embodiments of the present disclosure. It will be understood that the illustrated identifiers are not an exhaustive list and may comprise other, non-illustrated identifiers. Each of the identifiers may be labeled as an identifier, reference, key, and/or other similar terms. These terms are used herein interchangeably to refer to a unit of information for identifying data structures, entities, and/or any other component described herein.

The data diagram 600 provides an identifier mapping between two data constructs independently maintained across two different platforms. The first construct, the member relationship data object 620, may be maintained (e.g., generated, stored, updated) by a member platform 106. The second construct, the system relationship data object 622, may be maintained (e.g., generated, stored, updated) by the centralized key exchange platform 102.

In some embodiments, the system relationship data object 622 is an internal representation of a relationship between the member platform 106 and the centralized key exchange platform 102 within the centralized key exchange platform 102. The member relationship data object 620 may be an internal representation of a relationship between the member platform 106 and the centralized key exchange platform 102 within the member platform 106. In the case of the data diagram 600, the relationship may be an instrument-based relationship in which the member platform 106 registers an instrument with the centralized key exchange platform 102.

In some examples, the member relationship data object 620 may comprise one or more identifiers, such as a member user identifier 604, a member instrument identifier 606, a relationship representation 608, a member key 610, and/or the like. The system relationship data object 622 may comprise a system user identifier 612, a system instrument identifier 614, the relationship representation 608, the member key 610, a member partition 616, and/or the like. In some examples, during a registration process, the member platform 106 may provide the member user identifier 604, the member instrument identifier 606, and/or the relationship representation 608 to the centralized key exchange platform 102. The centralized key exchange platform 102 may generate the system relationship data object 622 and/or one or more hierarchical data objects based on the received identifier. For example, the centralized exchange data object 102 may generate a system user data object that may be linked to the system relationship data object 622 via a parent-child relationship in which the system user data object is a parent to the system relationship data object 622. Thus, while FIG. 6 depicts a system relationship data object 622 as comprises a set of identifiers, in some examples, the identifiers may be stored across separate data structures within the centralized key exchange platform 102.

In any embodiment, the centralized key exchange platform 102 may generate a set of member keys 610 based on the received identifiers and return the member keys 610 to the member platform 106 for referencing the relationship or user without persistent credentials 602.

In some examples, a relationship data object may comprise one or more attributes, such as an instrument type (e.g., credit-based instrument, debit-based instrument, information-based instrument, loyalty program, single use ticket)

that may depend on the domain. For instance, in a financial domain, the one or more attributes may identify a (i) currency associated with an instrument, (ii) an asset availability (e.g., a balance, coverage) of the instrument, (iii) one or more previous exchanges with the instrument, and/or the like. As another example, in an information domain, the one or more attributes may identify a privilege level, and/or the like. As yet another example, in an event domain, the one or more attributes may identify a (i) timing of an event, (ii) an event admission availability, (iii) a transferability of an event admission, and/or the like.

In any domain, the system relationship data object 622 (and/or parents to the system relationship data object 622) may comprise a set of attributes provided by a member platform 106 during and/or after registration. The set of attributes may depend on the member platform 106 and/or user preferences of a user associated with the member platform 106. For example, a user may opt in to share a portion of an available set of attributes. In some examples, these attributes may comprise user attributes, such as those described herein with reference to the user data object in FIG. 4. In addition, or alternatively, the attributes may comprise instrument attributes or policy attributes, which may restrict the use of an instrument in accordance with one or more member policies. In any case, the member platform 106 may control the number of and the content of any attributes stored within the system relationship data object 622 (and/or parents to the system relationship data object 622)/

In some embodiments, the centralized key exchange platform 102 references each member platform 106 of a network of member platforms using one or more member partitions 616 that may be generated, allocated, and/or assigned during a registration process with the member platform 106. In some embodiments, the member partition 616 is a unique identifier for a computing entity. The member partition 616 may comprise a unique number, alpha-numeric, and/or the like that represents a particular computing entity. The member partition 616, for example, may comprise a sequence of numeric, alpha-numeric, any/or any other characters or symbols that are representative of a member (e.g., requester, service provider, value provider) that is associated (e.g., onboarded, registered) with the centralized key exchange platform 102. The centralized key exchange platform 102, for example, may comprise a plurality of member partitions 616 that respectively identify different member platforms 106 affiliated with (e.g., onboarded with, registered with) the centralized key exchange platform 102. Each member partition 616 may represent a member platform 106 that has configured one or more centralized software development kits (SDKs), and/or like for implementing a connect, requester, provider, and/or other exchange interfaces established by the centralized key exchange platform 102.

For example, after onboarding with the centralized key exchange platform 102, the member platform 106 may leverage one or more exchange interfaces to establish one or more relationships with the centralized key exchange platform 102. A relationship, for example, may comprise an instrument relationship, which may be established by exchanging one or more instrument identifiers with the centralized key exchange platform 102.

In some embodiments, an instrument identifier comprises any representation of the instrument that identifies the instrument without the exposing persistent credentials 602. The instrument identifier, for example, may comprise a member instrument identifier 606, a system instrument identifier 614, an instrument representation, relationship representation 608, a member key 610, and/or the like, as described herein.

In some embodiments, a member instrument identifier 606 is a unique identifier for representing an instrument within a member platform 106. The member instrument identifier 606, for example, may comprise a sequence of numeric, alpha-numeric, any/or any other characters or symbols that represent an instrument to the member platform 106. In some examples, the member instrument identifier 606 may comprise a table or column identifier for an instrument data object that corresponds to the instrument. By way of example, the member instrument identifier 606 may comprise a table index within an internal lookup table of the member platform 106, and/or the like. In this way, the member instrument identifier 606 may identify an instrument to a member platform 106, without exposing information useful to external parties.

In some embodiments, the member platform 106 exchanges an instrument reference with the centralized key exchange platform 102. The instrument reference, for example, may comprise a unique identifier for referencing the member instrument identifier 606. The instrument reference, for example, may be generated and/or provided by a member platform 106 to the centralized key exchange platform 102 to allow the centralized key exchange platform 102 to reference the member instrument identifier 606 maintained at the member platform 106. In some examples, the instrument reference is the same value as the member instrument identifier 606. In addition, or alternatively, the instrument reference may comprise a different value, such as a randomly generated value mapped to the member instrument identifier 606, an encrypted version of the member instrument identifier 606, and/or the like.

In some embodiments, a system instrument identifier 614 is a unique identifier for representing an instrument within the centralized key exchange platform 102. The system instrument identifier 614, for example, may comprise a sequence of numeric, alpha-numeric, any/or any other characters or symbols that represent the instrument to the centralized key exchange platform 102 without exposing the persistent credentials 602 of the instrument. In some examples, the system instrument identifier 614 may comprise a universally unique identifier (UUID) that may be randomly generated and mapped to the instrument reference. In addition, or alternatively, the system instrument identifier 614 may comprise the instrument reference, an encrypted version of the instrument reference, and/or the like.

In some embodiments, a member key 610 is a unique identifier for referencing an identifier of a relationship that is generated by the centralized key exchange platform 102 and shared with the member platform 106. A member key 610, for example, may comprise an in instrument key that references an instrument-based relationship. For example, the instrument key may be generated and/or provided by the centralized key exchange platform 102 during a registration process of the instrument with the centralized key exchange platform 102. In some examples, the instrument key may comprise a wrapped system instrument identifier 614. For example, the instrument key may comprise a string of alpha-numeric characters that are formatted according to a key format established by the centralized key exchange platform 102 (and/or one or more APIs thereof).

The key format may comprise any number of characters, such as fifty characters or more for an unsigned member key and/or one hundred characters or more for a signed member key. In some examples, the characters may be case sensitive.

A first portion of the characters (e.g., the first two characters) may identify a key type (e.g., EK for member keys, P1 or P2 for Partner UUEKs, S1 or S2 for Service Provider UUEKs), a second portion of the characters may comprise a member partition 616 for identifying the member platform 106 associated with the member key 61, and/or a third portion of the characters may comprise an unpadded base64 encoded string of the identifier corresponding to the member key (e.g., the system instrument identifier 614 for an instrument key). In some examples, a key may be signed by appending a signature, which may comprise a hash code (e.g., hash-based message authentication code (HMAC) and salt) corresponding to the identifier.

In some embodiments, a member platform 106 may leverage one or more exchange interfaces to register one or more users, instruments, or other relationships with the centralized key exchange platform 102. A user may be registered with the centralized key exchange platform 102 by exchanging one or more user identifiers with the centralized key exchange platform 102. The user identifiers, for example, may be leveraged to generate, maintain, and/or update one or more instrument-based relationship data objects and/or user-based relationship data objects reflective of a user of a member platform 106 and/or the centralized key exchange platform 102.

By way of example, the user identifiers may be exchanged during a registration process. In such a case, the user identifiers may be stored and/or maintained within a relationship data object and/or a parent to the relationship data object, as described herein.

In some embodiments, a user identifier comprises a unique identifier for a user associated with a member platform 106. A user identifier may comprise a sequence of numeric, alpha-numeric, any/or any other characters or symbols that are representative of a user of the centralized key exchange platform 102 and/or a member platform. In some examples, a user identifier may be one of a member user identifier 604, a system user identifier 612, a user key, and/or the like.

In some embodiments, a member user identifier 604 is a unique identifier for representing the user within a member platform 106. The member user identifier 604, for example, may comprise a sequence of numeric, alpha-numeric, any/or any other characters or symbols that represent a user to the member platform 106, such as a table index as described with reference to the member instrument identifier 606. As described with reference to the member instrument identifier 606, the member platform 106 may provide a user reference of the member user identifier 604 to the centralized key exchange platform 102 that may comprise a unique identifier for referencing a member user identifier 604. The user reference, for example, may be generated and/or provided by a member platform 106 to the centralized key exchange platform 102 to allow the centralized key exchange platform 102 to reference a user associated with the member platform 106. In some examples, the user reference is the same value as the member user identifier 604. In addition, or alternatively, the user reference may comprise a different value, such as a randomly generated value mapped to the member user identifier 604, an encrypted version of the member user identifier 604, and/or the like.

In some embodiments, a system user identifier 612 is a unique identifier for representing a user within the centralized key exchange platform 102. The system user identifier 612, for example, may comprise a sequence of numeric, alpha-numeric, any/or any other characters or symbols that represent a user to the centralized key exchange platform 102. In some examples, the system user identifier 612 may comprise a UUID specific to a particular user. In addition, or alternatively, the system user identifier 612 may comprise the user reference, an encrypted version of the user reference, and/or the like.

In some embodiments, a member key 610 comprises a user key that may uniquely reference a system user identifier 612. The user key, for example, may be generated and/or provided by the centralized key exchange platform 102 during a registration process of a user (and/or relationship associated therewith) with the centralized key exchange platform 102. In some examples, the user key may comprise a wrapped system user identifier 612. For example, the user key may comprise a string of alpha-numeric characters that are formatted according to a key format established by the centralized key exchange platform 102 (e.g., using the system user identifier 612).

As described herein, the member keys 610, such as a user and instrument key, may be shared across the centralized key exchange platform 102 and the member platform 106 to power a secure, credential-less network exchange between the two entities. In some examples, references, such as an instrument reference and/or user reference, may be shared across platforms to further ensure a security of the network exchange, without relying on persistent credentials 602 (e.g., static credentials with meaning to unaffiliated parties). These identifiers, and the mapping schemes described herein, allow the centralized key exchange platform 102 to reference an instrument, a user, and/or any other relationship without knowledge of persistent credentials 602 (e.g., card numbers, usernames, personally identifiable information (PII)) underlying the relationship. As described herein, one or more of the member keys 610 and/or references may be provided to the member platform 106 individually, or in any combination. In some examples, each of the member keys 610 and/or the references may be provided to the member platform 106 in a redundant process that allows the member platform 106 to verify that a communication is provided by the centralized key exchange platform 102 (e.g., the only entity with access to the specific set of keys and references).

In some embodiments, persistent credentials 602 for a relationship comprises sensitive user, instrument, or other relationship credentials, such as a card number, account number, subscription number, and/or the like, that expose a user, member, and/or intermediary entity to risk when wirelessly transferred over a network. The persistent credentials 602 may be generated, accessed, and/or otherwise provided by a member platform 106 to a user when a user applies for, is authorized for, and/or otherwise is enabled for a relationship with that member platform 106. Traditionally, persistent credentials 602 are then used by the user to initiate exchanges based on the relationship (e.g., enter an event with an admission ticket, apply loyalty points to a purchase, purchase a product with a credit card). By doing so, the user is forced to expose sensitive credentials that are tied directly to the underlying relationship that authorizes the exchange each time the relationship is relied upon. In addition to being exposed during transit, the persistent credentials 602 have to be stored by third parties, which then present additional target vectors for hacking/fraud even if an initial exchange is secure. The member keys 610, references, and the identifier mapping scheme of the present disclosure overcome these technical deficiencies.

Unlike persistent credentials 602, each of the identifiers described herein are interpretable to only an affiliated computing platform, such as the centralized key exchange platform 102 and/or member platform 106 and not a user or any unaffiliated party. To enhance visibility for a user, while continuing to obfuscate information from unaffiliated parties, the member platform 106 may exchange a relationship representation 608 (or "nickname") with the centralized key exchange platform 102. The relationship representation 608, for example, may comprise a portion of the persistent credentials 602 that may identify a relationship to a user, or other affiliated party, with preexisting knowledge of the relationship.

By way of example, a relationship representation 608 may comprise a unique identifier for representing a relationship to a user, without exposing the persistent credentials 602 (e.g., a card number) of the instrument. The relationship representation 608, for example, may comprise a sequence of numeric, alpha-numeric, any/or any other characters or symbols that are outwardly representative of an instrument only to entities with previous knowledge of the instrument. The format and/or value of the relationship representation 608 may be based at least in part on the type of relationship. For instance, in a financial domain, a relationship representation 608 may comprise a portion (e.g., the last four digits) of the persistent credentials 602, such as a card number (e.g., debit card, credit card), a financial account number, and/or the like. As another example, in an information domain, a relationship representation 608 may comprise a portion (e.g., one or more digits, alpha-numeric characters) of persistent credentials 602, such as a subscription account, and/or the like. For instance, the relationship representation 608 may comprise a derivative of persistent credentials 602 that may only allow entities with prior knowledge of the persistent credentials 602 to identify the relationship. As another example, the relationship representation 608 may comprise an instrument nickname that is assigned by and thereafter recognized by a user.

In some embodiments, the relationship representation 608 may be provided (e.g., during a registration process) to the centralized key exchange platform 102 in place of the persistent credentials 602. In this manner, the centralized key exchange platform 102 may outwardly represent a relationship using the relationship representation 608 without knowledge of the persistent credentials 602 from which the relationship representation 608 may be derived. For example, unlike traditional network platforms, the centralized key exchange platform 102 may not require the persistent credentials 602 corresponding to a relationship to implement various computing tasks of the present disclosure. This, in turn, allows the centralized key exchange platform 102 to operate more flexibly, while storing previously unrecorded contextual data, lowering operational computing costs, and improving user and platform safeguards from infiltration attacks by malicious computing entities.

In some embodiments, the identifier mapping scheme is supplemented by unique ephemeral keys that are issued to member platforms 106 to facilitate secure, real time network exchanges. For example, the centralized key exchange platform 102 may facilitate additional layers of network and data security by implementing exchange identifiers for representing aspects of a relationship within a network exchange.

FIG. 7, for example, is an exchange-level mapping technique for securing an exchange through an ephemeral key recognizable to the member platform 106 and the centralized key exchange platform 102. The ephemeral key, for example, may comprise a UUEK 702 that may correspond to an exchange identifier 708 within the centralized key exchange platform 102. An exchange identifier 708 may comprise a member-specific identifier that is ephemeral, unique to a particular relationship, and temporarily represents the relationship to the centralized key exchange platform 102. In some examples, the temporary representation of a relationship may be enabled through temporary exchange data objects that may be created to secure an interaction between the member platform 106 and the centralized key exchange platform 102 and then deleted after the interaction is completed.

In some embodiments, an exchange data object is a data entity that represents an authorized interaction (e.g., network communication) between one or more members associated with the centralized key exchange platform 102. In some examples, the exchange data object may comprise one or more identifiers and/or one or more exchange attributes. For example, the one or more identifiers and/or one or more exchange attributes may be based at least in part on a type of exchange data object. By way of example, an exchange may be represented in a member platform 106 as a member exchange data object. In addition, or alternatively, the exchange may be independently represented by a system exchange data object in the centralized key exchange platform 102. In some examples, the member exchange data object and the system exchange data object may comprise one or more of the same one or more identifiers and/or exchange attributes. By way of example, using some of the techniques of the present disclosure, the centralized key exchange platform 102 may issue one or more unique identifiers to a member platform 106 that may be used to authorize an interaction (e.g., network communication with respect to a relationship).

In some embodiments, the system exchange data object is an internal representation of a network exchange that is intermediated using the centralized key exchange platform 102. In some examples, the system exchange data object may comprise one or more different identifiers and/or exchange attributes depending on the role of the system exchange data object in a network exchange.

For example, a system exchange data object may comprise a provider-specific exchange data object that corresponds to the provider platform. The provider-specific exchange data object may comprise one or more identifiers, such as an exchange identifier 708, a relationship identifier (e.g., system instrument identifier), a service provider partition, and/or a UUEK. In addition, or alternatively, the provider-specific exchange data object may comprise one or more interaction attributes, such as an expiration date (e.g., valid_to/valid_from fields), a reoccurring use parameter (e.g., an unlimited or restricted uses Boolean), a remaining use parameter (e.g., an integer if reoccurring use is authorized for a set number of users), a UUEK purpose (e.g., if provided in a UUEK issuing request), interaction specific restrictions (e.g., a per interaction spending limit, a designated item for a UUEK), and/or the like.

In addition, or alternatively, the system exchange data object may comprise a requester-specific exchange data object that corresponds to a requester platform. The requester-specific exchange data object may comprise one or more requester identifiers, such as an exchange identifier 708, a requester partition, and/or the like. In addition, or alternatively, the requester-specific exchange data object may comprise one or more provider identifiers corresponding to a provider linked to the requester relationship associated with the system exchange data object. For example, the requester-specific exchange data object may comprise a service provider partition and/or a linked relationship identifier (e.g., system instrument identifier). In addition, or alternatively, the requester-specific exchange data object may comprise one or more interaction attributes, such as a reoccurring use parameter (e.g., an unlimited or restricted uses Boolean), a remaining use parameter (e.g., an integer if reoccurring use is authorized for a set number of users), and/or the like.

In some embodiments, an exchange identifier 708 is a unique identifier for a network exchange associated with a particular relationship registered by the centralized key exchange platform 102. The exchange identifier 708 may comprise a sequence of numeric, alpha-numeric, and/or any other characters or symbols that are representative of at least a user, an instrument, and/or any other type of relationship between a member and the centralized key exchange platform 102. In some examples, the exchange identifier 708 may comprise a UUID that may be mapped (e.g., through a series of identifiers) to the relationship and/or the member associated with the relationship. In some examples, the exchange identifier 708 may be generated using one or more UUID generators. For instance, the exchange identifier 708 may comprise sixteen bytes of information generated in accordance with one or more UUID formatting standards, such as UUID v4, and/or the like. Therefore, while the exchange identifier 708 may be leveraged by the centralized key exchange platform 102 and/or a member platform 106 for one or more functions, the same exchange identifier 708 will be useless to external parties without a prior association between the exchange identifier 708 and one or more other identifiers. In addition to the prior identifier associations, the exchange identifier 708 may be associated with the centralized key exchange platform 102. Thus, even if the exchange identifier 708 is identified by an adverse party, the adverse party would still be required to impersonate the centralized key exchange platform 102 in order to use the exchange identifier 708. Moreover, the adverse party would need to update settlement accounts to accounts owned by the adverse party, among a number of other tasks before the exchange identifier 708 may be used adversely. Each of these tasks increase the amount of work necessary to overcome the layers of enhanced security added by the exchange identifier 708. When paired with the ephemeral nature of the exchange identifier 708, these tasks become prohibitively expensive.

In some examples, the exchange identifier 708 may be externally represented by a UUEK 702. By way of example, to facilitate credential-less exchanges, the centralized key exchange platform 102 may issue one or more UUEKs 702 to one or more member platforms 106. As described herein, the UUEKs 702 may eliminate the reliance on traditional, persistent credentials by identifying a relationship through previously mapped data entities.

In some embodiments, a UUEK 702 is an external representation of an exchange identifier 708 that may be issued (e.g., in place of the exchange identifier 708) to an external entity, such as a user, member platform 106, and/or the like, to initiate a value-based exchange using the centralized key exchange platform 102. To do so, the UUEK 702 may be generated and issued by the centralized key exchange platform 102 to the external entity. Each UUEK 702 may comprise a plurality of values (e.g., up to one hundred characters and/or more that may or may not be case sensitive) that represent one or more aspects of a relationship. For example, the plurality of values may be indicative of an exchange identifier 708, a partition (e.g., identifying the recipient of the UUEK 702), an identifier type, and/or one or more flags. By way of example, an UUEK 702 may comprise a requester-specific UUEK and/or a provider-specific UUEK. The requester-specific UUEK may be correlated to a requester-specific exchange data object and may comprise a requester partition 704, whereas a provider-specific UUEK may be correlated to a provider-specific exchange data object and may comprise a provider partition 706, as described herein.

A UUEK 702 may be generated in accordance with a key format. The key format may comprise a plurality of characters comprising, for example, fifty characters or more that may or may not be case sensitive. A first portion of the characters (e.g., the first six characters) may be reserved as a partition for identifying a recipient of the UUEK 702. The partition, for example, may comprise a requester partition 704, a provider partition 706, and/or any other member partition. By way of example, an UUEK 702 may be issued in response to a request from an authorized member, such as an affiliated requester, service provider, and/or value provider.

In addition, or alternatively, at least one character (e.g., a seventh character) of the key format may identify a format of the UUEK 702. At least another character (e.g., an eighth character) may identify a type of UUEK 702. In some examples, a second portion of the characters may comprise an exchange identifier 708 (e.g., a group of twenty-two characters following the eighth character). A third portion of characters may be reserved (e.g., a group of twenty characters following the first portion of characters). An example representation is provided below:

v1:
FFppppppGGGGGGGGGGGGGGGGGGGGGG-Grrrrrrrrrrrrrrrrrrrrrrrrrrrrrrrrrrrrrrrrrrrrrrrrrrrr rrrrrrrrrrrrrrrrrr
or
v2:
FFppppppGGGGGGGGGGGGGGGGGGGGGG-ssssssssssssssssssssssssrrrrrrrrrrrrrrrrrrrrrrrrrrrrrr rrrrrrrrrrrrrrrrrrrrrrr where p represents partition characters, F represents a format character, i represents an identifier type character, G represents the exchange identifier 708, s represents the cryptographic signature, and r represents reserved characters. The key format allows for a minimum of 6.49.8×10 to the 13984 unique permutations, which is 10ˆ55 times more than the number of atoms in the known observable universe. This enables the generation and distribution of new UUEKs 702 on-demand without compromising the security of underlying data to which the UUEKs 702 may be mapped, such as identifiers for a user, an instrument, and/or any other potentially sensitive information.

In some embodiments, an exchange data object is stored within a member-specific service that maintains an interaction log for the member platform 106. The interaction log may comprise a set of interaction containers respectively corresponding to a set of interactions secured through the use of UUEKs issued by the centralized key exchange platform 102. In some examples, up to each interaction container may correspond to a unique interaction between a member platform 106 and the centralized key exchange platform 102. The interaction container, for example, may comprise a one to one relationship with an exchange data object for a one use UUEK, or a many to one relationship with an exchange data object for a multi-use UUEK. In this regard, an interaction container may correspond to an interaction, rather than the key (e.g., UUEK) that secures the interaction.

The interaction container may record attributes of a particular interaction. For example, the interaction container may comprise a set of interaction attributes. The interaction attributes may comprise a unique interaction identifier (e.g., a UUID generated by the centralized key exchange platform 102 in response to an exchange request). In some examples, the interaction attributes may comprise a set of member identifiers that record each of the member platforms and/or relationships associated with an interaction (e.g., a requester partition, service provider partition, service provider relationship identifier, requester relationship identifier).

In addition, or alternatively, the interaction attributes may comprise up to each of the identifiers, keys, and/or attributes within up to each message involved within an interaction between one or more member platforms. For example, the interaction attributes may comprise one or more member interaction references that may be generated by the member platforms involved in the interaction and provided in messages to the centralized key exchange platform 102. In some examples, the interaction attributes may comprise interaction information, such as a requested value, a transaction type, line item responses, discounts applied, and/or any other information passed during an interaction.

In some embodiments, up to each member service (e.g., a requester service, provider service, value service) stores a member-specific interaction container for a particular interaction. In this manner, a single interaction may result in a set of individual interaction containers across up to each of a set of member services involved within the interaction. This, in turn, allows the centralized key exchange platform 102 to store and then supply data associated with an interaction to up to each of the member platforms involved with the interaction through separate offline data feeds.

As described herein, the unique sequences of identifiers and mapping schemes between the identifiers may facilitate a secure network exchange between two member platforms. For example, a UUEK 702 may be issued to a member platform 106. The first entity that originally receives the UUEK 702 may be considered the UUEK's 702 original recipient. The member platform 106 (e.g., the original recipient) may forward the UUEK 702 to another entity (e.g., a secondary recipient), such as a client device 104, another member platform, and/or an unaffiliated entity. During a network exchange, the secondary recipient may provide the UUEK 702 to the centralized key exchange platform 102 or back to the member platform, which may receive the UUEK 702, route the UUEK 702 to an exchange service (e.g., a requester service and/or provider service as described with reference to FIG. 5) based on a requester partition 704 and/or a provider partition 706 within the UUEK, verify the exchange identifier 708 within the UUEK 708, and, based on the verification, look up a member key 610 corresponding to the UUEK 702 and provide the network communication, with the member key 610, to the member platform 106. In this manner, the centralized key exchange platform 102 may intermediate secured network exchanges between unaffiliated entities and members registered with the platform.

In some embodiments, to secure an interaction between two member platforms, the centralized key exchange platform 102 receives an exchange request that comprises a UUEK, a requested value, and/or a requester interaction reference. The requester interaction reference may comprise an interaction-specific identifier generated and then provided by a requester platform.

The centralized key exchange platform 102 may route the exchange request to a member service based on a member partition of the UUEK and/or the member interface used to provide the exchange request. For example, the centralized key exchange platform 102 may route the exchange request to a requester service corresponding to a requester partition of a requester-specific UUEK. In addition, or alternatively, the centralized key exchange platform 102 may route the exchange request to a service provider service corresponding to a service provider partition of a service provider-specific UUEK. As another example, a requester interface may direct an exchange request to a particular requester service, and/or a provider interface may direct the exchange request to a particular provider service.

Upon reception, the centralized key exchange platform 102 (and/or the receiving member service thereof) may check the partition of the UUEK within the exchange request, generate an interaction container, and store the requester interaction reference, the UUEK, the requested value, and/or any other information within the exchange request within the interaction container. The centralized key exchange platform 102 (and/or the receiving member service thereof) may then search for a recipient-specific exchange data object corresponding to the UUEK using the exchange identifier of the UUEK.

If the recipient-specific exchange data object is found, the centralized key exchange platform 102 (and/or the receiving member service thereof) may look up a relationship data object, receive member identifier corresponding to a service provider platform linked to the relationship data object, and call a provider service corresponding to the member identifier.

If the recipient-specific exchange data object is not found, the centralized key exchange platform 102 (and/or the receiving member service thereof) may reroute the exchange request to a provider service corresponding to the member partition of the UUEK.

Upon reception at the provider service, the centralized key exchange platform 102 (and/or the receiving member service thereof) may generate another interaction container, and store the requester interaction reference, the UUEK, the requested value, and/or any other information within the exchange request within the interaction container.

The centralized key exchange platform 102 (and/or the receiving member service thereof) may then call, using a provider interface, a corresponding service provider platform to provide an exchange authorization request and receive, in response to the exchange authorization request, an exchange authorization response. The exchange authorization response may comprise a provider interaction reference and/or one or more authorization attributes. The centralized key exchange platform 102 (and/or the receiving member service thereof) may update its interaction container with the information within the exchange authorization response. If the UUEK within the exchange request corresponds to the provider platform, the provider service may update the exchange data object based on the exchange authorization response by, for example, deprecating the exchange data object (e.g., in a single use case), decrementing a remaining uses parameter, incrementing a uses parameter, and/or the like. The centralized key exchange platform 102 (and/or the receiving member service thereof) may then forward the exchange authorization response to the requester service.

The centralized key exchange platform 102 (and/or the receiving member service thereof) may update its interaction container with the information within the exchange authorization response. If the UUEK within the exchange request corresponds to the requester platform, the requester service may update the exchange data object based on the exchange authorization response by, for example, deprecating the exchange data object (e.g., in a single use case), decrementing a remaining uses parameter, incrementing a uses parameter, and/or the like.

The centralized key exchange platform 102 (and/or the receiving member service thereof) may then generate an exchange response based on the exchange authorization response and provide the exchange response to the requester platform that originally provided the exchange request.

IV. Key-Based Platform Linking

FIGS. 8A-C provide message flow diagrams illustrating key exchange operations for facilitating a secure cross-platform service in which different platforms may be linked to form cross-platform relationships. Through the operations of the depicted message flow diagrams, a centralized key exchange platform 102 may aggregate a set of relationships for a particular client device 104, or user 802 thereof. For example, the centralized key exchange platform 102 may link different relationship data objects across affiliated platforms of the centralized key exchange platform 102 through a sequence of messages, secured using different keys issued by the centralized key exchange platform 102, to securely aggregate related relationships with respect to a common entity. The key exchange operations depicted by FIGS. 8A-C may be performed across a series of secure key exchange stages.

At a first, affirmative enrollment stage, depicted by FIG. 8A, a user 802 may leverage the centralized key exchange platform 102 to register a relationship at member platform 106 with the centralized key exchange platform 102. In some examples, the relationship may be pre-registered (e.g., during a registration process between the member platform 106 and the centralized key exchange platform 102) and the user 802 may affirmatively enroll the registered relationship with a cross-platform service to enable cross-platform linking. In addition, or alternatively, the relationship may be implicitly enrolled during the initial registration between the member platform 106 and the centralized key exchange platform 102, in which case the affirmative enrollment stage may be implied, rather than affirmatively initiated by the user 802.

At operation 806, the user 802 may authenticate with a member platform 106. The user 802, for example, may perform one or more authentication operations (e.g., entering a username and password, two-step factor authentication) to authenticate themselves to the member platform 106. The one or more authentication operations may be defined and facilitated by the member platform 106 to ensure security for its users.

At operation 808, the member platform 106 may authenticate the user 802 and allow access to a user account in response to the authentication. In this way, the user 802 may access a user account maintained by the member platform 106. In some examples, the user account may be provided, rendered, and/or the like within a member user interface at least partially hosted by the member platform 106.

At operation 810, the user 802 may provide a registration request to the member platform 106. In some examples, upon registration with the centralized key exchange platform 102, the member platform 106 may provide a user interface linking option within a member user interface. The user 802 may interact with the user interface linking option to initiate the registration request. In some examples, the registration request comprises one or more authentication tokens (e.g., JSON web tokens), one or more relationship-level requests (e.g., enabling or disabling linking operations for one or more relationships), and/or the like, to authenticate a user's identity to the member platform 106.

At operation 812, the member platform 106 may receive the registration request and, in response to the registration request, the member platform 106 may call the centralized key exchange platform 102. For example, the member platform 106 may forward the registration request to a member service 804 using a preconfigured member interface. The registration request, for example, may be encapsulated within a member-specific registration request defined by the member interface.

The member-specific registration request may comprise the request to create the cross-platform key and/or one or more member-specific identifiers corresponding to the request. For example, the member-specific registration request may comprise a member partition, one or more user identifiers (e.g., a user reference and/or user key) corresponding to the user 802 associated with the registration request, and/or one or more relationship identifiers (e.g., a relationship reference and/or relationship key) for up to each instrument either referenced by the registration request or associated with the user 802 within the member service 804. By way of example, the registration request may comprise a request to register an instrument and/or user of the member platform 106 with a cross-platform service 512, and the member-specific identifiers may comprise a member-specific relationship identifier for up to each instrument referenced by the registration request.

By way of example, the registration request may comprise a user registration request and/or an instrument registration request. The user registration request may comprise a member-specific user identifier, a member-specific user reference, member-specific user key, and/or the like. The instrument registration request may comprise the member-specific user identifier, the member-specific user reference, the member-specific user key, a member-specific instrument identifier, a member-specific instrument reference, a member-specific instrument key, an instrument type, an instrument currency, and/or the like.

At operation 814, the centralized key exchange platform 102 (e.g., member service 804) may receive the registration request from the member platform 106 within the member computing ecosystem. As described herein, the registration request may comprise one or more member-specific identifiers, such as a member partition corresponding to the member platform, a member-specific user identifier (e.g., a user reference and/or user key) corresponding to a user associated with the member platform, one or more relationship identifiers (e.g., a relationship reference and/or relationship key) for up to each instrument either referenced by the registration request or associated with the user 802 within the member service 804.

The centralized key exchange platform 102 (e.g., member service 804) may look up a cross-platform data object based on the registration request. For example, the member service 804 may search for a local data construct of a cross-platform data object that comprises at least one of the identifiers of the one or more member-specific identifiers within the member-specific registration request. In the event that a cross-platform data object is returned, the member service 804 may proceed to operation 826, where the member service 804 may return a success message to the member platform 106. Otherwise, the member service 804 may proceed to operation 816.

At operation 816, the centralized key exchange platform 102 (e.g., member service 804) may determine an absence of the cross-platform data object. In response to determining the absence of the cross-platform data object, member service 804 may provide the member-specific registration request to the cross-platform service 512. For example, the member service 804 may generate and provide an internal registration request to the cross-platform service 512. The internal registration request may comprise the one or more member-specific identifiers within the member-specific registration request and/or the member partition corresponding to the member platform 106.

At operation 818, the centralized key exchange platform 102 (e.g., cross-platform service 512) may look up a cross-platform data object based on the internal registration request. For example, the cross-platform service 512 may search for a local data construct of a cross-platform data object that comprises at least one of the identifiers of the one or more member-specific identifiers within the member-specific registration request. In the event that a cross-platform data object is returned, the cross-platform service 512 may proceed to operation 822, where the cross-platform service 512 may set a cross-platform key at the member service 804. Otherwise, the member service 804 may proceed to operation 820.

At operation 820, the centralized key exchange platform (e.g., cross-platform service 512) may generate a cross-platform data object in response to the registration request. To do so, the centralized key exchange platform (e.g., cross-platform service 512) may generate a cross-platform key. The cross-platform key, for example, may comprise a UUID for internally referencing a cross-platform data relationship. In some examples, the cross-platform service 512 may store the cross-platform key, the member partition, and/or the one or more member identifiers within a cross-platform data object. The cross-platform data object, for example, may comprise a cross-platform key, a creation timestamp, a record status (e.g., active, suspended, soft deleted), one or more user and/or relationship lists (e.g., each with their own set of member-specific identifiers), one or more user and/or relationship statuses (e.g., each corresponding to a particular user or relationship status).

At operation 822, the centralized key exchange platform (e.g., cross-platform service 512) may set the cross-platform key at the member service 804 by returning the cross-platform key to the member service 804.

At operation 824, the centralized key exchange platform (e.g., member service 804) may generate a local cross-platform data object in response to the cross-platform key. For example, the centralized key exchange platform (e.g., member service 804) may store the cross-platform key and/or the one or more member identifiers within a local cross-platform data object.

At operation 826, the centralized key exchange platform (e.g., member service 804) may return a success message to member platform 106. At operation 828, the member platform 106 may return the success message back to the user 802 to indicate a successful enrollment operation with respect to at least one relationship between the user 802 and the member platform 106.

Turning to FIG. 8B, at a second, linking request stage, a user 802 may initiate a linking procedure with another member platform (e.g., second member platform 850) using a preexisting relationship between the user 802 and an enrolled member platform (e.g., first member platform 830). The linking request stage may be performed after an affirmative enrollment process, as outlined by FIG. 8A. In addition, or alternatively, the linking request stage may be performed without the affirmative enrollment process, for example, where a relationship data object is implicitly enrolled with the cross-platform service 512 during an initial registration between a member platform and the centralized key exchange platform 102.

At a linking request stage, the user 802 may initiate a linking process through a first member platform 830 that is already enrolled with the centralized key exchange platform 102. To do so, at operation 834, the user 802 may request a linking code from the first member platform 830. By way of example, the user 802 may authenticate themselves, in accordance with the first member platform's authentication protocols, to access a user account maintained by the first member platform 830. In some examples, the user account may be provided, rendered, and/or the like within a member user interface at least partially hosted by the first member platform 830. The user 802 may provide a linking code request to the first member platform 830 through interaction with the member user interface. For example, upon registration with the centralized key exchange platform 102, the first member platform 830 may provide a user interface linking option within a member user interface. The user 802 may interact with the user interface linking option to initiate the linking code request. The linking code request, for example, may comprise a request message (e.g., an API request) that requests a linking code from the first member platform 830.

At operation 836, the first member platform 830 may receive the linking code request and, in response to the linking code request, the first member platform 830 may call the centralized key exchange platform 102. For example, the first member platform 830 may forward the linking code request to a first member service 832 using a preconfigured member interface. In this manner, the centralized key exchange platform 102 may receive, originating from the first member platform within a member computing ecosystem, a linking code request comprising a first member-specific identifier, such as a first member partition corresponding to the first member platform, a member-specific user identifier (e.g., user reference, user key) corresponding to a first user (e.g., an identity of the user 802 recognized by the first member platform 830) associated with the first member platform 830, a member-specific relationship identifier (e.g., relationship reference, relationship key), and/or the like. In some examples, the linking code request may be received via a first interface preconfigured for the first member platform 830.

In some examples, the linking code request may be encapsulated within a member-specific linking code request defined by the member interface. The member-specific linking code request may comprise one or more authentication tokens, one or more relationship-level requests (e.g., enabling or disabling linking operations for one or more relationships), and/or the like, to authenticate a user's identity to the member platform 106. In some examples, the linking code request may comprise one or more member partitions, relationship references, relationship keys, user references, user keys, and/or the like.

At operation 838, the centralized key exchange platform 102 (e.g., first member service 832) may instantiate (and/or access) a connect service 510 and/or provide the member-specific linking code request to the connect service 510. For example, the first member service 832 may generate and provide an internal linking code request to the connect service 510. The internal linking code request may comprise one or more member-specific identifiers within the member-specific linking code request and/or the member partition corresponding to the first member platform 830. The internal linking code request may comprise the one or more member partitions, relationship references, relationship keys, user references, user keys, and/or the like. In addition, or alternatively, one or more of these identifiers may be implicit based on an mTLS certificate or the first member service 832.

At operation 840, the centralized key exchange platform 102 (e.g., connect service 510) may generate an ephemeral transport object in response to the internal linking code request. To do so, the centralized key exchange platform 102 (e.g., connect service 510) may generate a linking code. The linking code, for example, may comprise a UUID, a six-digit alpha-numeric code, and/or the like. In some examples, the connect service 510 may temporarily store the linking code, the member partition, and/or the one or more member identifiers within the ephemeral transport object. In this manner, the centralized key exchange platform 102 may provide the linking code request (e.g., an encapsulated version thereof) to an internal service (e.g., an instantiated connect service 510) to generate an ephemeral transport object comprising a linking code and a member-specific identifier. For example, the centralized key exchange platform 102 may instantiate the internal service (e.g., the connect service 510), provide the member-specific identifier to the internal service to initiate a generation of the linking code and an ephemeral transport object, and receive the linking code from the internal service.

In some embodiments, the linking code is a unique identifier for authorizing a linking procedure between one or more entities. The linking code, for example, may comprise a sequence of numeric, alpha-numeric, and/or the like characters that may be provided to multiple entities to ensure that each of the entities are involved in the same communication sequence. By way of example, a linking code may comprise a random, six digit number that is generated by the centralized key exchange platform 102, provided to the first member platform 830, and then received from a second member platform 850 to ensure that the centralized key exchange platform 102, the second member platform 850, and the first member platform 830 are each interacting with the same end user 802 (e.g., by comparing a received linking code to a generated linking code as described herein).

The ephemeral transport object may comprise an expiration time, the linking code, one or more origin identifiers (e.g., first member-specific identifiers), and/or the like. In some examples, as described herein, the ephemeral transport object may comprise one or more authorized assertions and/or data associated therewith. In some examples, the ephemeral transport object may be purged as soon as a link is established, as described herein. In addition, or alternatively, the ephemeral transport object may be purged if an elapsed time meets or exceeds the expiration time.

At operation 842, the centralized key exchange platform 102 (e.g., connect service 510) may provide the linking code to the first member service 832. At operation 844, the first member service 834, via a first member interface between the centralized key exchange platform 102 and the first member platform 830, may return the linking code to the first member platform 830. At operation 846, the first member platform 830 may return the linking code to the user 802.

Turning to FIG. 8C, at a third, link establishing stage, a user 802 may establish a cross-platform link between two member platforms (e.g., the first member platform 830 and second member platform 850) using a linking code issued in accordance with the linking request stage described above. In some examples, the link establishing stage may be performed immediately after the linking request stage. By way of example, the linking code may be associated with a validation time window (e.g., ten seconds, one minute, one day). During the validation time window, the linking code may be used to establish a cross-platform link between the first member platform 830 and another member platform affiliated with the centralized key exchange platform 102. Upon expiration of the validation time window, the centralized key exchange platform 102 may reject the linking code, return an error message, and/or delete an ephemeral transport object corresponding to the linking code (e.g., thereby returning a null response to the linking code).

At operation 852, the user 802 may provide a linking request with the linking code to second member platform 850 that may or may not be enrolled with the centralized key exchange platform 102. By way of example, the user 802 may authenticate themselves, in accordance with the second member platform's authentication protocols, to access a user account maintained by the second member platform 850. In some examples, the user account may be provided, rendered, and/or the like within a member user interface at least partially hosted by the second member platform 850. The user 802 may provide the linking request to the second member platform 850 through interaction with the member user interface. For example, upon registration with the centralized key exchange platform 102, the second member platform 850 may provide a user interface linking option within the member user interface. The user 802 may interact with the user interface linking option to initiate the linking request in which the user 802 may enter a linking code provided through interaction with the first member platform 830. The linking request may comprise one or more authentication tokens, the linking code, and/or the like.

At operation 854, the second member platform 850 may receive the linking request and, in response to the linking request, the second member platform 850 may call the centralized key exchange platform 102. For example, the second member platform 850 may forward the linking request to a second member service 848 using a preconfigured member interface. In this manner, the centralized key exchange platform 102 may receive, originating from the second member platform within the member computing ecosystem, the linking code request comprising a second member-specific identifier, such as a member partition corresponding to the second member platform, a member-specific user identifier (e.g., user reference, user key) corresponding to a second user (e.g., an identity of the user 802 recognized by the second member platform 850) associated with the second member platform 850, a member-specific relationship identifier (e.g., relationship reference, relationship key), and/or the like. In some examples, the linking request is received via a second interface preconfigured for the second member platform 850. The linking request, for example, may be encapsulated within a member-specific linking request defined by the member interface.

In some examples, the member-specific linking request may comprise the linking code, one or more second member-specific identifiers (e.g., partition, relationship identifiers, user identifiers), a UUEK request (e.g., indicating whether a UUEK should be returned when the link is established), and/or the like.

At operation 856, the centralized key exchange platform 102 (e.g., second member service 848) may provide the member-specific linking request to the connect service 510. For example, the second member service 848 may generate and provide an internal linking request to the connect service 510. The internal linking request may comprise one or more member-specific identifiers within the member-specific linking request and/or the member partition corresponding to the second member platform 850.

The internal linking request may comprise the linking code and/or a member type identifier of the second member platform. By way of example, the member type identifier may indicate whether the origin platform is a requester, service provider, or value provider. The member type identifier may be provided to prevent restricted linkages, such as requester-requester linkages, value provider-value provider linkages, and/or the like. In addition, or alternatively, the member type identifier may indicate whether the origin platform is a private or public network. The member type identifier may be provided to prevent restricted linkages, such as private-public linkages, private-private linkages, and/or the like.

At operation 858, the centralized key exchange platform 102 (e.g., connect service 510) may look up the ephemeral transport object corresponding to the linking code. In the event that an ephemeral transport object corresponding to the linking code exists, the connect service 510 may return the object data within the ephemeral transport object to the second member service 848, at operation 860. Otherwise, the connect service 510 may return a null response. In this manner, the centralized key exchange platform 102 may provide the linking request (and/or an encapsulation thereof) to the internal service (e.g., connect service 510) to receive the first member-specific identifier from the ephemeral transport object.

At operation 862, if the ephemeral transport object exists, the centralized key exchange platform 102 (e.g., connect service 510) may remove, deprecate, and/or delete the ephemeral transport object. For example, the centralized key exchange platform 102 may remove the ephemeral transport object in response to receiving the first member-specific identifier from the ephemeral transport object of the internal service (e.g., connect service 510).

At operation 864, the centralized key exchange platform 102 (e.g., second member service 848) may update a second cross-platform data object corresponding to the linking request (and/or one or more member-specific identifiers therein). For example, the cross-platform service 512 may search for a second cross-platform data object that comprises at least one of the one or more member-specific identifiers of the member-specific linking request. The second member service 848 may update the second cross-platform data object by storing the object data (e.g., of the ephemeral transport object) within the second cross-platform data object. In this manner, the centralized key exchange platform 102 may store the first member-specific identifier within a local construct of a cross-platform data object for the second member platform to link the first user to the second user. By way of example, the second member service 848 may store a user identifier and/or one or more relationship identifiers respectively corresponding to a user and/or one or more relationships of the first member platform 830 within the second cross-platform data object to link the user and/or relationships of the first member platform 830 to those of the second member platform 850 within the first member service 832.

At operation 866, the centralized key exchange platform (e.g., second member service 848) may provide the second cross-platform data object to the first member service 832.

At operation 868, the centralized key exchange platform 102 (e.g., first member service 832) may search for a first cross-platform data object that comprises at least one of the one or more member-specific identifiers of the second cross-platform data object. The first member service 832 may update the first cross-platform data object by aligning (e.g., joining) the first cross-platform data object with the second cross-platform data object. By way of example, the first member service 832 may store a user identifier and/or one or more relationship identifiers respectively corresponding to a user and/or one or more relationships of the second member platform 850 within the first cross-platform data object to link the user and/or relationships of the second member platform 850 to those of the first member platform 830 within the first member service 832.

At operation 870, the centralized key exchange platform 102 (e.g., second member service 848) may return, via a second member interface between the centralized key exchange platform 102 and the second member platform 850, a success message to the second member platform 850. At operation 872, the second member platform 850 may return the success message back to the user 802 to indicate a successful linking operation between one or more relationships respectively maintained at the first member platform 830 and/or the second member platform 850. In some examples, operations 870 and 872 may be performed asynchronously with operations 866 and 868.

In some embodiments, at operation 874, the centralized key exchange platform 102 (e.g., first member service 832) may provide the first cross-platform data object to the cross-platform service 512. Operation 874, for example, may be performed asynchronously with operations 866 and 868. Upon reception of the first cross-platform data object, the cross-platform service 512 may search for a cross-platform data object that comprises at least one of the one or more member-specific identifiers of the first cross-platform data object. The cross-platform service 512 may update the cross-platform data object by aggregating (e.g., joining) the identifiers of the cross-platform data object with the first cross-platform data object. By way of example, the cross-platform service 512 may store a user identifier and/or one or more relationship identifiers respectively corresponding to a user and/or one or more relationships of the second member platform 850 within the cross-platform data object. In addition, or alternatively, the cross-platform service 512 may store a user identifier and/or one or more relationship identifiers respectively corresponding to a user and/or one or more relationships of the first member platform 830 within the cross-platform data object. In this manner, the cross-platform service 512 may link the user and/or relationships of the first and second member platforms at the network level.

In some embodiments, the cross-platform service 512 identifies a plurality of cross-platform data objects that each correspond to at least one identifier of the first cross-platform data object. For example, the cross-platform service 512 may comprise first network-level cross-platform data object that comprises first system user identifier of the first member platform and/or a second network-level cross-platform data object that comprises second system user identifier of the second member platform. In response to the detection of the plurality of cross-platform data objects, the cross-platform service 512 may merge the cross-platform data objects using one or more deduplication rules. In some examples, the cross-platform data objects may be merged in response to user input that confirms the user's intent to merge their separate identities into a universal one.

In some examples, the deduplication rules may comprise a priority scheme for selecting a primary cross-platform data object. The priority scheme, for example, may comprise a prioritized list of member platforms (e.g., where the cross-platform data object comprising the highest priority member is selected as primary), a decision logic based on a number of relationships within a cross-platform data object (e.g., where the cross-platform data object comprising the most relationship is selected as primary), and/or the like. In some examples, the prioritized list of member platforms may be based on a number of relationships associated with up to each of the member platforms. To merge two cross-platform data objects, the centralized key exchange platform 102 may deprecate a secondary user identifier and/or cross-platform key and replace the identifiers with primary user identifier and/or cross-platform key of the primary cross-platform data object. In addition, or alternatively, the centralized key exchange platform 102 may generate a new cross-platform key and/or user identifier and reset both the primary and secondary identifiers with the new cross-platform key and/or user identifier.

In some embodiments, the network-level cross-platform data object may comprise a set of system user identifiers, a set of system relationship identifiers, and/or a set of member partitions respectively corresponding to a set of different member platforms, including the first member platform 830 and second member platform 850. The cross-platform service 512 may, at a defined frequency and/or in response to an update to the network-level cross-platform data object, push a current state of the network-level cross-platform data object to up to each of the member platforms associated with at least one identifier within the network-level cross-platform data object. In this manner, the network-level cross-platform data object may be leveraged to push updates across member subsets within a network or member platforms to maintain a consistent state across all member services within the centralized key exchange platform 102.

In some embodiments, the linking process described with reference to FIGS. 8A-C may be leveraged to carry data between member platforms, such as the first member platform 830 and/or second member platform 850. For example, as described further with reference to FIGS. 9A-B, during a linking process, the user 802 may leverage Know Your Customer (KYC) assertions from the first member platform 830 to securely share the user's identity with the second member platform 850. In addition, or alternatively, once a link is established, the user 802 may authorize secure, cross-platform information exchanges between the first member platform 830 and the second member platform 850.

V. Cross-Platform Assertions

FIGS. 9A-C provides a message flow diagram illustrating key exchange operations for facilitating cross-platform assertions in which different, linked platforms may collaborate to anonymously share information with respect to a relationship. Through the operations of the depicted message flow diagram, a centralized key exchange platform 102 may leverage an aggregated set of instruments (or other relationships) for a particular client device, or user 802 thereof, to provide claims (e.g., asserted facts) based on information already recorded by the platforms facilitating those relationships. For example, as described herein, the centralized key exchange platform 102 may link different relationship data objects across affiliated platforms of the centralized key exchange platform 102. During the linking process, which is detailed by FIGS. 9A-B, the centralized key exchange platform 102 may verify the user's identity through claims carried by the linking messages described with respect to FIGS. 8B-C. Once linked, the centralized key exchange platform may receive, process, and execute assertions from and between different registered platforms, without exposing sensitive credentials to a network.

More particularly, FIGS. 9A-B depict a modified linking process in which the linking process of FIGS. 8A-C may be augmented to provide assertions that verify information on behalf of a user 802, without persistently storing the verified information. FIG. 9A, for example, depicts a modified linking request stage, in which a linking request may be augmented with assertions about a user 802. For example, a user 802 may initiate the modified linking procedure with another member platform (e.g., second member platform 850) using a preexisting relationship between the user 802 and an enrolled member platform (e.g., first member platform 830).

At the modified linking request stage, the user 802 may initiate the linking process through a first member platform 830 that is already enrolled with the centralized key exchange platform 102. To do so, at operation 902, the user 802 may request a linking code from the first member platform 830. By way of example, the user 802 may authenticate themselves, in accordance with the first member platform's authentication protocols, to access a user account maintained by the first member platform 830. In some examples, the user account may be provided, rendered, and/or the like within a member user interface at least partially hosted by the first member platform 830. The user 802 may initiate the linking process by interacting with a linking option provided within the member user interface.

In the modified linking request stage, a linking code request may comprise a request for a linking code that may be backed by assertions of the user's identity. For example, the assertion-backed linking code request may comprise a linking code request with one or more authorized assertions.

At operation 904, the first member platform 830 may receive the assertion-backed linking code request and, in response to the request, the first member platform 830 may call the centralized key exchange platform 102. For example, the first member platform 830 may forward the assertion-backed linking code request to a first member service 832 using a preconfigured member interface. The assertion-backed linking code request, for example, may be encapsulated within a member-specific assertion-backed linking code request defined by the member interface.

At operation 906, the centralized key exchange platform 102 (e.g., first member service 832) may instantiate (and/or access) a connect service 510 and/or provide the member-specific assertion-backed linking code request to the connect service 510. For example, the first member service 832 may generate and provide an internal assertion-backed linking code request to the connect service 510. The internal assertion-backed linking code request may comprise one or more member-specific identifiers and/or assertions within the member-specific assertion-based linking code request, the member partition of corresponding to the first member platform 830.

At operation 908, the centralized key exchange platform 102 (e.g., connect service 510) may generate an ephemeral transport object in response to the internal assertion-backed linking code request. To do so, the centralized key 102 exchange platform (e.g., connect service 510) may generate a linking code. The linking code, for example, may comprise a UUID, a six-digit alpha-numeric code, and/or the like, as described herein. In some examples, the connect service 510 may temporarily store the linking code, the member partition, the one or more member identifiers, and/or the one or more assertions within the ephemeral transport object.

At operation 910, the centralized key exchange platform 102 (e.g., connect service 510) may provide the linking code to the first member service 832. At operation 912, the first member service 834, via a first member interface between the centralized key exchange platform 102 and the first member platform 830, may return the linking code to the first member platform 830. At operation 914, the first member platform 830 may return the linking code to the user 802.

Turning to FIG. 9B, at the modified link establishing stage of the modified linking process, the user 802 may establish an assertion-backed and cross-platform link between two member platforms (e.g., the first member platform 830 and second member platform 850) using a linking code issued in accordance with the modified linking request stage described above. In some examples, the modified link establishing stage may be performed immediately after the modified linking request stage. For example, as described herein, the linking code may be associated with a validation time window that may nullify the efficacy of the linking code if used outside of a threshold time period.

At operation 916, the user 802 may provide a linking request with the linking code to second member platform 850 that may or may not be enrolled with the centralized key exchange platform 102. By way of example, the user 802 may authenticate themselves, in accordance with the second member platform's authentication protocols, to access a user account maintained by the second member platform 850. In some examples, the user 802 may provide the linking request to the second member platform 850 through interaction with a member user interface as described herein.

At operation 918, the second member platform 850 may receive the linking request and, in response to the linking request, the second member platform 850 may call the centralized key exchange platform 102. For example, the second member platform 850 may forward the linking request to a second member service 848 using a preconfigured member interface. The linking request, for example, may be encapsulated within a member-specific linking request defined by the member interface, as described herein.

At operation 920, the centralized key exchange platform 102 (e.g., second member service 848) may provide the member-specific linking request to the connect service 510. For example, the second member service 848 may generate and provide an internal linking request to the connect service 510. The internal linking request may comprise one or more member-specific identifiers within the member-specific linking request and/or the member partition corresponding to the second member platform 850.

At operation 922, the centralized key exchange platform 102 (e.g., connect service 510) may look up the ephemeral transport object corresponding to the linking code. In the event that an ephemeral transport object corresponding to the linking code exists, the connect service 510 may return the object data within the ephemeral transport object to the second member service 848, at operation 924. Otherwise, the connect service 510 may return a null response.

At operation 926, if the ephemeral transport object exists, the centralized key exchange platform 102 (e.g., connect service 510) may remove, deprecate, and/or delete the ephemeral transport object. In this manner, any assertions provided by the first member platform 830 may be removed at the network level, thereby removing the centralized key exchange platform 102 as an additional attack vector.

At operation 928, the centralized key exchange platform 102 (e.g., second member service 848) may return the assertions within the object data to the second member platform 850 to verify and/or augment the identity of the user 802 within the second member platform 850 using information from another trusted party, the first member platform 830. While not depicted, the centralized key exchange platform 102 may asynchronously perform the linking process, as described with reference to FIG. 8C, of creating and/or modifying a cross-platform data object within the second member service 848, the first member service 832, and/or at the network-level.

In some examples, the downstream linking process may be performed in response to a verification of the user identity. For example, the second member platform 850 may compare the assertions to member-specific data available to the second member platform 850. The second member platform 850 may provide a linking authorization response to the centralized key exchange platform 102 (e.g., second member service 848) that authorizes or rejects a link between a user and/or relationship of the second member platform 850 with a user and/or relationship of the first member platform 830. The linking authorization response, for example, may authorize the link in response to a determination that the assertions match the member-specific data. In addition, or alternatively, the linking authorization response may reject the link in response to a determination of a mismatch between the assertions and the member-specific data.

In some examples, the centralized key exchange platform 102 may leverage cross-platform links to continue to share information between trusted member platforms that share a cross-platform data object. An encrypted embodiment of the information sharing technique is described in further detail with reference to FIG. 9C.

Turning to FIG. 9C, FIG. 9C depicts an information sharing example between the first member platform 830 and the second member platform 850. The first member platform 830 and the second member platform 850 may be linked to a user 802 through a shared, cross-platform data object that stores a first set of system identifiers (e.g., system user identifier, system relationship identifiers) corresponding to the first member platform 830 and a second set of system identifiers (e.g., system user identifier, system relationship identifiers) corresponding to the second member platform 850. As depicted, after a link is established, a cross-platform data object may be leveraged to initiate communications between two, unaffiliated member services (e.g., first member service 832 and second member service 848). Through these communications, the centralized key exchange platform 102 may share data across platforms in a secure manner without leaving traceable data relics within the centralized key exchange platform 102 (e.g., the data is never persistently stored within the centralized key exchange platform 102)

At operation 930, a user 802 may initiate the information sharing process through an interaction with the first member platform 830. For example, the user 802 may authorize an information sharing interaction between the first member platform 830 and second member platform 850. To do so, at operation 930, the user 930 may provide an assertion request to the first member platform 830. By way of example, the user 802 may authenticate themselves, in accordance with the first member platform's authentication protocols, to access a user account maintained by the first member platform 830. In some examples, the user account may be provided, rendered, and/or the like within a member user interface at least partially hosted by the first member platform 830. The user 802 may initiate the information sharing process by interacting with an assertion option provided within the member user interface.

The assertion request may comprise a request for one or more assertions from at least one linked account associated with the user 802. In some examples, the assertion request may comprise an indication that information sharing is authorized for the first member platform 830. In addition, or alternatively, the assertion request may comprise a set of authorized assertions and/or a designated member platform from which the set of authorized assertions is approved. The designated member platform, for example, may comprise the second member platform 850.

At operation 932, the first member platform 830 may receive the assertion request and, in response to the assertion request, the first member platform 830 may call the centralized key exchange platform 102 (e.g., the first member service 832). For example, the first member platform 830 may forward the assertion request to a first member service 832 using a preconfigured member interface. The assertion request, for example, may be encapsulated within a member-specific assertion request defined by the member interface. For example, the centralized key exchange platform 102 may receive, originating from the first member platform 830 within a member computing ecosystem, the member-specific assertion request encapsulating an assertion request from a user of the first member platform. In some examples, the member-specific assertion request may comprise an authorized assertion and/or one or more member-specific identifiers, such as a first member partition corresponding to the first member platform, a first member-specific user identifier corresponding to a first user associated with the first member platform, and/or the like.

In some examples, the member-specific assertion request may comprise the assertion request and/or one or more encryption criteria for encrypting assertions for the assertion request. The encryption criteria, for example, may comprise a cryptographic key, a hash algorithm, and/or the like. In some examples, the encryption criteria may comprise a public encryption key that is paired to a private encryption key accessible to the first member platform 830.

At operation 934, the centralized key exchange platform 102 (e.g., first member service 832) may provide the member-specific assertion request to a member service corresponding to another member platform associated with the user 802. To do so, the first member service 832 may access a local construct of a cross-platform data object for the user 802 (e.g., corresponding to a system user identifier or system relationship identifier of the first member platform 830) and identify one or more affiliated member platforms based on one or more member partitions within the cross-platform data object. In some examples, the first member service 832 may select one of the one or more affiliated member platforms. For example, the first member service 832 may select an affiliated member platform based on a designated member platform in the request message. In addition, or alternatively, the first member service 832 may randomly select (or select based on selection criteria, such as a rule that favors selection of a member platform associated with a largest number of system identifiers within the cross-platform data object) the affiliated member platform from the one or more affiliated member platforms within the cross-platform data object.

The affiliated member platform, for example, may comprise the second member platform 850. In addition, or alternatively, the first member service 832 may select up to each of the one or more affiliated member platforms within the cross-platform data object. In such a case, the operations performed with respect to the second member platform 850 may be performed (e.g., asynchronously, in parallel, or sequentially) for up to each of the one or more affiliated member platforms within the cross-platform data object. The first member service 832, for example, may provide an internal member-specific assertion request to the second member service 848 and/or one or more other member services corresponding to one or more other selected member platform within the cross-platform data object. For example, the centralized key exchange platform 102 may provide an internal member-specific assertion request to an internal service (e.g., second member service 848) associated with the second member platform 850 based on the second member-specific identifier (e.g., second member partition). The internal member-specific assertion request may comprise one or more member-specific identifiers (e.g., the first member-specific identifier) and/or the assertion requests (e.g., the authorized assertions thereof) within the member-specific assertion request, a member partition of corresponding to the first member platform 832, and/or the like.

At operation 936, the centralized key exchange platform 102 (e.g., second member service 834) may receive the internal member-specific assertion request from the first member service 832 and forward the internal member-specific assertion request to the second member platform 850 (e.g., via a preconfigured member interface between the centralized key exchange platform 102 and the second member platform 850). For example, the centralized key exchange platform 102 (e.g., the second member service 834) may provide an incoming member-specific assertion request to the second member platform 850. The incoming member-specific assertion request may comprise the assertion requests within the member-specific assertion request, the public encryption key, and/or one or more references or keys (e.g., user references, user keys, relationship references, relationship keys) corresponding to one or more relationships between the second member platform 850 and the user 802. In some examples, the incoming member-specific assertion request may comprise the public encryption key and/or encryption instructions for encrypting data associated with the authorized assertion using the public encryption key. By way of example, the centralized key exchange platform 102 may provide, via an internal service (e.g., the second member service 834) the incoming member-specific assertion request to the second member platform 850 that comprises the authorized assertion of the assertion request.

At operation 938, a user 802 may authorize information sharing from the second member platform 850 through an interaction with the second member platform 850. To do so, at operation 938, the user 930 may provide an assertion authorization to the second member platform 850. By way of example, the user 802 may authenticate themselves, in accordance with the second member platform's authentication protocols, to access a user account maintained by the second member platform 850. In some examples, the user 802 may log in in response to a push notification from the second member platform 850 that indicates a reception of the incoming member-specific assertion request. By way of example, the second member platform 850 may initiate a push notification on a user device associated with the user. For instance, user input identifying the authorization may be provided in response to a push notification initiated by the second member platform 850 in response to providing the incoming member-specific assertion request to the second member platform 850. In some examples, after logging on, the user account may be provided, rendered, and/or the like within a member user interface at least partially hosted by the second member platform 850. The user 802 may authorize the information sharing process by interacting with an assertion icon provided within the member user interface.

At operation 940, the second member platform 850 may generate and/or encrypt a set of assertion responses to the set of assertion requests of the incoming member-specific assertion request. For example, the second member platform 850 may query an internal database, using the one or more references and/or keys within the incoming member-specific assertion request, to receive a set of assertion responses respectively corresponding to one or more of the set of assertion requests. In some examples, the second member platform 850 may apply the public key (e.g., via one or more asymmetric key encryption techniques) to the set of assertion responses to generate a set of encrypted responses respectively corresponding to one or more of the set of assertion requests. By way of example, the assertion response may comprise an encrypted response that encrypts data associated with an authorized assertion of an assertion request.

At operation 942, the second member platform 850 may provide an assertion response to the centralized key exchange platform 102 (e.g., second member service 834). For example, responsive to receiving a user input at the second member platform 850, the centralized key exchange platform 102 may receive an assertion response at the internal service (e.g., the second member service 848) and from the second member platform 850. The assertion response may comprise the one or more references and/or keys of the incoming member-specific assertion request and a set of encrypted (or unencrypted) responses.

At operation 944, the centralized key exchange platform 102 (e.g., second member service 834) may receive the assertion response from the second member platform 850 and forward the assertion response to the first member service 832. For example, the centralized key exchange platform 102 (e.g., the second member service 834) may provide an internal assertion response to the first member service 832.

The internal assertion response may comprise the set of encrypted (or unencrypted) responses and/or one or more member-specific identifiers corresponding to the first member partition within a cross-platform data object that comprise one or more of the references or keys within the assertion response. For example, the second member service 834 may identify the cross-platform data object based on the one or more of the references or keys within the assertion response. Using the first member partition, received via the internal member-specific assertion request, the second member service 834 may identify one or more system user identifiers and/or system relationship identifiers that correspond to the first member platform 830 within the cross-platform data object.

At operation 946, the centralized key exchange platform 102 (e.g., first member service 832) may receive the internal assertion response and forward the internal assertion response to the first member platform 830 (e.g., via a preconfigured member interface between the centralized key exchange platform 102 and the first member platform 830). For example, the centralized key exchange platform 102 (e.g., the first member service 832) may provide an outgoing assertion response to the first member platform 830. The outgoing assertion response may comprise the encrypted (or unencrypted) assertion responses within the assertion response and/or one or more references or keys (e.g., user references, user keys, relationship references, relationship keys) corresponding to one or more relationships between the first member platform 830 and the user 802.

At operation 948, the first member platform 830 may receive and/or decrypt the set of assertion responses of the incoming assertion response. For example, the first member platform 830 may apply the private key (e.g., via one or more asymmetric key encryption techniques) to the set of encrypted assertion responses to generate a set of assertion responses respectively corresponding to one or more of the set of assertion requests of the original assertion request. The first member platform 830 may store the set of assertion responses in association with the user 802. In this manner, the centralized key exchange platform 102 may facilitate a secure message exchange between the first and second member platforms without accessing data underlying the exchange.

VI. Cross-Platform Network Exchanges

FIGS. 10A-B provide message flow diagrams illustrating key exchange operations for facilitating a cross-platform exchange in which different, linked platforms may collaborate with respect to a single user request. Through the operations of the depicted message flow diagrams, a centralized key exchange platform may leverage an aggregated set of instruments (or other relationships) for a particular client device 104, or user 802 thereof, to facilitate a request using multiple, disparate platforms. For example, as described herein, the centralized key exchange platform 102 may link different relationship data objects across affiliated platforms of the centralized key exchange platform 102. Using these preexisting links, the centralized key exchange platform 102 may iteratively apply different relationships to a request during an iterative request processing scheme that leverages communication channels across multiple platforms to collaboratively process the request. In this way, a user 802 may issue a request that references a single platform and receive a response that involves multiple linked platforms. This, in turn, allows the user 802 to issue requests in a platform agnostic manner.

The cross-platform exchange operations depicted by FIGS. 10A-B may be performed across a series of secure key exchange stages. At a first stage, depicted by FIG. 10A, a user 802 may leverage a key (e.g., a UUEK) from the centralized key exchange platform 102 to initiate an exchange request at an affiliated member platform or other terminal 1002. At a second stage, depicted by FIG. 10B, the centralized key exchange platform 102 may leverage relationship mappings within a nodal key mapping structure managed by the centralized key exchange platform 102 to collaboratively process the exchange request using multiple affiliated platforms.

More particularly, referring first to FIG. 10A and the request initiation stage of the cross-platform exchange process, at operation 1004, the user 802 may initiate an exchange at an input device, such as the terminal 1002. For example, the user 802 may initiate the exchange by providing a UUEK to the terminal 1002, and/or another interface (e.g., user interface) hosted, and/or otherwise affiliated with a requester platform. By way of example, the UUEK may be entered via manual input, through a network message initiated by user input, through a near-field communication (NFC) message, and/or the like.

At operation 1006, the terminal 1002 (or other first or third party interface with the requester platform) may receive the UUEK, generate an exchange request based on the UUEK, and provide the exchange request to the centralized key exchange platform 102 (e.g., a first member service 832 of the centralized key exchange platform 102). For example, the terminal 1002 may generate the exchange request based on one or more exchange attributes associated with the UUEK. The exchange attributes, for example, may comprise one or more attributes associated products for purchase using the UUEK, an information exchange powered by the UUEK, and/or attributes associated with any other network communication that may be secured using a UUEK that is issued and validated by the centralized key exchange platform 102.

In some examples, the exchange request may comprise request data for executing an exchange based on the UUEK for the particular use case (e.g., a requester-specific UUEK when the user has an enrolled relationship, a provider-specific UUEK when the user does not have an enrolled relationship). The exchange request, for example, may comprise a request that comprises the UUEK, one or more exchange attributes, and/or the like.

In addition to the UUEK, the exchange request may comprise exchange attributes that may record metadata for the request. The exchange attributes may depend on the domain and/or type of request. For example, for an information retrieval request, the exchange attributes may comprise a set of information queries (e.g., assertion requests) for another member platform. For a transaction request, the exchange attributes may comprise at least one of a transaction value (e.g., a summation of one or more line items in a financial exchange comprising one or more modifiers, such as taxes, discounts), an order number, one or more line item attributes comprising a sequence, a line item group, a product code, a description, a quantity, a unit-item, gram, kilogram, etc., a unit amount, a unit tax amount, a line amount (e.g., amount of the line item), a line tax amount, etc., one or more line item adjustments comprising a sequence, an adjustment type (e.g., manufactures discount, a store discount, a return, a payment cash, a payment gift card, payment other, etc.), a product code, a description, a quantity, a unit-item, gram, kilogram, etc., a unit amount, a unit tax amount, a line amount (e.g., amount of the line item), a line tax amount, and/or the like. In addition, or alternatively, the exchange attributes may comprise a channel identity (e.g., a type of money exchange for a financial value system, such as a domestic or international ACH, a wire transfer, a swift transfer, a real time payment), a currency (e.g., for financial value systems), a clerk identifier, and/or the like.

In some examples, in any domain, the exchange attributes may comprise a request approval type (e.g., full or partial), a requester interaction reference (e.g., the requester platform's reference for the exchange), an organization key (e.g., a platform identifier for a requester organization), an organization category (e.g., airline, apparel), an establishment key (e.g., a platform identifier for a retail location), and/or other traceable information for the exchange.

In some examples, the terminal 1002 may provide the exchange request to the first member service 832 through an interface (e.g., requester interface) preestablished between a member platform (e.g., requester platform) associated with the terminal 1002 and the centralized key exchange platform 102. For example, the terminal 1002 may correspond to a requester platform that hosts, manages, and/or is otherwise affiliated with the terminal 1002. The terminal 1002, for example, may function as any interface between the user 802 and the requester platform. In this way, the terminal 1002 may forward a request to the requester platform, the requester platform may generate the exchange request, and the requester platform may provide the exchange request to the requester service 502 corresponding to the requester platform through a requester interface preestablished between the requester platform and the requester service 502.

At operation 1008, the centralized key exchange platform 102 (e.g., the first member service 832) may determine one or more linked members corresponding to the exchange request. For example, the first member service 832 may process the exchange request in accordance with the exchange-level mapping technique described with reference to FIG. 7 to identify a system exchange data object based on the partition and/or exchange identifier of the UUEK. The first member service 832 may look up a relationship data object using one or more identifiers (e.g., member partition, relationship identifier) within the system exchange data object. As described herein, the relationship data object may comprise a member partition, a relationship reference, a system relationship identifier, a relationship key, and/or the like. The first member service 832 may search for a local data construct of a cross-platform data object that comprises at least one of the identifiers of the exchange data object, the relationship data object, and/or the UUEK. In some examples, the first member service 832 may determine one or more linked members based on one or more referential keys and/or identifiers within the local data construct of a cross-platform data object.

In some embodiments, the first member service 832 is a requester service. For example, the UUEK (e.g., a partition thereof) may correspond to a requester platform. In such a case, the exchange data object may comprise a requester-specific exchange data object and the one or more linked members may comprise an authorizing provider platform and/or one or more contributing member platforms. Up to each of the one or more contributing member platforms may comprise a value platform and/or provider platform. In some examples, the authorizing provider platform may be identified by a linked relationship identifier (e.g., system instrument identifier) within the requester-specific exchange data object. The one or more contributing member platforms may be identified by member-specific identifiers (e.g., partitions, system instrument identifiers) within the local data construct of a cross-platform data object. In this manner, the local data construct of the cross-platform data object may be identified based on the UUEK. In some examples, the local data construct may comprise a first member-specific identifier corresponding to the first member platform 830 and/or a second member-specific identifier corresponding to the second member platform 850.

In some embodiments, the first member service 832 is a provider service. For example, the UUEK (e.g., a partition thereof) may correspond to a provider platform. In such a case, the exchange data object may comprise a provider-specific exchange data object and the one or more linked members may comprise one or more contributing member platforms. Up to each of the one or more contributing member platforms may comprise a value platform and/or another provider platform. In some examples, the authorizing provider platform may be identified by the partition of the UUEK, whereas the one or more contributing member platforms may be identified by member-specific identifiers (e.g., partitions, system instrument identifiers) within the local data construct of a cross-platform data object.

For simplicity, the following operations of the cross-platform exchange process will be detailed using the example of the first member service 832 as a provider service. However, a person of ordinary skill in the art would understand that the same, or similar, operations may be performed using the example of the first member service 832 as a requester service. In such a case, the cross-platform exchange process may comprise an additional step of providing the exchange request to the provider service from the requester service.

At operation 1010, the centralized key exchange platform 102 (e.g., the first member service 832) may provide a value request to a second member service 848 corresponding to at least one of the one or more one or more linked members. By way of example, the first member service 832 may provide the value request to an internal service (e.g., second member service 848) corresponding to the second member platform 850. In some examples, the value request may be provided to the internal service (e.g., second member service 848) using a second member partition corresponding to the internal service (e.g., second member service 848). By way of example, the second member partition may identify a location of the internal service (e.g., second member service 848).

The value request may comprise one or more member-specific identifiers (e.g., second member-specific identifier) associated with the second member service 848. In addition, or alternatively, the value request may comprise at least a portion of the exchange request. In some examples, the value request may comprise a first member partition, a second member partition, the exchange identifier, the UUEK, one or more member-specific relationship identifiers, one or more member-specific user identifiers, and/or the like.

At operation 1012, the centralized key exchange platform 102 (e.g., the second member service 832) may evaluate one or more contribution rulesets associated with the one or more member-specific identifiers. The contribution ruleset, for example, may define one or more authorized exchange types, an authorized contribution amount (e.g., set amount, percentage), an authorized contribution time period, and/or any other criteria for informing a contribution from a second member platform 850. In some examples, the contribution ruleset may be set by the user 802 (e.g., through direct interaction with the second member platform 850, through a cross-platform service hosted by the centralized key exchange platform 102). By way of example, the contribution ruleset may be set by the user 802 through an interaction with the second member platform 850. The contribution ruleset, for example, may define one or more time, place, and/or exchange attribute-level restrictions for use of one or more relationships at the second member platform 850. In addition, or alternatively, the contribution ruleset may define a contribution limit, a contribution percentage, and/or other limitations on the extent and/or manner of use of the one or more relationships at the second member platform 850.

At operation 1014, the centralized key exchange platform 102 (e.g., the second member service 834), in response to determining that the one or more contribution rulesets are satisfied, may place a hold on relationship data object corresponding to the one or more member-specific identifiers. The hold, for example, may identify a contributed amount for the exchange request in accordance with the one or more contribution rulesets.

At operation 1016, the centralized key exchange platform 102 (e.g., the second member service 834) may modify the exchange request based on the hold. For example, the second member service 832 may decrement a requested value of the exchange request by the contributed amount.

At operation 1018, the centralized key exchange platform 102 (e.g., the second member service 834) may provide an updated exchange request to the first member service 832. In this manner, the centralized key exchange platform 102 (e.g., the first member service 832) may receive, based on the contribution ruleset corresponding to the second member platform, an updated exchange request from one or more internal services (e.g., the second member service 834). The updated exchange request, for example, may comprise the decremented requested value and/or one or more contribution metadata regarding the decremented requested value (e.g., identifying the manner of the modification, the platform responsible for the modification, an updated instrument summary after the modification).

The centralized key exchange platform 102 (e.g., the first member service 832) may receive the updated exchange request and return to operation 1010 for up to each of the one or more linked members identified within the local construct of the cross-platform data object. In some examples, the first member service 832 may sequentially call up to each of the one or more linked members. In addition, or alternatively, the first member service 832 may call one or more of the linked members in parallel. In this manner, the first member service 832 may pool together multiple, disparate member platforms for a single exchange request that, on its face, is unrelated to the multiple, disparate member platforms.

Turning to FIG. 10B and the request processing stage of the cross-platform exchange process, the centralized key exchange platform 102 may iteratively process the exchange request by collaborating with up to each of the one or more linked platforms to preemptively modify an exchange request before communication with the first member platform 830.

At operation 1020, the centralized key exchange platform 102 (e.g., the first member service 832) may provide an adjusted authorization request to the first member platform 830. For example, the centralized key exchange platform 102 (e.g., the first member service 832) may provide the adjusted authorization request to the first member platform 830 based on the updated exchange request.

At operation 1022, the first member platform 830 may provide an authorization response to the centralized key exchange platform 102 (e.g., the first member service 832). For example, the centralized key exchange platform 102 (e.g., the first member service 832) may receive, from the first member platform 830, an authorization response based on the adjusted authorization request.

At operation 1024, the centralized key exchange platform 102 (e.g., the first member service 832) may provide the authorization response (and/or an indication thereof) to the second member service 834. By way of example, the first member service 832 may provide the authorization response (e.g., success or failure) to up to each of the one or more linked member services.

At operation 1026, the centralized key exchange platform 102 (e.g., the second member service 834) may update the hold on the relationships involved in the exchange request. For example, up to each of the one or more linked member services may update their respective holds by decrementing an available balance in response to a successful authorization response and/or removing the hold in response to a failure authorization response.

At operation 1028, the centralized key exchange platform 102 (e.g., the second member service 834) may provide an update message (and/or an indication thereof) to the second member platform 850. By way of example, the member service for up to each of the linked member platforms may provide update messages (and/or indications thereof) to up to each of the one or more linked member platforms.

At operation 1030, the second member platform 850 may provide an acknowledgement message (and/or an indication thereof) to the second member service 834. By way of example, the member platform for up to each of the linked member platforms may provide acknowledgement messages (and/or indications thereof) to their affiliated member services. In the event of a value platform, the acknowledgement message may comprise a confirmation message acknowledging the use of an offered instrument. In the event of a provider platform, the acknowledgement message may comprise an authorization message confirming the availability of the value applied to the exchange request.

At operation 1032, centralized key exchange platform 102 (e.g., the second member service 834) may provide a success message (and/or an indication thereof) to the first member service 832.

At operation 1034, centralized key exchange platform 102 (e.g., the first member service 832) may provide a success message (and/or an indication thereof) to the terminal 1002. By way of example, the centralized key exchange platform 102 (e.g., the first member service 832) may provide the authorization response to the terminal 1002. In some examples, the centralized key exchange platform 102 (e.g., the first member service 832) may provide the authorization response to the terminal and the internal service (e.g., second member service 848), concurrently.

At operation 1034, terminal 1002 may provide a success message (and/or an indication thereof) to the user 802.

VII. Automated Cross-Platform Exchanges

FIGS. 11A-B provide message flow diagrams illustrating key exchange operations for facilitating cross-platform network exchanges in which different platforms may collaborate to anonymously authorize an exchange. Through the operations of the depicted message flow diagram, a centralized key exchange platform 102 may implement a key passing scheme, and a preexisting relationship, to authorize an exchange at an unaffiliated platform. For example, as described herein, the centralized key exchange platform 102 may leverage communication channels between different platforms to authorize network exchanges on behalf of a user without the use of persistent credentials. Using these communication channels, for example, the centralized key exchange platform 102 may issue linking codes to verify the identity of the user 802. The linking codes may be used to generate an ephemeral key (e.g., UUEK) that may temporarily authorize communications between a trusted platform (e.g., the second member platform 850) and an unaffiliated platform (e.g., first member platform 830). In this way, a centralized key exchange platform 102 may power a secure, zero trust communication system that leverages a trusted relationship with one platform to secure communications with another, untrusted platform. This, in turn, enables faster and secure communications between platforms in a less obtrusive manner, among other benefits described herein.

The cross-platform exchange operations depicted by FIGS. 11A-B may be performed across a series of secure key exchange stages. At a first stage, depicted by FIG. 11A, a user 802 may initiate an exchange request at an unaffiliated member platform (e.g., the first member platform 830). At a second stage, depicted by FIG. 11B, the centralized key exchange platform 102 may leverage a key passing scheme to imply a relationship from an affiliate member platform (e.g., second member platform 850). The centralized key exchange platform 102 may issue an ephemeral key based on this implied relationship to empower a secure network exchange without requiring identifying information from the user 802.

More particularly, referring first to FIG. 11A and the request initiation stage of the anonymous exchange process, at operation 1102, the user 802 may provide an anonymous exchange request to a first member platform 830. The anonymous exchange request may comprise a request to complete an anonymous exchange with the first member platform 830. For example, the anonymous exchange request may comprise one or more exchange attributes as described herein with respect to the exchange request. However, in an anonymous exchange, the anonymous exchange request may not comprise a UUEK for authorizing the exchange request.

At operation 1104, the first member platform 830 may request a linking code from the user 802. The linking code request, for example, may comprise a prompt, message, and/or the like within a terminal, user interface, and/or the like that requests a linking code. For instance, the linking code request may comprise a request message (e.g., an API request) that requests a linking code from the user 802.

At operation 1106, the user 802 may request the linking code from an affiliated member platform, such as the second member platform 850. For example, the user 802 may initiate a linking code request for the second member platform 850, as described herein. In some examples, the linking code request may be received by the second member platform 850 via a second interface preconfigured for the second member platform 850.

At operation 1108, the second member platform 850 may forward the linking code request to the centralized key exchange platform 102 (e.g., a second member service 848 thereof). In this way, responsive to an exchange request at the first member platform 830 within the member computing ecosystem, the centralized key exchange platform 102 may receive, originating from the second member platform 850 within the member computing ecosystem, a linking code request comprising a second member-specific identifier corresponding to the second member platform 850.

At operation 1110, the centralized key exchange platform 102 (e.g., a second member service 848 corresponding to the second member platform 850) may generate and provide the linking code to the second member platform 850. By way of example, as described herein with reference to FIGS. 8A-C, the centralized key exchange platform 102 (e.g., a second member service 848) may provide, to an internal service (e.g., the connect service 510), the linking code request to generate an ephemeral transport object storing a linking code and/or one or more second member-specific identifiers. For example, the centralized key exchange platform 102 may instantiate the internal service, provide the second member-specific identifier to the internal service to initiate a generation of the linking code and the ephemeral transport object, and/or receive the linking code from the internal service.

In some examples, the ephemeral transport object may store a link reference corresponding to the one or more second member-specific identifiers and/or the linking code. By way of example, the linking code may comprise a UUID, and the link reference may comprise the linking code wrapped by at least one of the one or more second member-specific identifiers and/or another UUID separate from the linking code. As an example, the link reference may comprise the linking code wrapped by a second member partition corresponding to the second member platform 850. In addition, or alternatively, another randomly generated UUID that is stored within the ephemeral transport data object with linking code. The second member platform 850 may provide the linking code (e.g., generated by the connect service 510) to the second member platform 850.

In some examples, the ephemeral transport object may be removed in response to receiving the link reference from the ephemeral transport object and/or in response to an elapsed time exceeding a time threshold (e.g., a 1 minute transaction window). By way of example, the ephemeral transport object may be created with a "one-time" use and/or "anonymous use" tag that constrains the use of the ephemeral transport object to a single exchange.

At operation 1112, the second member platform 850 may provide the linking code to the user 802. The second member platform 850, for example, may provide a prompt, message, and/or the like to the user 802 that comprises the linking code.

At operation 1114, the user 802 may provide the linking code to the first member platform 830 and, at operation 1116, the first member platform 830 may provide the linking code to the centralized key exchange platform 102 (e.g., a first member service 832 thereof). In this manner, the centralized key exchange platform 102 (e.g., a first member service 832 thereof) may receive, originating from the first member platform 830 within the member computing ecosystem, a linking request comprising the linking code. The linking request, for example, may be received via a first interface preconfigured for the first member platform 830.

At operation 1118, the centralized key exchange platform 102 (e.g., the first member service 832) may provide the linking code to the connect service 510 to receive, at operation 1120, the link reference corresponding to the linking code. To do so, the centralized key exchange platform 102 (e.g., first member service 832) may provide the linking code to the internal service (e.g., connect service 510). The connect service 510 may use the linking code to determine the ephemeral transport object and, based on the determined ephemeral transport object, the connect service 510 may response with the link reference corresponding to the linking code. In this way, the centralized key exchange platform 102 (e.g., the first member service 832) may receive a link reference from the ephemeral transport object of the internal service (e.g., connect service 510), which, as described herein, may enable one-time linking operations with the second member platform 850.

Turning to FIG. 11B and the processing stage of the anonymous exchange process, the centralized key exchange platform may process an anonymous exchange request by collaborating with a previously unaffiliated member platform, the second member platform.

At operation 1122, the centralized key exchange platform 102 (e.g., the first member service 832) may request a UUEK for the second member platform 850 using the link reference. The first member service 832, for example, may provide a UUEK request, comparing the link reference, to the second member service 848. The second member service 848 may validate the UUEK request based on a comparison between the received link reference and the link reference within the ephemeral transport object (or a link reference previously issued by the connect service upon creation of the ephemeral transport object). In this manner, the centralized key exchange platform 102 (e.g., the second member service 848) may receive a UUEK request comprising the link reference.

At operation 1124, the centralized key exchange platform 102 (e.g., the second member service 848) may issue a UUEK for a relationship associated with the second member platform 850. For example, the centralized key exchange platform 102 (e.g., the second member service 848) may generate a UUEK (e.g., provider-specific UUEK, requester-specific UUEK) based on the second member-specific identifier (e.g., second member partition) corresponding to the link reference, and provide the UUEK to the first member service 832. The UUEK may comprise a second member partition corresponding to the second member platform 850 within the member computing ecosystem and an exchange identifier, as described herein.

At operation 1126, the first member service 832 may request an exchange authorization, using the issued UUEK, from the centralized key exchange platform 102 (e.g., the second member service 848). For example, the exchange authorization may comprise the exchange request (and/or an identifier of the exchange request) and/or the issued UUEK. In some examples, the centralized key exchange platform 102 may identify, by the first member service 832 corresponding to the first member platform 830, a second member service 848 corresponding to the UUEK based on the second member partition and provide the exchange request to the second member service 848.

At operation 1128, the centralized key exchange platform 102 (e.g., the second member service 848) may provide the authorization request to the second member platform 850 and, in response to the authorization request, receive, originating from the second member platform 850, an authorization response based on the authorization request.

For example, at operation 1130, the second member platform 850 may provide the authorization response to the centralized key exchange platform 102 (e.g., the second member service 848).

At operation 1132, the centralized key exchange platform 102 (e.g., the second member service 848) may provide the authorization response to the first member service 832, which, at operation 1134, may provide the authorization response to first member platform 830.

At operation 1136, the first member platform 830 may provide the authorization response to the user 802. In some examples, the exchange request may originate from a terminal corresponding to the first member platform 830. In such a case, the first member platform 830 may provide an indication of the authorization response to the terminal, as described herein.

X. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be comprised within the scope of the appended claims. Although specific terms are employed herein, they are used in a generic and descriptive sense only and not for purposes of limitation.

What is claimed is:

1. A computer-implemented method comprising:
   responsive to an exchange request at a first member platform within a member computing ecosystem, receiving, by one or more processors and originating from a second member platform within the member computing ecosystem, a linking code request comprising a second member-specific identifier corresponding to the second member platform;

providing, by the one or more processors and to an internal service, the linking code request to generate an ephemeral transport object storing a linking code and a link reference corresponding to the second member-specific identifier and the linking code;

providing, by the one or more processors, the linking code to the second member platform;

receiving, by the one or more processors and originating from the first member platform within the member computing ecosystem, a linking request comprising the linking code;

providing, by the one or more processors, the linking request to the internal service to receive the link reference from the ephemeral transport object of the internal service;

providing, by the one or more processors, the link reference to the first member platform;

receiving, by the one or more processors and originating from the first member platform, a universally unique ephemeral key (UUEK) request comprising the link reference;

generating, by the one or more processors, a UUEK based on the second member-specific identifier corresponding to the link reference;

providing, by the one or more processors, the UUEK to the first member platform;

receiving, by the one or more processors and originating from the first member platform, the exchange request with the UUEK; and authorizing, by the one or more processors and using the second member platform, the exchange request based on the UUEK.

2. The computer-implemented method of claim 1, wherein the UUEK comprises a second member partition corresponding to the second member platform within the member computing ecosystem and an exchange identifier.

3. The computer-implemented method of claim 2, wherein authorizing the exchange request comprises:
   identifying, by a first member service corresponding to the first member platform, a second member service corresponding to the UUEK based on the second member partition;

providing the exchange request to the second member service;

providing, by the second member service, an authorization request to the second member platform;

receiving, originating from the second member platform, an authorization response based on the authorization request; and providing the authorization response to the first member service.

4. The computer-implemented method of claim 3, further comprising:
   providing, by the first member service, the authorization response to the first member platform.

5. The computer-implemented method of claim 4, wherein the exchange request originates from a terminal corresponding to the first member platform and the first member platform provides an indication of the authorization response to the terminal.

6. The computer-implemented method of claim 1, wherein:
   (i) the linking code request is received via a second interface preconfigured for the second member platform, and (ii) the linking request is received via a first interface preconfigured for the first member platform.

7. The computer-implemented method of claim 1, further comprising:

instantiating the internal service;

providing the second member-specific identifier to the internal service to initiate a generation of the linking code and the ephemeral transport object;

receiving the linking code from the internal service.

8. The computer-implemented method of claim 1, wherein the linking code is a universally unique identifier (UUID) and the link reference comprises the linking code wrapped with the second member-specific identifier.

9. The computer-implemented method of claim 1, further comprising removing the ephemeral transport object in response to receiving the link reference.

10. The computer-implemented method of claim 1, further comprising removing the ephemeral transport object in response to an elapsed time exceeding a time threshold.

11. A system comprising:

an intermediary platform; and a set of member platforms within member computing ecosystem communicatively connected to the intermediary platform, wherein the intermediary platform comprises one or more processors; and one or more memories storing processor-executable instructions that, when executed by the one or more processors, cause the one or more processors to perform operations comprising:

responsive to an exchange request at a first member platform within the member computing ecosystem, receiving, originating from a second member platform within the member computing ecosystem, a linking code request comprising a second member-specific identifier corresponding to the second member platform;

providing, to an internal service, the linking code request to generate an ephemeral transport object storing a linking code and a link reference corresponding to the second member-specific identifier and the linking code;

providing the linking code to the second member platform;

receiving, originating from the first member platform within the member computing ecosystem, a linking request comprising the linking code;

providing the linking request to the internal service to receive the link reference from the ephemeral transport object of the internal service;

providing the link reference to the first member platform;

receiving, originating from the first member platform, a universally unique ephemeral key (UUEK) request comprising the link reference;

generating, a UUEK based on the second member-specific identifier corresponding to the link reference;

providing the UUEK to the first member platform;

receiving, originating from the first member platform, the exchange request with the UUEK; and authorizing, using the second member platform, the exchange request based on the UUEK.

12. The system of claim 11, wherein the UUEK comprises a second member partition corresponding to the second member platform within the member computing ecosystem and an exchange identifier.

13. The system of claim 12, wherein authorizing the exchange request comprises:

identifying, by a first member service corresponding to the first member platform, a second member service corresponding to the UUEK based on the second member partition;

providing the exchange request to the second member service;

providing, by the second member service, an authorization request to the second member platform;

receiving, originating from the second member platform, an authorization response based on the authorization request; and providing the authorization response to the first member service.

14. The system of claim 13, wherein the operations further comprise:

providing, by the first member service, the authorization response to the first member platform.

15. The system of claim 14, wherein the exchange request originates from a terminal corresponding to the first member platform and the first member platform provides an indication of the authorization response to the terminal.

16. The system of claim 11, wherein:

(i) the linking code request is received via a second interface preconfigured for the second member platform, and (ii) the linking request is received via a first interface preconfigured for the first member platform.

17. The system of claim 11, wherein the operations further comprise:

instantiating the internal service;

providing the second member-specific identifier to the internal service to initiate a generation of the linking code and the ephemeral transport object;

receiving the linking code from the internal service.

18. The system of claim 11, wherein the linking code is a universally unique identifier (UUID) and the link reference comprises the linking code wrapped with the second member-specific identifier.

19. One or more non-transitory computer-readable media storing processor-executable instructions that, when executed by one or more processors, cause the one or more processors to perform operations comprising:

responsive to an exchange request at a first member platform within a member computing ecosystem, receiving, originating from a second member platform within the member computing ecosystem, a linking code request comprising a second member-specific identifier corresponding to the second member platform;

providing, to an internal service, the linking code request to generate an ephemeral transport object storing a linking code and a link reference corresponding to the second member-specific identifier and the linking code;

providing the linking code to the second member platform;

receiving, originating from the first member platform within the member computing ecosystem, a linking request comprising the linking code;

providing the linking request to the internal service to receive the link reference from the ephemeral transport object of the internal service;

providing the link reference to the first member platform;

receiving, originating from the first member platform, a universally unique ephemeral key (UUEK) request comprising the link reference;

generating, a UUEK based on the second member-specific identifier corresponding to the link reference;

providing the UUEK to the first member platform;

receiving, originating from the first member platform, the exchange request with the UUEK; and authorizing, using the second member platform, the exchange request based on the UUEK.

20. The one or more non-transitory computer-readable media of claim 19, wherein the operations further comprise removing the ephemeral transport object in response to receiving the link reference.

\* \* \* \* \*